US012703620B2

(12) United States Patent
Fantappie et al.

(10) Patent No.: US 12,703,620 B2
(45) **Date of Patent: *Aug. 11, 2026**

(54) WATER DISPENSING STATION

(71) Applicant: DRINKSTATION HOLDINGS CORPORATION, Las Vegas, NV (US)

(72) Inventors: Giancarlo Fantappie, Rancho Palos Verdes, CA (US); Diego Macrellino, Torrance, CA (US)

(73) Assignee: DRINKSTATION HOLDINGS CORPORATION, Las Vegas, NV (US)

(*) Notice: Subject to any disclaimer, the term of this patent is extended or adjusted under 35 U.S.C. 154(b) by 146 days.

This patent is subject to a terminal disclaimer.

(21) Appl. No.: 18/892,097

(22) Filed: Sep. 20, 2024

(65) Prior Publication Data

US 2025/0011151 A1 Jan. 9, 2025

Related U.S. Application Data

(63) Continuation of application No. 18/048,750, filed on Oct. 21, 2022, now Pat. No. 12,122,654, which is a (Continued)

(51) Int. Cl.
*B67D 1/00* (2006.01)
*B67D 1/08* (2006.01)
(Continued)

(52) U.S. Cl.
CPC .......... *B67D 1/0017* (2013.01); *B67D 1/004* (2013.01); *B67D 1/0058* (2013.01); (Continued)

(58) Field of Classification Search
CPC .... B67D 1/0017; B67D 1/004; B67D 1/0058; B67D 1/0855; B67D 1/0859; (Continued)

(56) References Cited

U.S. PATENT DOCUMENTS

| | | |
|---|---|---|
| 3,378,170 A | 4/1968 | Reynolds et al. |
| 3,380,895 A | 4/1968 | Loebel |

(Continued)

FOREIGN PATENT DOCUMENTS

| | | | | |
|---|---|---|---|---|
| AU | 2016216738 A1 * | 3/2017 | | |
| CN | 1620584 A * | 5/2005 | ............. | F25D 11/00 |

(Continued)

OTHER PUBLICATIONS

Akhlaq, Assad; Examination Report No. 1; Mar. 31, 2025; 6 pages; Melbourne, Australia.

(Continued)

*Primary Examiner* — Bob Zadeh
(74) *Attorney, Agent, or Firm* — STETINA GARRED BRUCKER & NEWBOLES

(57) ABSTRACT

A drink station is provided with an alkaline filter cartridge in fluid communication with an ambient temperature water line provide alkaline water, and with a chilled water mixed with the alkaline water at a spigot to provide chilled alkaline water. A hot water heating element is located below the spigot so hot water flows upward for dispensing from the spigot, with a vent line between the heating element and spigot helping hot water to flow from the spigot to the heating element. A refrigeration system and a carbonation system is also provided. The refrigeration system uses the ice-bank technology. A submersible agitator pump improves heat exchanged between ice-bank and water by forced convection. The agitator pump operating based on the temperature of the drinking water. A figure eight evaporator coil can provide two cylindrical ice banks and two chilled water coils to increase the chilled water capacity.

20 Claims, 37 Drawing Sheets

Related U.S. Application Data continuation of application No. 16/875,975, filed on May 15, 2020, now Pat. No. 11,479,455.

(60) Provisional application No. 63/006,652, filed on Apr. 7, 2020, provisional application No. 62/849,796, filed on May 17, 2019.

(51) Int. Cl.
*B67D 1/10* (2006.01)
*B67D 1/12* (2006.01)

(52) U.S. Cl.
CPC ......... *B67D 1/0855* (2013.01); *B67D 1/0859* (2013.01); *B67D 1/0888* (2013.01); *B67D 1/0895* (2013.01); *B67D 1/10* (2013.01); *B67D 1/1279* (2013.01)

(58) Field of Classification Search
CPC ...... B67D 1/0888; B67D 1/0895; B67D 1/10; B67D 1/1279; B67D 1/0063; B67D 1/007; B67D 1/0875; B67D 2210/00047; B67D 1/0864; B67D 1/0042
See application file for complete search history.

(56) References Cited

U.S. PATENT DOCUMENTS

| | | | | |
|---|---|---|---|---|
| 3,441,176 | A | 4/1969 | Reynolds et al. | |
| 3,645,251 | A | 2/1972 | Black | |
| 3,785,492 | A | 1/1974 | Mazza | |
| 4,497,179 | A * | 2/1985 | Iwans | F25D 31/003 62/139 |
| 4,769,998 | A * | 9/1988 | Oswalt | F25D 17/02 62/185 |
| 4,923,644 | A | 5/1990 | Kuckens | |
| 4,934,150 | A * | 6/1990 | Fessler | F25D 31/003 62/394 |
| 5,190,188 | A | 3/1993 | Credle, Jr. | |
| 5,464,124 | A | 11/1995 | Weyh et al. | |
| 5,535,600 | A | 7/1996 | Mills | |
| 5,839,291 | A * | 11/1998 | Chang | B67D 1/0864 62/126 |
| 5,950,866 | A | 9/1999 | Lancaster | |
| 6,119,464 | A | 9/2000 | Nakayama et al. | |
| 6,276,150 | B1 | 8/2001 | Nelson | |
| 6,609,391 | B2 * | 8/2003 | Davis | B67D 1/0012 62/396 |
| 6,644,508 | B2 | 11/2003 | Haskayne et al. | |
| 6,662,573 | B2 | 12/2003 | Hawkins, Jr. et al. | |
| 6,672,481 | B2 | 1/2004 | Ziesel | |
| 6,761,036 | B2 | 7/2004 | Teague et al. | |
| 6,880,358 | B2 | 4/2005 | Lucas et al. | |
| 8,341,968 | B2 | 1/2013 | Landers et al. | |
| 8,938,987 | B2 | 1/2015 | Schroeder et al. | |
| 9,375,686 | B2 | 6/2016 | Boarman et al. | |
| 10,060,666 | B2 | 8/2018 | Nachawati et al. | |
| 10,201,785 | B2 | 2/2019 | Cohen et al. | |
| 10,399,839 | B2 | 9/2019 | Knoll et al. | |
| 10,544,027 | B2 | 1/2020 | Gatipon et al. | |
| 10,640,393 | B2 | 5/2020 | Cobb et al. | |
| 2002/0189276 | A1 | 12/2002 | Davis | |
| 2005/0035761 | A1 | 2/2005 | Park et al. | |
| 2010/0269707 | A1 * | 10/2010 | Wiemer | B67D 1/0867 99/323.1 |
| 2010/0294804 | A1 | 11/2010 | Dalchau et al. | |
| 2012/0318823 | A1 | 12/2012 | Yoon | |
| 2013/0062366 | A1 | 3/2013 | Tansey | |
| 2013/0105513 | A1 | 5/2013 | Krause et al. | |
| 2013/0199221 | A1 | 8/2013 | Tudor | |
| 2015/0144651 | A1 | 5/2015 | Berger et al. | |
| 2016/0297665 | A1 * | 10/2016 | Petermann | B67D 1/1422 |
| 2016/0325979 | A1 | 11/2016 | Cook et al. | |
| 2016/0368752 | A1 | 12/2016 | Bethuy et al. | |
| 2017/0081163 | A1 | 3/2017 | Gatipon et al. | |
| 2017/0121165 | A1 | 5/2017 | Gabrieli | |
| 2017/0292781 | A1 | 10/2017 | Pandeya et al. | |
| 2019/0270630 | A1 | 9/2019 | Dahan et al. | |
| 2020/0031654 | A1 | 1/2020 | Wing et al. | |
| 2020/0047137 | A1 | 2/2020 | Wilder et al. | |
| 2020/0361758 | A1 | 11/2020 | Fantappie et al. | |
| 2025/0011151 | A1 * | 1/2025 | Fantappie | B67D 1/007 |

FOREIGN PATENT DOCUMENTS

| | | | | |
|---|---|---|---|---|
| DE | 2828372 | A1 | 1/1979 | |
| DE | 19833832 | A1 | 3/1999 | |
| EP | 0738234 | B1 | 11/2001 | |
| EP | 2031328 | A1 | 3/2009 | |
| EP | 2515060 | A2 | 10/2012 | |
| EP | 3312133 | A1 | 4/2018 | |
| GB | 2437511 | A | 10/2007 | |
| GB | 2441215 | A | 2/2008 | |
| GB | 2446312 | A * | 8/2008 | B67D 1/0867 |
| GB | 2465632 | | 6/2010 | |
| GB | 2465632 | A | 6/2010 | |
| JP | 01169286 | | 7/1989 | |
| JP | 2007085712 | A * | 4/2007 | |
| JP | 2014040279 | A | 3/2014 | |
| JP | 55-20697 | | 6/2014 | |
| WO | 2002060806 | A1 | 8/2002 | |
| WO | 2012178044 | A1 | 12/2012 | |
| WO | 2013034396 | A1 | 3/2013 | |
| WO | 2013108702 | | 7/2013 | |
| WO | 2018112357 | A1 | 6/2018 | |
| WO | 2019061644 | A1 | 4/2019 | |

OTHER PUBLICATIONS

Schultz, Tom; Extended European Search Report; Mar. 3, 2025; 9 pages; Munich, Germany.

Office Action Summary; Sep. 24, 2025; 1 page.

* cited by examiner

WATER DISPENSING STATION

CROSS-REFERENCE TO RELATED APPLICATIONS

This application is a continuation of U.S. application Ser. No. 18/048,750, filed Oct. 21, 2022, which application is a continuation of U.S. application Ser. No. 16/875,975, filed May 15, 2020, which application claims priority to U.S. Provisional Application No. 63/000,652 filed Apr. 7, 2020, and to U.S. Provisional Application No. 62/849,796 filed May 17, 2019, the full disclosures of which applications are incorporated herein by reference in their entireties.

STATEMENT RE: FEDERALLY SPONSORED RESEARCH/DEVELOPMENT

Not applicable

BACKGROUND

Water dispensers of different sizes and features are nowadays available in homes, offices and restaurants. But there are several beverages that current dispensers do not dispense and there is thus a need for dispensers that dispense a wider and different variety of waters with different chemical characteristics, such as alkaline waters, or water at different temperatures with different carbonation levels.

Some water dispensers typically provide carbonated water by mixing carbon-dioxide gas with chilled water that is injected at high pressure-using a pump-inside a pressurized canister (i.e., a metal vessel under pressure). When the pressurized canister is full of water mixed with gas, users can dispense the carbonated water contained in the pressurized canister until it is empty and the cycle repeats, per batches. There is a need for a dispenser that can create carbonated water or other carbonated beverages instantaneously, on demand and continuously (i.e., not per batches), without using a pressurized canister to hold a specific volume of carbonated water (pre-carbonated), but using instead a small, efficient, continuous and no-energy consuming in-line flash carbonator, such as the carbonator using electrostatic charging as in U.S. patent application Ser. No. 16/329,043, filed Feb. 27, 2019 and published as Publication No. 2019/0217256 on Jul. 18, 2019. While current art carbonated beverage dispensers use a pressurized canister to combine carbon dioxide gas with water, the space occupied by such vessel under pressure increases the overall dimensions of its chiller and reduces the energy efficiency of its chiller. There is therefore a need for a dispenser whose carbonation system is small and efficient and whose refrigeration system can also be compact and efficient.

Commercial-grade water dispensers that are able to dispense carbonated water and carbonated beverages must have very powerful refrigeration systems because it is a well-known principle of physics that the solubility level of carbon-dioxide gas in water and the formation of carbonic acid is related to the temperature of water: solubility is maximum when the temperature of the water approaches the water-freezing temperature (i.e., 0° C.).

Chillers have refrigerated evaporator coils immersed in a water-bath inside a chilled water reservoir, with water dispenser cooling coils in the same water bath to refrigerate the drinking water that is produced by the dispenser. Such water dispensers use the so-called "water-bath/ice-bank" technology, where the latent heat of the ice that it is formed all around the evaporator coils is used to flash refrigerating the drinking water that enters the chiller. There is further the need of refrigerators for water dispensers to have an efficient chilling system.

Chillers are normally shipped with their chilled water reservoir empty to avoid the weight and leakage of the water during shipping. Thus, during installation and setup of a dispenser, the installer or the user must fill manually the chilled water reservoir with large volumes of water and associated spilling, splashing and overfilling errors. If, overtime, water evaporates from the reservoir, it must also be manually refilled. There is thus a need for a light water dispenser suitable for shipping that avoids the problems associated with manual filling and refilling of the chilled water reservoir. There is a further need for emptying such chilled water reservoirs when the water dispensers must be moved or discarded.

Further, the cooling evaporator coils freezes the water in the chilled water reservoir and temperature sensors are used to limit the amount of ice formed. When the ice growth is such that it touches the temperature sensor then if the compressor does not stop working the entire water-bath inside the chiller might freeze-up and, consequently, the drinking water that flows inside a stainless steel drinking water chill water coil immersed inside the chiller reservoir whose water bath freezes up completely and cannot be dispensed. There is a need for more accurate control over the amount of ice formed so the latent-heat of ice can be used to increase the cooling efficiency of the cooling coils in the water reservoir and so that agitators inside the chiller are controlled by the temperature of the drinking water in the chiller water coil, rather than based upon the growth of the ice, or any other time-related variable.

Water dispensers with evaporator cooling coils immersed in the chilled water reservoirs provide a limited supply of cooled water contained in the dispenser, that supply may be depleted during periods of high demand. There is thus a need to increase the capacity for cooled water by increasing the heat-exchange between the surfaces at the interface between the ice and the water, creating the necessary agitation of the water inside the chiller while avoiding unnecessarily melting the ice when the temperature of the drinking water inside the water chiller coil is low enough. There is further the need of water-bath agitators that increase heat transfer by convection by directing water in the appropriate direction.

There is the need to avoid too much agitation and consequent consumption and premature melting of the ice bank because of uninterrupted circulation of the water inside the chilled water reservoir. There is further the need of optimizing the use of the latent heat of the ice bank based on demand.

Hot water heaters for beverage dispensers typically use resistance heaters to create hot water in a reservoir, with gravity and water pressure helping dispense the heated water from a spigot in the bottom or side of the dispenser and below the reservoir or a large portion of the hot water reservoir. The hot water can make the spigot hot to the touch. There is a need for an improved water heater that dispenses hot water but with spigot that does not get hot as in the prior art.

In addition, there is believed to be a need that no water remains in the water line between the hot water tank and the spigot at the moment the dispensing of hot water is halted or immediately thereafter. If hot water remains in the outlet line between the tank and the spigot the temperature of the water in the line will decrease over time and when the spigot is opened to dispense hot water again, the hot water dispensed from the spigot would have an inconvenient lower temperature because it will be mixed with the cooler water that has remained in the outlet line. It is, therefore, useful that all the hot water that remains in the outlet line outside the hot water tank and that it is not dispensed, flows back into the hot water tank as soon as the spigot closes, so that the water will remain hot (heated by the heater), instead of stagnating in the outlet line and gradually reducing its temperature.

There is also a need for a hot water tank to be able to dispense heated water upwards (i.e., against gravity), so that the hot water tank could be located below the level of the dispensing nozzle and the resulting design of the entire drink station dispenser is not too high.

Hot water tanks for water dispensers have temperature sensors that shut off power to the electrical resistance heater when steam is generated because that indicates the hot water reservoir is out of water or low on water, and such heaters avoid steam because the steam temperature can result in dispensing water that is too hot. But because steam holds more heat than water, the efficiency of heaters that do not use steam is less lowered. There is a need for a more efficient hot water heating system and for an improved temperature control system for hot water tanks.

Electrical resistance heaters for hot beverage dispensers may overheat when due to the evaporation of water over a certain period of time of no use, the water level in the hot water reservoir becomes too low so that part of the resistance heater is no longer covered with water. There is thus a need for an improved way to avoid overheating of hot water heaters.

The taste of alkaline water is believed to improve if it is consumed at a temperature below ambient. There is thus a need for a compact beverage dispenser that can provide unlimited chilled alkaline water without requiring a large reservoir of chilled alkaline water.

There is also believed to be a need for a constant release of minerals from alkaline chambers containing alkaline ceramic balls and, a need to control and stabilize the release of minerals into the drinking water in order to avoid sudden release of minerals when the dispenser is not used for one day or more.

BRIEF SUMMARY

A number of features are provided in an improved beverage drink station. These improvements include, but are not limited to, a drink station having an alkaline filter cartridge in fluid communication with an ambient temperature water line to dispense alkaline water at a spigot on the dispenser. A chilled water line is in fluid communication with the same spigot, so a mixture of chilled water and alkaline water is provided at the spigot to improve the taste of the alkaline water by slightly reducing its temperature. A hot water tank with heater is located below the spigot so hot water flows upward for dispensing from the spigot to provide hot water at the spigot. A vent line between the hot water tank and spigot help hot water to flow from the spigot, back to the hot water tank and avoid heating the spigot. An external carbon dioxide gas tank provides carbonation to a chilled line of sparkling or carbonated water, and in-line carbonators, immersed in a water-bath that is cooled down by the refrigeration system, provide supplemental carbonation to produce different carbonation levels at the spigot. A figure eight evaporator coil provides two cylindrical ice-banks and two drinking water chiller water coils to increase the chilled water capacity of the drink dispenser. Up to two submersible agitator pumps are used to create a spherical flow path in the opposing top and bottom ends of the chilled water bath to control the water bath temperature, with a drinking water temperature sensor controlling the agitators.

In more detail, a drink station is shown which has a housing containing a first main water inlet port in fluid communication with a water delivery pump inside the housing to provide water to the delivery pump during use of the apparatus. The dispenser has at least one stainless steel drinking water chiller coil where drinking water is cooled down, in fluid communication with the water delivery pump and the spigot. In order to cool down the incoming water, the stainless steel drinking water chiller coil is at least partially inserted into, and cooled by, a heat exchanger having a low temperature portion to chill incoming water from the water delivery pump to a temperature between the ambient temperature of the water at the delivery pump and just above 32° F. during use of the dispenser.

Such beverage dispenser has an optional first water line splitter that is placed in fluid communication with the drinking water chiller coil, a normally-closed chilled water valve positioned downstream with respect to the drinking water chiller coil and downstream of and in fluid communication with the first water line splitter. A normally closed sparkling water valve may be positioned downstream of the chiller coil and downstream of, and in fluid communication with, the first water line splitter. The sparkling water valve is in fluid communication with a downstream dispensing outlet. At least one normally closed carbon dioxide gas valve may be placed in fluid communication with a carbon dioxide gas tank. At least one first static venturi-restriction device is located downstream of, and in fluid communication with, the carbon dioxide gas valve and is also located downstream of and in fluid communication with the chilled water line splitter. The venturi improves the mixing of chilled water and carbon dioxide gas. One or more static, in-line carbonation devices are optionally located downstream of, and in fluid communication with, at least one first static venturi-restriction device to further carbonate chilled water flowing through at least one first static venturi-restriction device. The in-line venturi-restriction device is at least partially inserted into, and cooled by, the heat exchanger to provide cold carbonated water. The in-line carbonation chambers are in fluid communication with the dispensing outlet which is downstream of the carbonation chambers to dispense that chilled and carbonated water.

The beverage dispenser has an electronic control module that is in electrical communication with the water delivery pump, the water valve, the sparkling water valve, the carbon dioxide gas valve and the chilled water valve to open and close those valves and to power the deliver pump on or off. A chilled water selector is placed in electrical communication with the electronic control module to dispense chilled still water. When the chilled water selector is activated, the controller sends electrical signals to the various parts so that the water delivery pump is powered on and the chilled water valve is excited to open and allow chilled still water to flow to the dispensing outlet during use of the apparatus. A carbonated water selector in also electrical communication with the electronic control module to dispense chilled carbonated water. When the carbonated water selector is activated, the control module sends electrical signals to the various parts so that the water delivery pump is powered on, the sparkling water valve and the carbon dioxide gas valve are both excited to open to allow carbonated water to flow to the dispensing outlet during use of the apparatus.

The above beverage dispensing apparatus includes a normally closed main inlet valve positioned downstream of the main inlet port into the drink station and in electrical communication with the control module to open and close the main inlet valve anytime a selector is activated. When the chilled water selector, or the carbonated water selector is activated, the main inlet valve is excited open. The dispensing apparatus includes a flow-meter in fluid communication with the main inlet port and electrically connected to the control module, to monitor the quantity (e.g., volume) of water dispensed by the dispenser because, except for potential evaporation, the water in the dispenser should equal the water dispensed out of the dispenser.

In still further variations, the dispenser includes an ambient water line that includes a normally closed ambient water valve in fluid communication with the main valve and the dispensing outlet and in electrical communication with the control module to open and close the ambient water valve. An ambient water selector is in electrical communication with the electronic control module to dispense ambient temperature water. When the ambient water selector is activated the controller powers the water delivery pump on and opens the ambient water valve to allow ambient temperature water to be dispensed during use of the apparatus.

In further variations, the beverage dispensing apparatus also dispenses alkaline water. In this case, a normally closed ambient water valve in is in fluid communication with the main water inlet port to receive water during use and further in electrical communication with the control module to open and close the ambient water valve. An alkaline cartridge has an inlet downstream of and is in fluid communication with the ambient water valve and further has a cartridge outlet in fluid communication with an alkaline water line. The alkaline cartridge contains at least one and preferably several different alkaline minerals and a downstream bed of activated granular carbon that is in fluid communication with the alkaline cartridge outlet. A filter membrane is interposed between the alkaline mineral and the charcoal bed to separate the materials, avoid sudden release of alkaline minerals and filter out larger mineral particles. In this configuration, the beverage dispenser has an alkaline selector in electrical communication with the electronic control module to dispense alkaline water by opening both the chilled water valve and the ambient water valve to allow ambient temperature water to flow through the alkaline cartridge and into the alkaline water line. The chilled water line is also in fluid communication with the alkaline water line (preferably at the dispensing outlet) to dispense a mixture of chilled water and alkaline water at the dispensing outlet during use of the dispensing apparatus in order to reduce the temperature of the dispensed alkaline water while contemporarily diluting the amount of minerals released at the spigot.

In further variations, the controller has a timing circuit that opens and then closes the chilled water valve for a time interval which is shorter than the time interval during which the ambient water valve is opened and then closed. Additionally, the alkaline chamber includes a cartridge containing mineral alkaline crystal balls. The cartridge is removably connected to a manifold having a manifold inlet in fluid communication with and downstream of the ambient water valve. Connections of the type used with water filters are believed suitable. The manifold has a manifold outlet that is fluid communication with the alkaline water line at the dispensing outlet.

In still further variations, the drink station dispenses hot water, and addresses a prior problem of not efficiently using the steam that collects in hot water heaters but is never dispensed with the hot water. An improved hot water tank which includes a heater includes a normally closed hot water valve in fluid communication with the main valve and in electrical communication with the control module to open and close the hot water valve and the main valve. A hot water tank is provided having a hot water reservoir in a bottom portion of the tank and a vapor chamber at a top portion of the tank with a dividing wall separating the hot water reservoir from the vapor chamber. A discharge opening in the dividing wall places the hot water reservoir in fluid communication with the vapor chamber, so steam can flow into the vapor chamber whether the water reservoir is full, or partially full. A tube with a slotted bottom connects the discharge opening to an outside of the tank. The tank has a fluid inlet at a bottom of the tank in fluid communication with both the hot water valve and the hot water reservoir. The tank also has a hot water outlet at a top of the tank in fluid communication with the hot water reservoir and the vapor chamber, so water flows into the bottom of the tank through the control tube and out the top of the tank during use of the apparatus, sucking steam into the control tube as water flows through the tube. The hot water outlet is in fluid communication with the dispensing outlet through a hot water line. The hot water tank for the dispenser may have an electrical resistance heater in thermal communication with the hot water reservoir in the tank to heat water in the hot water tank during use of the apparatus. The heater is in electrical communication with the control module to control the heater. A hot water selector is provided on the dispenser and placed in electrical communication with the electronic control module to dispense hot water. When the hot water selector is activated the control module sends electrical signals to excite the hot water valve open and the main valve open, so water flows into the hot water tank and it is accelerated upward by the restriction of the slotted control tube where the water from the hot water reservoir flows out the hot water outlet to the dispensing outlet during use of the apparatus.

In further variations of the hot water dispenser, the dispensing outlet is higher than the hot water outlet so hot water flows upward to the dispensing outlet from the hot water tank which is positioned at a lower level. A vapor line is in fluid communication with the dispensing outlet and the vapor chamber to provide a vent path allowing hot water to flow from the discharge opening back into the hot water tank when dispensing stops and the hot valve is closed. The hot water dispensing outlet may be in fluid communication with both the chilled water outlet and the sparkling water outlet as the temperature of the dispensing outlet is not in continuous contact with hot water. Further, the tube advantageously comprises a control tube having a slotted bottom encircling the discharge opening and further having a top forming the hot water outlet. The slots are sized to suck vapor from the vapor chamber when hot water flows through the control tube at a predetermined flow rate of 1 liter per minute minimum. The heater advantageously includes a safety thermostat in contact with the heating element and in electrical communication with the control module to shut off the heating element if the temperature of the hot water is too high or the water level in the water reservoir is too low.

In further variations of the beverage dispensing apparatus, a water filter is placed in fluid communication with and upstream of both the chilled water valve and the sparkling water valve.

To cool down the drinking water the heat exchanger uses a water-bath and ice-bank refrigeration device. Such a device includes a chilled water reservoir having top and bottom walls and sidewalls forming an enclosed water reservoir of predetermined volume, with all walls being thermally insulated. The device has a freezer expansion line with an evaporator coil inside and adjacent to the chilled water reservoir sidewalls. The evaporator coil has sufficient cooling capacity during the use of the apparatus to freeze the water inside the chilled water reservoir which is in contact with the evaporator coil and create an ice bank around a majority of the evaporator coils with the rest of the water-bath inside the chilled water reservoir to remains in its liquid state. The ice-bank is created around all, or almost all the evaporator coils. The device has a drinking water chiller coil located inside the chilled water reservoir and it is at least partially submerged by the water-bath in the reservoir. During use of the drink station, the drinking water inside the chiller coil is cooled down thanks to the ice-bank that is formed on the evaporator coil. One or more static, in-line carbonation chambers are located inside the chilled water reservoir at a location where the carbonation devices are at least partially immersed in the water-bath during use of the dispensing apparatus.

In further variations, the water-bath and ice-bank refrigeration device has the first splitter for the chilled water line and the carbonated water line located inside the chilled water bath during use of the apparatus. Additionally, a first temperature sensor may be placed in electrical communication with the controller and positioned within the chilled water reservoir at a location selected to contact the ice bank along a majority of the length of the sensor during use of the apparatus. The temperature sensor is also in electrical communication with the control module. By measuring the resistivity values that differ significantly between water and ice, the temperature sensor is able to recognize when ice has grown, sends a signal to the electronic control module so that the power to the compressor and fans of the dispenser's refrigeration system is interrupted. The evaporator coils stop freezing water and the growth of ice is interrupted so as to avoid the total freezing of the water inside the chilled water reservoir and of the drinking water inside the stainless steel chiller coil and inside the pipes and connections immersed in the water-bath of the chiller.

In further variations, improved water-bath agitation is done through the use of at least one agitator pump which is proved much more effective in increasing the heat transfer between the ice bank and the water bath than ordinary stirrers or other agitators. In further variations the agitation of the water-bath is done with a first submersible agitator pump having a first pump having a first axial flow path the inflow along a longitudinal axis of the of the drinking water chiller coil while the outflow direction is horizontally directed. The water intake being longitudinally directed towards the pump body on a longitudinal axis, while the water flow is accelerated by the agitator pump and the outflow is directed radially in one, or multiple radial outward directions, on a plane that is orthogonal to that longitudinal axis. More than one agitator pump can be used, so the dispensing device may include a second submersible agitator pump having a submersible pump having a third axial flow path along the longitudinal axis of the drinking water chiller coil and in a direction opposite to the first axial flow path. The second submersible agitator pump and its pump have fourth radial flow path orthogonal to that longitudinal axis and in the same direction as the second radial flow path.

In further variations, the agitators include first and second submersible agitators with pumps with each agitator pump at least partially submerged in the water-bath of the chilled water reservoir. Each submersible pump has first and second respective nozzles extending along a longitudinal axis of the drinking water chiller coil and forming the inflow port. Each submersible agitator pump has a plurality of second ports forming the outflow port directing the water outward in a radial way, with each submersible agitator's inflow and outflow ports creating a circular flow path in a portion of the chilled water reservoir.

In further variations, an improved temperature control for the ice bank is provided. At least one agitator pump is at least partially inside the drinking water chiller coil and in electrical communication with the controller. The at least one agitator pump is preferably at least partially submerged. An ice contact temperature sensor located in the chilled water reservoir at a location that contacts the ice bank during use of the apparatus which sensor is also in electrical communication with the controller. During use of the apparatus the ice bank grows and contacts the ice contact temperature sensor which then sends a signal to the controller, and in response to that signal the controller activates or de-activate the compressor and the fans of the refrigeration system.

In further variations, an improved chilled water reservoir is provided. The chilled water reservoir is advantageously sealed to contain the chilled water in a sealed environment that reduces water spillage and evaporation. A normally closed, chilled water reservoir filling valve is provided having an upstream end in fluid communication with the main flow valve and a downstream end in fluid communication with a chilled water reservoir fill line that is in fluid communication with the chilled water reservoir. A water level sensor is located to detect the water level in the chilled water reservoir. The bucket fill valve and the water level sensor are each in electrical communication with the controller which has circuitry configured to open the chilled water reservoir filling valve when the water level sensor reaches a predetermined low level determined by the sensor and to close the reservoir filling valve when the water level sensor is at a maximum fill level determined by the sensor signal. A float sensor is believed suitable. In further variations, the chilled water reservoir comprises top and bottom walls and sidewalls forming a sealed enclosed of predetermined volume, with all walls being thermally insulated and at least a majority of the fluid communication lines and electrical communication lines extending through sealed fluid connections in the top of the chilled water reservoir. Advantageously, a drain is provided in the bottom of the water reservoir to remove the water bath from inside the reservoir when the dispenser is deinstalled and moved from one location to another.

A beverage dispensing apparatus with increased capacity is also provided. A beverage dispenser housing has a first main water inlet port in fluid communication with a water delivery pump in the housing to provide water to the delivery pump during use of the apparatus. A chilled water reservoir has top and bottom walls and sidewalls forming an enclosed water reservoir of predetermined volume, with all walls being thermally insulated and advantageously, but optionally, sealed to provide a sealed enclosure for the chilled water reservoir. If the lid is removable, a ring seal, such as an O-ring seal, is provided. The apparatus has an evaporator freezer having an evaporator coil inside and connected to the chilled water reservoir sidewalls. Advantageously, the evaporator coil forms a figure eight configuration having a first vertical evaporator coil at a first end of the figure eight configuration and a second vertical evaporator coil at a second end of the figure eight configuration. The evaporator coils have interleaved connecting segments extending between the first and second vertical evaporator coils. The evaporator coil has sufficient cooling capacity during use of the apparatus to freeze water in contact with the evaporator coil and create a wall ice bank around at least a majority of the area of the sidewalls and to create a center ice bank extending between two opposing sidewalls of the water reservoir where the interleaved segments of the first and second evaporator coils are interleaved.

The improved capacity dispensing device also has a first vertical chiller water coil located inside the first evaporator coil. The first chiller water coil has an upstream end in fluid communication with the water delivery pump and a downstream end in fluid communication with a first dispensing outlet. A second vertical chiller water coil is located inside the second evaporator coil. The second chiller water coil has an upstream end in fluid communication with the water delivery pump and a downstream end in fluid communication with a second dispensing outlet. This figure eight configuration is believed to provide twice the volume of chilled water as a single coil. Advantageously, each drinking water chilled water coil contains 0.5 to 0.8 liters of chilled water, for a total capacity of 1 to 1.6 liters of chilled water in the drinking water chilled coils.

There is also provided a hot water tank for use in a beverage dispenser having a water inlet and a hot water outlet, and a plurality of beverage selector buttons associated with different beverages. The selector buttons are in electrical communication with a controller to active appropriate valves in the beverage dispenser to dispense the different beverages associated with the respective selector buttons through a discharge opening. One of the selector buttons includes a hot water button. The hot water tank includes a tank housing containing a hot water reservoir in a bottom portion of the housing and a vapor chamber at a top portion of the housing with a dividing wall separating the hot water reservoir from the vapor chamber. A discharge opening extends through the dividing wall with the discharge opening advantageously located in the bottom of a recess in the dividing wall. The hot water housing has a water inlet at a bottom of the housing. A control tube extends from the discharge opening through the vapor chamber and through a top of the housing. A slotted bottom on the control tube encircles the discharge opening at the dividing wall. The slotted bottom has a plurality of longitudinal slots sized to inhibit water that flows through the control tube at a flow rate of, minimum, 1 liter per minute from also flowing through the slots while allowing any steam in the vapor chamber to be sucked into the water flowing through the control tube at a speed determined by the area of the restrictor in the slotted tube and the pressure of the incoming water. The slots are also sized to allow steam from the hot water reservoir to enter the vapor chamber. The tank also advantageously, but optionally, includes a vent tube having a first end in fluid communication with the vapor chamber and a second end outside the housing, with the second end configured to connect to a fluid line during use of the heater. The tank may also have an electrical resistance heater in thermal communication with the hot water reservoir in the housing to heat water in the hot water reservoir during use of the tank. Advantageously, the tank also has a temperature regulating thermostat in thermal communication with the hot water reservoir.

There is also provided a beverage dispenser that has an improved hot water tank for use in dispensing hot water. The beverage dispenser has a water inlet, a hot water outlet, and a plurality of beverage selector buttons associated with different beverages and with each button in electrical communication with a control module to activate appropriate valves in the beverage dispenser to dispense the different beverages associated with the respective selector buttons through a beverage dispensing outlet. One of the selector buttons is a hot water button. The improved beverage dispenser includes a normally closed hot water valve in fluid communication with a normally closed main valve that is in fluid communication with the beverage dispenser's water inlet. The hot water valve is in electrical communication with the control module to open and close the hot water valve. The dispenser has an improved hot water tank that has a hot water reservoir in a bottom portion of the tank and a vapor chamber at a top portion of the tank with a dividing wall separating the hot water reservoir from the vapor chamber. The dividing wall has a discharge opening placing the hot water reservoir and the vapor reservoir in fluid communication. The tank has a water inlet at a bottom of the tank in fluid communication with the hot water valve and the hot water reservoir. The tank having a control tube extending from the discharge opening through a top of the tank and in fluid communication with the hot water reservoir and the vapor chamber, so water can flow into the bottom of the tank and out the top of the tank during use of the apparatus. The tank has a water deflector at the bottom of the hot water reservoir to favor mixing of the ambient temperature water entering the hot water tank during use of the apparatus with the hot water present inside the hot water reservoir. The deflector being able to direct incoming water flow towards the heater. The hot water outlet is in fluid communication with the beverage dispensing outlet through a hot water line, with the beverage dispensing outlet being above the tank's hot water outlet in the vertical direction. The control tube has a slotted bottom encircling the discharge opening at the dividing wall. The slotted bottom has a plurality of slots extending along a length of the control tube and configured to inhibit water that is flowing through the control tube at a flow rate of at least 1 liter per minute from also flowing through the slots while sucking at least some of any steam in the vapor chamber into the water flowing through the control tube. The slots are sized to allow steam from the hot water reservoir to enter the vapor chamber. The dispenser advantageously has an electrical resistance heater in thermal communication with the hot water reservoir in the tank to heat water in the hot water reservoir during use of the apparatus. The heater is in electrical communication with the control module to regulate the operation of the heater. The operation of the heater is regulated by signals from the control module such that when the hot water valve is excited to open, water flows into the hot water reservoir and upward and out the hot water outlet to the dispensing outlet during use of the apparatus.

In further variations, the hot water heater includes a vent tube having a first end in fluid communication with the vapor chamber and a second end outside the heater tank with that second end configured to connect to a fluid line during use of the heater to provide a vent path avoiding air locks and allowing hot water to drain back into the hot water reservoir through the control tube. Advantageously, the heater includes a temperature regulating thermostat in thermal communication with the hot water reservoir, and a thermistor contacting the heater to provide a safety shut off if the water level falls below the level at which the thermistor contacts the heater.

There is also provided an improved agitator pump for a chilled water bath in a beverage dispensing apparatus using a water bath/ice bank cooling system for the dispensed water. The system has a drinking water chiller coil extending along a longitudinal axis of the chilled water reservoir and located in the chilled water bath and an ice-bank surrounding a portion of the chilled water bath inside an insulated water reservoir having an evaporator coil of the refrigeration system that forms the ice bank. The improved agitator pump including first and second submersible agitators each having a submersible agitator pump with at least one intake port creating a first flow path during use that extends along the longitudinal axis of the chiller coil. Both the first ports face each other along that longitudinal axis. Each submersible pump also has a plurality of second outlet ports orientated outward from the longitudinal axis and creating an outflow path during use that extends outward from the longitudinal axis. The intake port and the outlet openings in each of the two agitator pumps cooperate during use to intake water longitudinally through the intake port and expel water on an orthogonal plane, radially, through the outlet openings. Both ports are located in the chilled water bath inside the chilled water coil during use. Further, the two ports cooperate to create a spherical flow pattern in the portion of the chilled water reservoir by each agitator pump which flow pattern keeps the drinking water chiller coil from freezing and controls the thickness of the ice bank. Advantageously, each spherical flow pattern extends to about half the height of the drinking water chiller coil.

In further variations, the at least one agitator pump operates in cooperation with a temperature sensor which controls the temperature of the water inside the drinking water chiller coil, to send an electrical signal indicating when the temperature of the drinking water exceeds a certain upper value or is reduced below a lower value. The two values are used to turn the agitator pump(s) on and off, or to change their speeds or, alternatively, to turn off one agitator pump while keeping the other working.

Yet a further beverage dispensing apparatus is disclosed herein. Such apparatus comprises a chilled water reservoir; a refrigeration system comprising an evaporator coil, wherein the evaporator coil is arranged within the chilled water reservoir and is configured to freeze water within the chilled water reservoir to form an ice bank; an ice sensor configured to detect a presence of ice within the chilled water reservoir; a controller in communication with the ice sensor, wherein the controller is configured to deactivate the refrigeration system when the presence of ice is detected; a chiller coil arranged within the chilled water reservoir configured to circulate drinking water; an agitator pump arranged within the chilled water reservoir and configured to circulate the chilled water in the chilled water reservoir; and a temperature sensor arranged adjacent to the chiller coil and in communication with the controller, wherein the controller operates the agitator pump based on a temperature determined by the temperature sensor.

In further variations, the beverage dispensing apparatus may further include, at least one first static venturi-restriction device located downstream the sparkling water valve of and in fluid communication with the carbon dioxide gas valve and also located downstream of and in fluid communication with the chilled water line splitter. Further, the apparatus may also include one or more static, in-line carbonation devices downstream of and in fluid communication with the at least one first static venturi-restriction device to further carbonate water flowing through the at least one first static venturi-restriction devices. The in-line venturi-restriction device is at least partially inserted into and cooled by the heat exchanger and the carbonation devices are in fluid communication with the dispensing outlet downstream of the carbonation devices. There is also provided a beverage dispensing apparatus for alkaline drinks that includes a normally closed ambient water valve in fluid communication with the main water inlet port of the dispensing apparatus to receive water during use and in electrical communication with the control module to open and close the ambient water valve. The alkaline drink dispensing apparatus also has an alkaline cartridge having an inlet downstream of and in fluid communication with the ambient water valve and also having a cartridge outlet in fluid communication with an alkaline water line.

The apparatus further includes an alkaline cartridge containing at least one alkaline mineral and a downstream bed of activated granular carbon that is in fluid communication with the alkaline cartridge outlet. An alkaline selector is in electrical communication with an electronic control module to dispense alkaline water by opening the ambient water valve to allow ambient temperature water to flow through the alkaline cartridge and into the alkaline water line.

In further variations, the alkaline water dispensing apparatus has an alkaline chamber that includes a cartridge containing mineral ceramic balls. The cartridge is removably connected to a manifold having a manifold inlet in fluid communication with and downstream of the ambient water valve. The manifold also has a manifold outlet that is fluid communication with the alkaline water line. In still further variations, the alkaline water dispensing apparatus has a refrigeration system to refrigerate and chill water, with a normally closed chilled water valve that can be activated by a controller to dispense chilled water from the refrigeration system. The dispensing apparatus also has an outlet in fluid communication with both the alkaline water line and the chilled water line. The controller also opens and then closes both the ambient water valve and the chilled water valve to dispense a mixture of chilled water and alkaline water at the dispensing outlet during use of the dispensing apparatus. In still further variations, the alkaline water dispensing apparatus has the chilled water valve opening for a time interval which is shorter than the time interval during which the ambient water valve is opened and then closed.

There is also provided a beverage dispensing apparatus having a hot water dispensing outlet for hot water drinks that includes a normally closed hot water valve in fluid communication with a hot water tank positioned downstream with respect to the hot water valve. The hot water valve is in electrical communication with an electronic control module. The hot water tank has a hot water reservoir in a bottom portion of the tank and a vapor chamber at a top portion of the tank with a dividing wall separating the hot water reservoir from the vapor chamber and a discharge opening in the dividing wall. The tank has a fluid inlet at a bottom of the tank in fluid communication with the hot water valve and the hot water reservoir. The beverage dispensing apparatus also has an electrical resistance heater in the hot water reservoir in electrical communication with the electronic control module. The electrical heater is operated by a temperature sensor, wherein when the temperature sensor detects a temperature below a certain value the heater is powered on and when the temperature sensor detects a temperature above a certain value is powered off, so that the heater's electrical power is cycling between an upper and a lower temperature. The electrical heating element may be enclosed in a stainless-steel protective cylinder in thermal contact with the water inside the hot water reservoir and heating the water inside the reservoir in a way that its temperature is always kept in between the cycling temperatures. The hot water tank has a hot water outlet at a top of the tank in fluid communication with both the hot water reservoir and the vapor chamber, so water flows into the bottom of the tank and out the top of the tank during use of the apparatus. The hot water outlet is in fluid communication with the hot water dispensing outlet through a hot water line.

With the dispensing outlet for the hot water located at higher level than the hot water tank so hot water must flow upward to the hot water dispensing outlet during operation of the apparatus.

The beverage dispensing apparatus also has a vapor line in fluid communication with the dispensing outlet and the vapor chamber in the hot water tank to provide a vent path allowing hot water to flow from the discharge opening to the outlet and back into the vapor chamber and into the hot water tank after the hot water valve is closed. Further, a control tube is provided having a slotted bottom encircling the discharge opening and further having a top forming the hot water outlet, the slots sized to suck vapor from the vapor chamber when hot water flows through the control tube at a predetermined flow rate. A hot water selector is placed in electrical communication with the electronic control module to dispense hot water, wherein when the hot water selector is activated the control module sends electrical signals to excite the hot water valve open, so water flows into the hot water reservoir and upward and out the hot water outlet to the dispensing outlet during use of the apparatus.

In further variations, the beverage dispensing apparatus may include a safety thermostat positioned on the external walls of the hot water tank and in electrical communication with the control module to shut off the heating element if the temperature in the hot water tank is too high. In still further variations, the apparatus includes a hot water tank, a hot water valve and a hot water line in fluid communication with the hot water dispensing outlet. Still further, an alkaline water chamber, an alkaline water valve and an alkaline water line may be placed in fluid communication with the hot water dispensing outlet, with the hot water dispensing outlet in fluid communication with at least one of a chilled water outlet, a sparkling water outlet and an alkaline water outlet.

In still further variations, the beverage dispensing apparatus has each of the outlets in fluid communication with the hot water outlet. The beverage dispensing apparatus may use a heat exchanger using a water-bath and ice-bank refrigeration device. The refrigeration device may include a chilled water reservoir having top and bottom walls and sidewalls forming an enclosed water reservoir of predetermined volume, with all walls being thermally insulated. The refrigeration device also includes a freezer expansion line having an evaporator coil inside the chilled water reservoir and connected to the chilled water reservoir sidewalls, the evaporator coil having sufficient cooling capacity during use of the apparatus to freeze water in contact with the evaporator coil and create an ice bank around a substantial majority of the freezer coils with a chilled water bath inside the ice bank. A drinking water chiller water coil is located inside the chilled water bath and inside the ice bank to chill water flowing through the chiller coil during use. One or more static, in-line carbonation devices are located inside the chilled water reservoir at a location where the carbonation devices are at least partially immersed in the water bath during use of the apparatus.

In further variations of the beverage dispensing apparatus, at least one agitator pump is provided that includes a submersible pump having a first axial flow path along a longitudinal axis of the chiller coil in an inflow direction, and having a second radial flow path orthogonal to that longitudinal axis and in the outflow direction. The beverage dispensing apparatus may include first and second agitator pumps that are each at least partially submerged in the chilled water reservoir during use, each agitator pump having first and second respective inlet ports extending along a longitudinal axis of the chiller coil and forming their inflow ports, each agitator pump having a plurality of outlets forming the outflow ports with each agitator pump's inflow and outflow ports creating a circular flow path in a portion of the chilled water reservoir.

Further variations of the beverage dispensing apparatus may include at least one agitator pump at least partially inside the chiller coil and in electrical communication with the controller and an ice contact temperature sensor located in the chilled water reservoir at a location that contacts the ice bank during use of the apparatus which sensor is also in electrical communication with the controller. During use of the apparatus the ice bank grows and contacts the ice contact temperature sensor which then sends a signal to the controller, and in response to that signal the controller activates the refrigerator device by powering off a compressor and fans of the refrigerator device when the growth of the ice-bank reaches the temperature sensor.

In still further variations, the beverage dispensing apparatus may include a normally closed, chilled water reservoir filling valve having an upstream end in fluid communication with the main water source and a downstream end in fluid communication with a chilled water reservoir fill line that is in fluid communication with the chilled water reservoir. A water level sensor is located on top of the chilled water reservoir to detect the water level in the chilled water reservoir. The chilled water reservoir filling valve and the water level sensor are each in electrical communication with the controller which has circuitry configured to open the chilled water reservoir filling valve when the water level sensor reaches a predetermined low level determined by the sensor and to close the chilled water reservoir filling valve when the water level sensor is at a maximum fill level determined by the sensor.

There is also provided a beverage dispensing apparatus for dispensing a plurality of beverages that includes a housing having a first main water inlet port in fluid communication with a water delivery pump in the housing to provide water to the delivery pump during use of the apparatus. This apparatus also includes a chilled water reservoir having top and bottom walls and sidewalls forming an enclosed water reservoir of predetermined volume, with all walls being thermally insulated. A freezer expansion line has an evaporator coil inside and connected to the chilled water reservoir sidewalls. The evaporator coil forms a figure eight configuration having a first vertical coil at a first end of the figure eight configuration and a second vertical coil at a second end of the figure eight configuration. The evaporator coils have interleaved connecting segments extending between the first and second vertical coils, the evaporator coil has sufficient cooling capacity during use of the apparatus to freeze water in contact with the evaporator coil and create a wall ice bank around at least a majority of the area of the sidewalls and to create a center ice bank extending between two opposing sidewalls of the water reservoir where the interleaved segments of the first and second freezer coils are interleaved.

This apparatus also includes a first vertical drinking chiller water coil located inside the first evaporator coil and having an upstream end in fluid communication with the water delivery pump and a downstream end in fluid communication with a dispensing outlet. A second vertical drinking water chiller coil is located inside the second evaporator coil and has an upstream end in fluid communication with the water delivery pump and a downstream end in fluid communication with a dispensing outlet.

There is also provided a hot water tank for use in a beverage dispenser apparatus having a water inlet and a hot water outlet, and a plurality of beverage selector buttons associated with different beverages, the selector buttons being in electrical communication with a controller to activate appropriate valves in the beverage dispenser to dispense the different beverages associated with the respective selector buttons through a discharge opening, and with one of the selector buttons including a hot water button. This hot water tank includes a hot water tank housing containing a hot water reservoir in a bottom portion of the housing and a vapor chamber at a top portion of the housing with a dividing wall separating the hot water reservoir from the vapor chamber, and with a discharge opening in the dividing wall, and with the housing having a water inlet at a bottom of the housing. A control tube extends from the discharge opening through the vapor chamber and through a top of the housing. The control tube has a slotted bottom encircling the discharge opening at the dividing wall. The slotted bottom has a plurality of slots configured to inhibit water that flows through the control tube at a flow rate above 1 liter per minute from also flowing through the slots while sucking any steam in the vapor chamber into the water flowing through the control tube. The slots are sized to allow steam from the hot water reservoir to enter the vapor chamber. An outlet is provided for the hot water dispensing from the apparatus, with the outlet positioned at a higher location with respect to the hot water tank housing and the control tube so that hot water is flowing out of the hot water reservoir in an upward direction. A vent tube has a first end in fluid communication with the vapor chamber and a second end outside the housing, with the second end configured to connect to a vapor line during use of the heater. An electrical resistance heater is placed in thermal communication with the hot water reservoir in the housing of the hot water tank to heat water in the hot water reservoir during use of the tank. A temperature sensor, preferably a temperature regulating thermostat having a negative temperature coefficient (NTC) sensor, is in thermal communication with the hot water reservoir.

In further variations, this hot water tank also may include a control tube having a restricted opening at its bottom in fluid communication with the hot water reservoir and having a cross-sectional area of fluid passage that is less than half the cross-sectional area of the control tube. The physical distance between the heater inside the hot water reservoir and a temperature sensor of the NTC is preferably less than 2 mm.

There is also provided a beverage dispensing apparatus having a hot water tank for use in dispensing hot water from the apparatus where the beverage dispenser has a water inlet, a hot water outlet, and a plurality of beverage selector buttons associated with different beverages such that each button is in electrical communication with a control module to activate appropriate valves in the beverage dispenser to dispense the different beverages associated with the respective selector buttons through a beverage dispensing outlet. One of the selector buttons including a hot water button. This beverage dispenser comprises a normally closed hot water valve in fluid communication with a normally closed, main valve that is in fluid communication with the beverage dispenser's water inlet with the hot water valve being in electrical communication with the control module to open and close the hot water valve. A hot water tank has a hot water reservoir in a bottom portion of the tank and a vapor chamber at a top portion of the tank with a dividing wall separating the hot water reservoir from the vapor chamber with the dividing wall having a discharge opening placing the hot water reservoir and the vapor reservoir in fluid communication. The tank has a water inlet at a bottom of the tank in fluid communication with the hot water valve and the hot water reservoir. The tank has a control tube extending from the discharge opening through a top of the tank and in fluid communication with the hot water reservoir and the vapor chamber, so water can flow into the bottom of the tank and out the top of the tank during use of the apparatus. The hot water outlet is in fluid communication with the beverage dispensing outlet through a hot water line, with the beverage dispensing outlet being above the tank's hot water outlet in the vertical direction. The control tube has a slotted bottom encircling the discharge opening at the dividing wall, with the slotted bottom having a plurality of slots extending along a length of the control tube and configured to inhibit water that flows through the control tube at a flow rate of at least 1 liter per minute or above from also flowing through the slots while sucking at least some of any steam in the vapor chamber into the water flowing through the control tube. The slots are sized to allow steam from the hot water reservoir to enter the vapor chamber. An electrical resistance heater is in thermal communication with the hot water reservoir in the tank to heat water in the hot water reservoir during use of the apparatus and the heater is in electrical communication with the control module. Also, a temperature regulating negative temperature coefficient (NTC) sensor is in thermal communication with the hot water reservoir. When the hot water valve is excited to open, water flows into the hot water reservoir and upward and out the hot water outlet to the dispensing outlet during use of the apparatus.

Further variations of this beverage dispensing apparatus include a vent tube having a first end in fluid communication with the vapor chamber and a second end outside the heater tank, with the second end configured to connect to a fluid line during use of the heater. Further a safety thermostat may be provided on the external walls of the hot tank and in electrical communication with the heater, along with a control module and an on/off switch, wherein when the temperature of the hot tank walls exceed a certain value the thermostat opens the electrical circuit avoiding the hot tank to overheat.

Still further variations of this beverage dispensing apparatus include a water deflector in the water inlet port, positioned at the bottom of the hot water reservoir And in fluid communication with a hot water valve, wherein the water deflector deviates the flow path of the incoming water when the hot water valve is open, so as to direct the incoming water towards the heater in order to avoid inlet water to directly flow through the control tube and out, without first mixing with the hot water inside the hot water reservoir, during use of the dispensing apparatus. Still further variations may include a protective stainless-steel shirt around the heater to avoid scale deposit to reduce the thermal efficiency of the heater.

There is also provided an agitator pump that may be completely submerged in a chilled water-bath inside a chilled water reservoir in a beverage dispensing apparatus, where the apparatus has a drinking water chilled coil located at least substantially inside in the chilled water-bath and an ice-bank surrounding a portion of the chilled water bath inside an insulated chilled water reservoir having an evaporator coil with refrigerant fluid that absorbs heat and forms an ice bank. The agitator pump includes a submersible pump with at least one intake port orientated to create an intake flow path during use that is oriented longitudinally with respect to the drinking water chiller coil axis to direct the water-bath surrounding the internal walls of the drinking water chiller coil, towards the inlet port of the agitator. The agitator pump has a plurality of second outlet ports oriented in an orthogonal plan with respect to the intake flow path during use, with the outlet ports extending outward with respect to an intake longitudinal axis. The plurality of outlet ports oriented in a way to direct the outflow path of the water bath towards the ice-bank and the evaporator coil. The at least one inlet port and the plurality of outlet ports cooperate during use of the agitator pump to contemporarily intake and expel the water from the water-bath of the chilled water reservoir.

In further variations, this agitator pump includes an inlet port with the intake flow of this inlet port directed vertically, wherein the agitator pump is located inside the drinking water chilled coil, which extends along a longitudinal axis and is located in the chilled water. The agitator pump has its intake port creating an intake flow path during use that extends along the same longitudinal as the longitudinal axis of the chiller coil with the intake port located inside the chiller coil. The plurality of second outlet openings are orientated outward from the longitudinal axis and create an outflow path during use, extending outward from the longitudinal axis and through the coils of the drinking water chiller coil.

In still further variations, the agitator pump has a plurality of ports oriented to direct the outflow path towards the ice-bank and the evaporator coil, but away from temperature sensors inside the chilled water reservoir. The outlet tubes are preferably connected to the outlet ports bringing the water flow from the agitator pump outlets to the ice-bank, so as to avoid the outlet water path accidentally flowing to and around the temperature sensors inside the water bath.

In still further variations, the agitator pump includes a second agitator pump, wherein the two agitator pumps have their respective inlet ports facing each other, each intake flow oriented vertically, each agitator pump having a plurality of outlet ports orientated outward from the longitudinal axis and creating a second flow path during use extending outward from the longitudinal axis, the ports in each agitator pump cooperating during use to expel chilled water through at least one outlet ports. The inlet and outlet ports are located in the chilled water reservoir to place them completely immersed in the chilled water-bath during use, and both of the two agitator pumps are located inside the same chilled water coil.

In still further variations, the agitator pump may include an ice contact temperature sensor located in the chilled water reservoir at a location that contacts the ice bank during use of the apparatus which sensor sends an electrical signal indicating when the ice bank is in contact with the sensor and when the ice bank is not in contact with the sensor. A drinking water temperature sensor may be placed inside the water bath to control the temperature of drinking water inside the chiller coil, with the sensor sending a first electrical signal to an electronic control module which activates the agitator pump in case the temperature of the drinking water is above a certain upper temperature point and sending a second electrical signal to deactivate the agitator pump when the temperature is below a certain lower temperature point.

In further variations, when the temperature of the drinking water is between the upper temperature point and the lower temperature point, the electronic control module maintains the agitator in its pre-existing conditions: working if it was working, idling if it was not working. In still further variations, the speed of the water outflow expelled varies based on the temperature of the drinking water, with the speed of the one or two agitators starting from zero when the temperature is at or below a certain lower temperature point and increasing in a proportional way as the temperature of the drinking water increases above the lower temperature point.

In still further variations, a second agitator pump as described in any of the above variations may be provided, with the actuation of each agitator pump depending upon the temperature of the drinking water with both agitator pumps working when the temperature of the drinking water inside the chiller coil is above a first predetermined value corresponding to the upper temperature point, and neither of the two agitator pumps is working when the temperature of the drinking water inside the chiller coil is below a second predetermined value corresponding to the lower temperature point, with only one of the two agitator pumps working when the temperature of the drinking water is in between the two temperature points. Preferably, the upper temperature point is 1.2° C. and the lower temperature point is 0.6° C., including a range of +/−0.5° C. from each value.

There is also provided a cup alignment device for a drink dispenser. The drink dispenser has a housing, a spigot for dispensing at least one consumable liquid, a cup support below the spigot and upon which a beverage cup may be placed to receive the liquid dispensed from the spigot and a housing wall located between the spigot and cup support and behind a vertical line between the cup support and the spigot. An illuminated light bar is connected to the housing wall and extends along a vertical path between the spigot and the cup support so that a user can visualize the path of the liquid as it is dispensed from the spigot into a cup resting on or above the cup support. A plastic shield covers the light bar is also connected to the housing wall and extends along the path to shield the light bar from the liquid during use of drink dispenser.

In further variations, the cup alignment device may include a light bar having a plurality of LEDs in electrical communication with a timer and an electrical control circuit configured to sequentially and separately activate each LED. The drink dispenser may have a plurality of spigots with separate cup support below each spigot or a continuous cup support below a plurality of spigots, with a vertical light bar extending downward along the housing wall from each spigot toward the cup holder below that spigot.

BRIEF DESCRIPTION OF THE DRAWINGS

These and other advantages and features of the invention will be better appreciated in view of the following drawings and descriptions in which like numbers refer to like parts throughout, and in which.

DETAILED DESCRIPTION

Figure 1A:
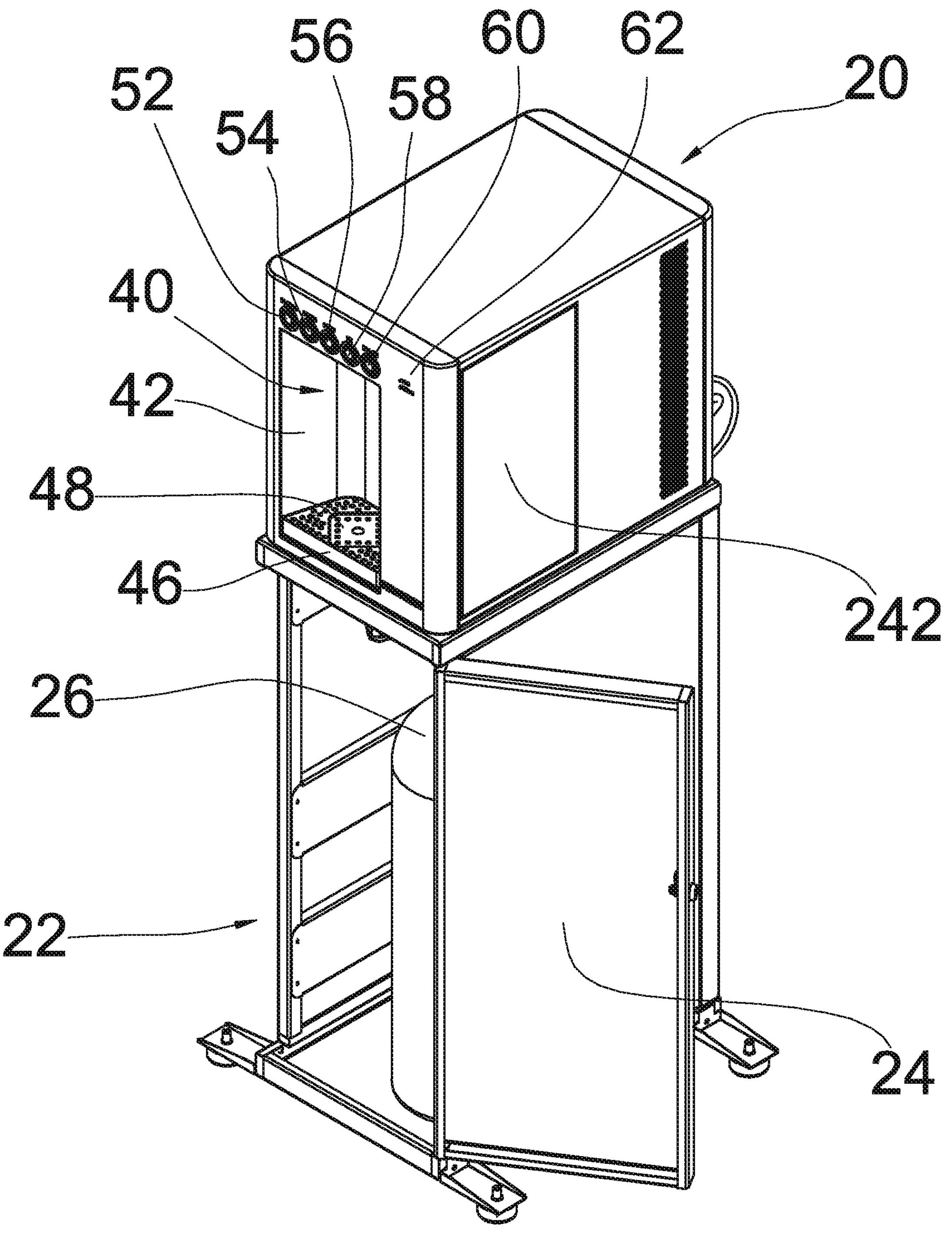
FIG. 1A a top perspective view of a drink station on a support cabinet-stand that encloses a pressurized tank of carbon dioxide gas.

As used herein, the relative terms upstream and downstream refer to the direction in which fluid flows through the various parts and fluid connections. The fluid generally flows downstream from the building water line, to the spigot, and upstream in the opposite direction.

As used herein, the following part numbers refer to the following parts: 20—drink station; 22—cabinet-stand; 24—door; 26—carbon dioxide gas tank; 28—shut-off valve of the carbon-dioxide gas tank; 30—carbon dioxide gas pressure and flow regulator; 32—water filter; 40—filling/dispensing area; 42—sidewall of the dispensing area; 44—spigot/nozzle; 46—drain pan; 48—drain grate; 50—drain pipe; 51—drain exit port; 52—carbonated water button; 54—alkaline water button; 56—chilled water button; 58—hot water button; 60—auto-fill button; 62—indicator lights; 64—controller; 68: dotted line simulating the housing of a drink station; 70—compressor; 72—freezer expansion line; 74—chilled water reservoir; 76—insulation; 77—evaporator coil; 78—condenser; 79—fans; 80—water pipeline; 82—water pre-filter; 84—water carbon-filter; 86—water inlet port; 88—flow meter; 90—main valve; 92—water delivery pump; 94—drinking water chiller coil; 96—chilled water valve; 97—chilled water electrical communication line; 98—chilled water line; 99—water drain outlet on drink station housing; 100—ambient water valve; 102—alkaline cartridge; 104—alkaline water line; 105—alkaline water electrical communication line; 108—internal carbon dioxide canister; 110—carbon dioxide gas inlet port; 112—carbon dioxide gas valve; 113—carbon dioxide gas electrical communication line; 114—carbon dioxide gas line; 116—carbonated water valve; 118—first splitter; 119—second splitter; 120—carbonator device; 121—second carbonator device; 122—carbonated water line; 124*a,b*—check valves; 126—drain line in chilled water reservoir; 130—internal water filter; 132—chilling water coil splitter; 134—first carbonation water line; 138—second carbonation water line; 140—first connector gas-liquid; 142—second connector gas-liquid; 144*a,b*—venturis; 146—main power switch; 147—filter reset button; 148—power reset button; 150—hot water valve; 152—hot water tank; 154—heater; 156—temperature sensor; 158—thermistor; 160—hot water line; 162—vapor line; 163—heater electrical communication line; 164—hot water off switch; 166 child safety switch;

170—agitator pump; 171—electrical motor; 172—intake port; 174—outlet openings; 175—agitator pump electrical communication line; 178—ice bank; 180—ice temperature sensor; 182—drinking water temperature sensor; 183—temperature sensor electrical communication line; 186—outlet tube; 188—water level sensor; 190—float; 192—shaft; 194—water level; 196—chilled water reservoir filling valve; 198—filling line; 200—capillary tube; 202—dryer; 204—main power inlet electrical connection; 206 transformer; 210—alkaline cartridge housing; 212—cartridge cap; 214—inlet; 216—outlet; 218—cammed mounting lugs; 220—nozzle of the alkaline cartridge; 222—inlet disk; 224—bed of alkaline material; 226—filter membrane; 228—bed of activated charcoal; 230—outlet disk; 232—bottom of cartridge; 234—central tube; 240—manifold; 242—door of the drink station; 244—manifold inlet port; 246—manifold outlet port; 248—manifold cartridge inlet; 250—manifold cartridge outlet; 260—hot tank's housing; 261—insulation; 262—hot water reservoir; 264—vapor chamber; 274—dividing wall; 276—control tube; 278—slotted end; 280—slots opening; 282—vent opening; 284—restrictor opening; 286—seating recess; 288—vent tube; 290—water inlet; 292—deflector; 294—hot water drain fitting; 296—mounting bracket; 298—hot water tank drain on the drink station housing; 322—first chamber input port; 324—first chamber output port; 325—first glass beads; 326—second chamber input port; 327—cartridge; 328—second chamber output port; 329—base; 333—glass beads second chamber; 334—first micromesh net; 336—second micromesh net; 350—drink alignment; 352—light bar; 354 drink cup; 356—LED; 401—figure eight evaporator coil; 402—first tubular coil; **402*a*—first side of coil 402; 402*b*—opposing side of coil 402; 402*c*—joining side of coil 402; 402*d*—connecting segment of coil 402; 404—second tubular freezer coil; 404*a*—first side of coil 404; 404*b*—opposing side of coil 404; 404*c*—joining side of coil 404; 404*d*—connecting segment of coil 404; 406—water reservoir; 408*a*—first reservoir side wall; 408*b*—second reservoir side wall; 408*c*—first reservoir end wall; 408*d*—second reservoir end wall; 408*e*—bottom reservoir wall; 410—insulation; 411*a*—inlet; 411*b*—outlet; 412—first chilled water reservoir; 414—second chilled water reservoir; 416—wall ice bank; 418—center ice bank; 419—outlet of water booster reservoir; 420—inlet of water booster reservoir; 422—first drinking water chiller coil; 424—second drinking water chiller coil; 426—water inlet valve; 428**—leak detector.

As used herein, the relative directions above and below, top and bottom, upstream and downstream are with respect to the vertical direction when the container shown in FIGS. 1 and 2 rests on a horizontal surface. Thus, the opening in the top of the container is above the closed bottom of the container and that opening is upstream of the container's bottom as fluid flows downstream from the top to the bottom. The relative directions inner and outer, inward and outward are with respect to the longitudinal axis of the container. Thus, the container's sidewall is outward of the container's longitudinal axis. As used herein, a majority refers to over 50%, a substantial majority refers to over 80% and substantially all refers to 95% or more. As used herein, "fluid" includes gases dissolved in or carried in liquid.

Figure 1B:
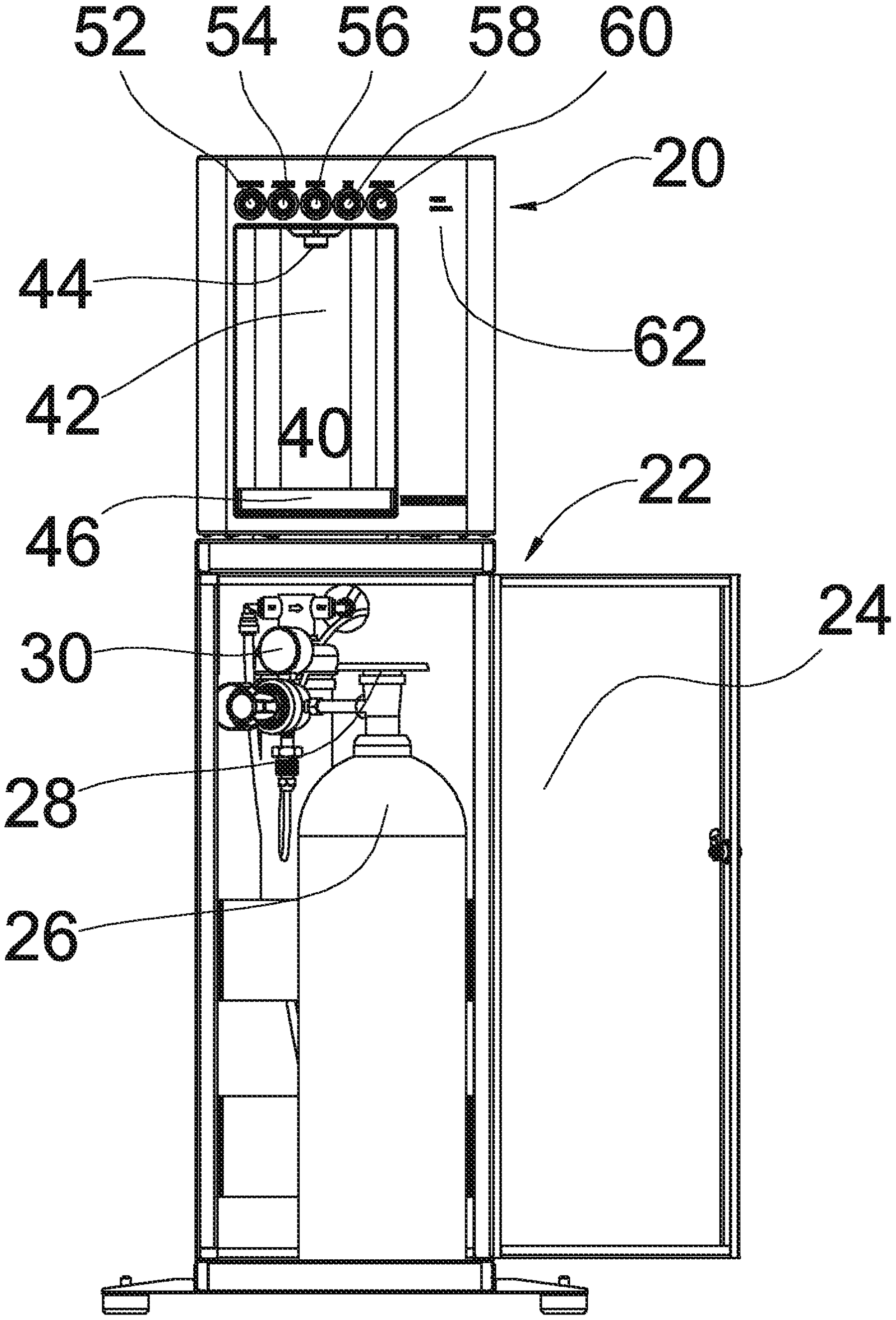
FIG. 1B is a front view of a drink station on a support cabinet-stand of FIG. 1A.
Figure 1C:
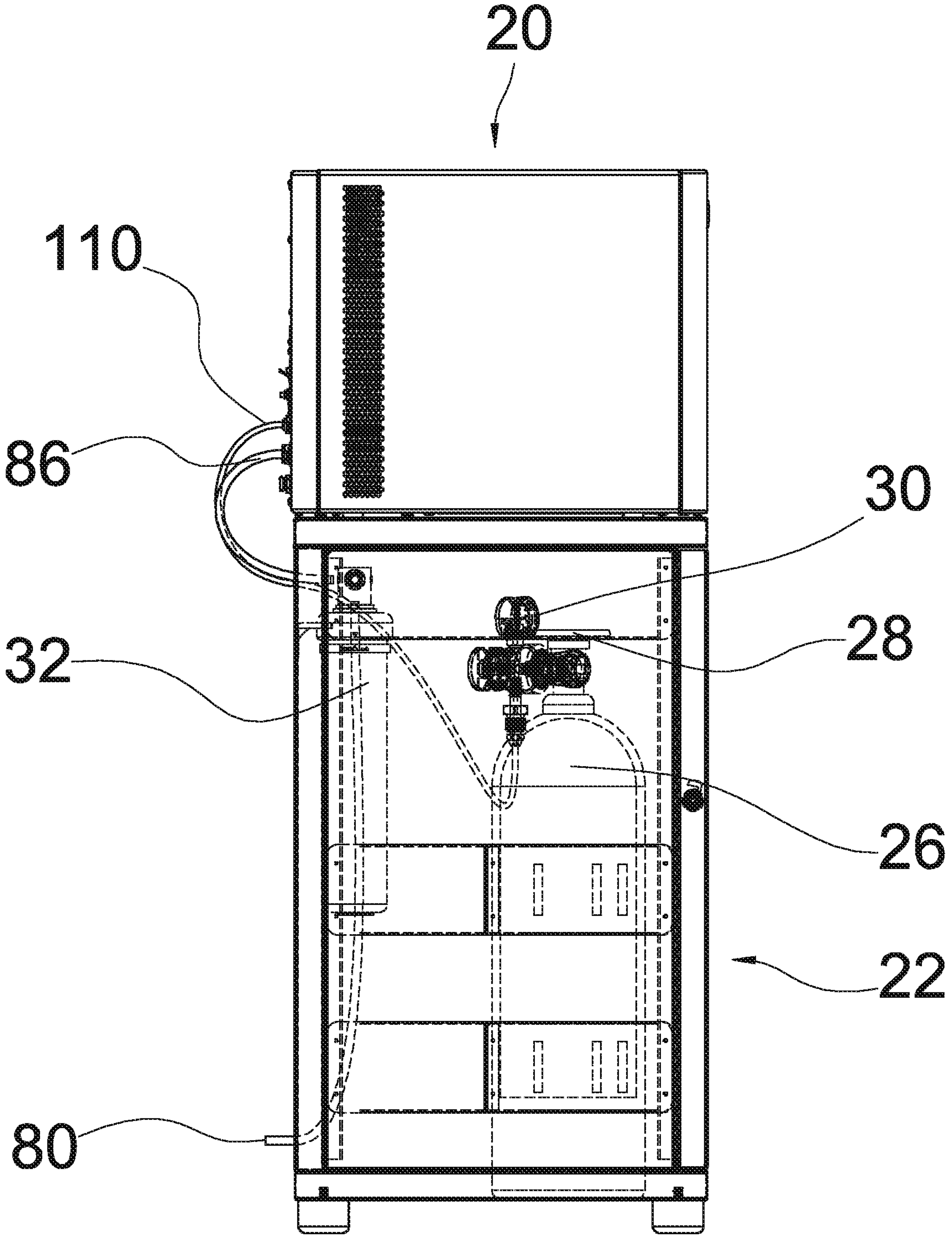
FIG. 1C is a left side view of the drink station and cabinet-stand of FIG. 1B.

Referring to FIGS. 1A-1C, a drink station 20 is shown placed on top of a cabinet-stand 22 with door 24. The cabinet-stand has legs that rest on a floor. The cabinet-stand 22 encloses a carbon dioxide tank 26 having on/off (or open/closed) valve 28 and a carbon dioxide gas pressure and flow regulator 30. Water filters 32 are located inside the cabinet/stand 22 and behind the carbon dioxide gas tank 26. The gas tank 26 and water filter 32 are in fluid communication with the drink station 20 as described later.

The drink station 20 has a filling/dispensing area 40 that is preferably recessed into a front side of the drink station. The filling area 40 has a top and bottom joined by a sidewall 42 that is typically vertical. A dispensing outlet, referred to as spigot (or nozzle) 44 for convenience (but not by way of limitation), is at the top of the filling area and a drain pan 46 at the bottom of the filling area. The drain pan 46 takes the form of a container with an open top over which a drain grate 48 is removably placed. The drain pan 46 is in fluid communication with a drain line during use, typically by a drainpipe 50 (FIG. 1D), connected to the bottom of pan 46. The drain pipe 50 is attached to the base plate of the drink station and has a connection 51 where a removable drain tube can be connected in fluid communication with a building drain line.

Above the top of the filling area 40 are a plurality of pushbuttons or touch-buttons in electrical communication with internal components described later that result in dispensing different beverages from the spigot 44 of the drink station. The depicted embodiment has push or touch button 52 for dispensing carbonated water, button 54 for dispensing alkaline water, button 56 for dispensing chilled water, button 58 for dispensing hot water, and button 60, the auto-fill button, for automatically filling a pre-determined volume (a calibrated quality) of water on a cup, bottle or container from the drink station. One or more indicator lights 62 may be provided to provide a visual indication related to the fluid being dispensed through the spigot, such as whether the water is hot, the water filter lifespan is terminated and other usage information. The touch buttons may be physically movable and displaceable buttons to send activating signals, or touch screen buttons using contact between two adjacent sheets to send activating signals, or other types of buttons that send signals when pressed.

The electrical communication of each dispenser button or activator 52, 54, 56, 58, 60 with the component or components used to dispense the selected type of beverage, is achieved through electrical communication with a controller 64, whose functioning is later described in FIGS. 11A through 11E, which may be implemented by one or more printed circuit boards with electrical control circuits. The electrical communications are preferably communicated through insulated and grounded electrical wires. The controller 64 is also referred to herein as control module 64.

Figure 2A:
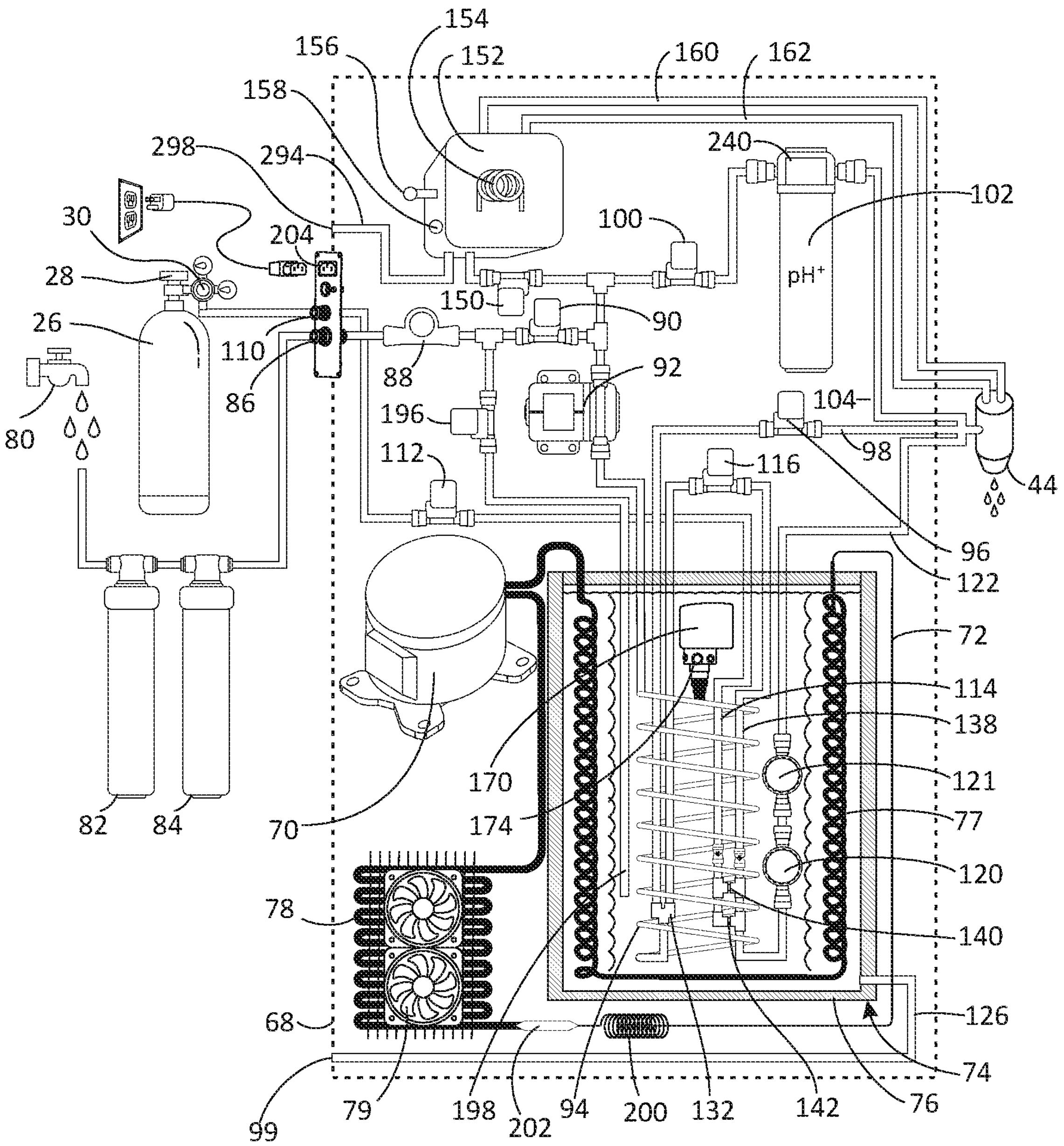
FIG. 2A is a diagram showing the fluid connections of the drink station, including the freezer system.
Figure 2B:
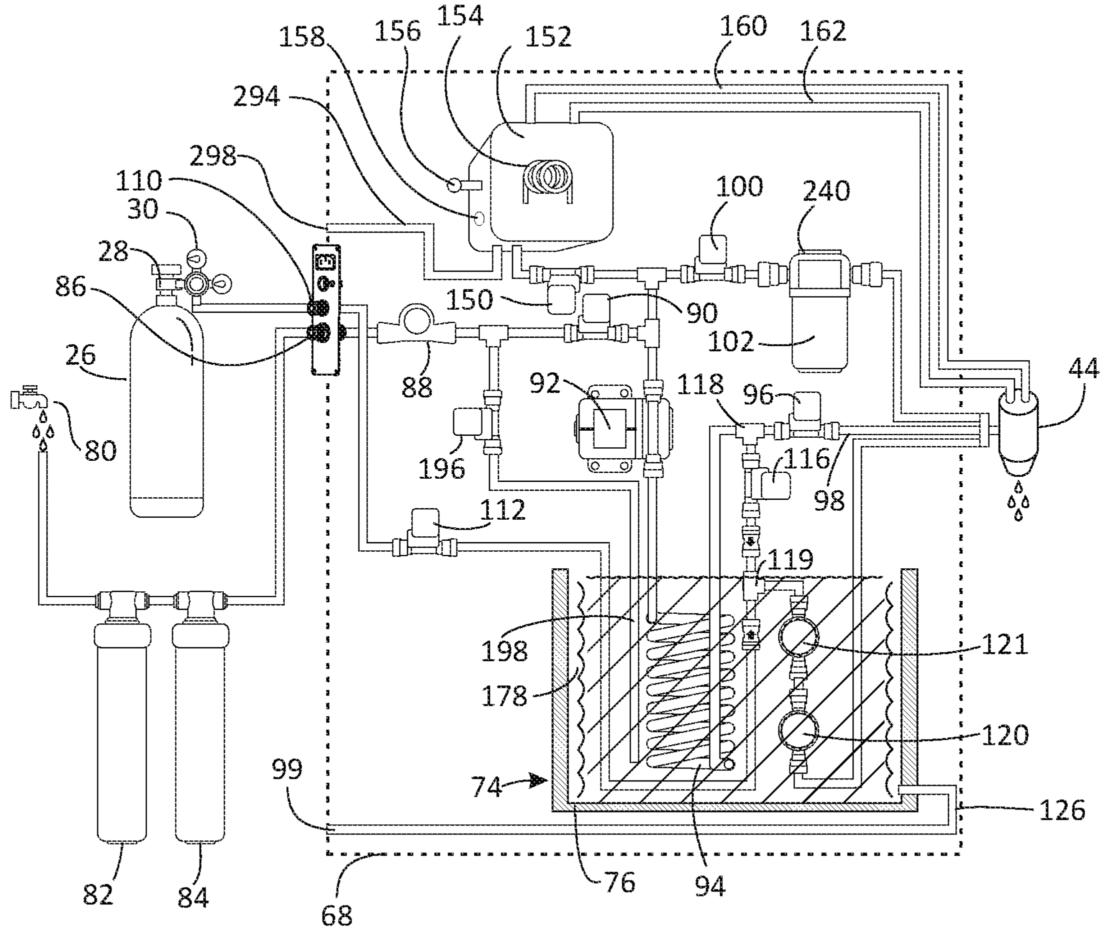
FIG. 2B is a simplified plumbing diagram of FIG. 2A, showing the fluid connections of the drink station with the freezer system removed.
Figure 2C:
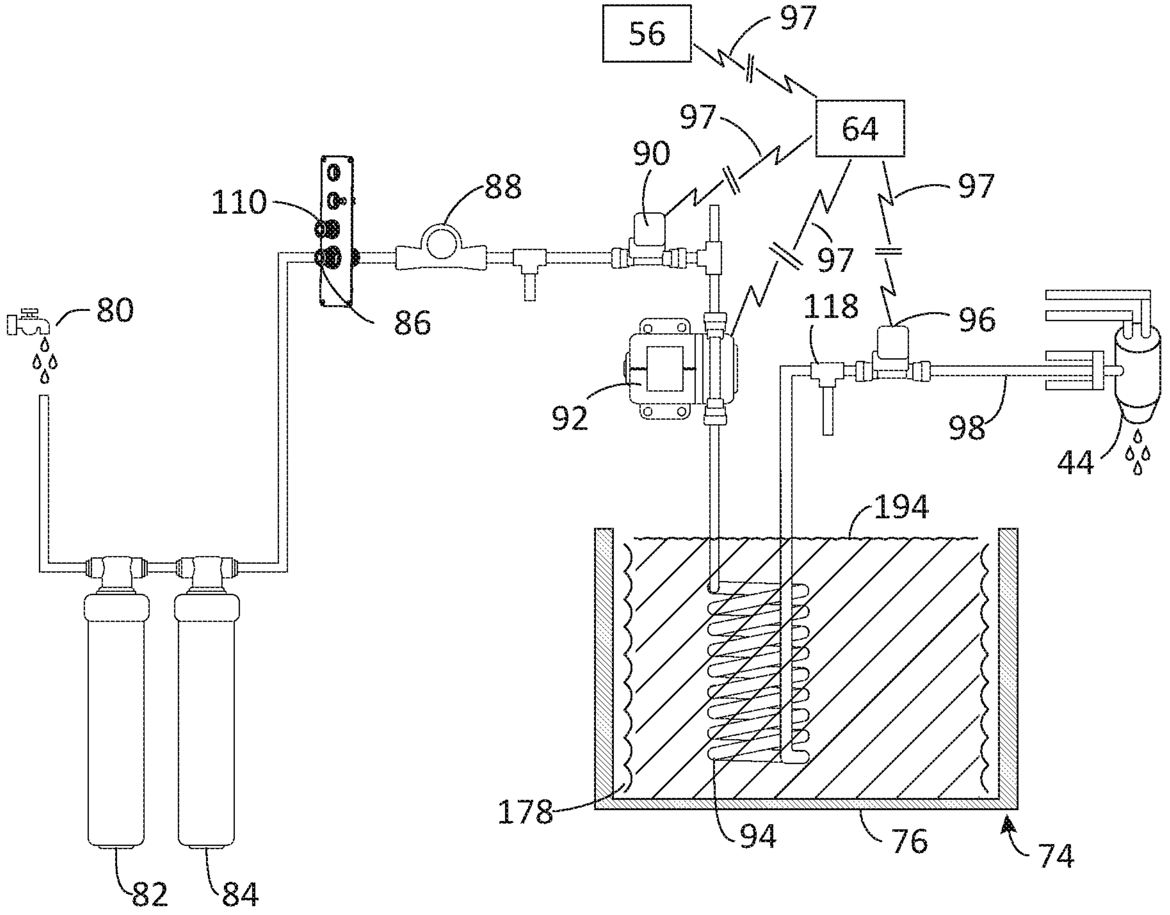
FIG. 2C is a simplified diagram of FIG. 2B, showing a chilled water line only.

Referring to FIGS. 2A-2C, dispensing chilled water is discussed first. FIGS. 2A-2B show the various fluid connections for dispensing the various types of water from the spigot 44, with FIG. 2B simplified so it does not show the refrigeration or freezer unit that chills the water, and with FIG. 2C showing those fluid connections related to dispensing chilled water from the spigot. The dashed line 68 enclosing portions of FIGS. 2A-2B indicate those fluid connections and components contained inside the drink station 20.

A compressor 70 compresses any suitable refrigerant to create a cold fluid for the refrigeration system that freezes a portion of the water-bath inside a reservoir. The refrigerants are usually rapidly expanded through a nozzle to reduce the temperature of the expanding refrigerant that passes through the freezer expansion line 72. The refrigerant line 72 may pass into and out of the chilled water reservoir 74 through sealed openings located at the top of the chilled water reservoir that are conceived in such a way as to prevent the passage of the water-bath from inside the reservoir and prevent any spillage if the drink station is moved. The chilled water reservoir 74 is typically a watertight, container defining a volume that is filled with a suitable fluid such as water that forms an ice-bank. The chilled water reservoir 74 advantageously has insulation 76 placed over the various laterally located sides or walls, top lid or cover, and bottom, of the chilled water reservoir 74.

The chilled water reservoir 74 is sealed in order to reduce heat-dispersion and increase its efficiency, it forms a fluid tight container and does not have a lid or cover that may be readily removed without at least unfastening a plurality of threaded fasteners. A cover with star drive fasteners holding the cover to the reservoir body may be used, or the reservoir may be permanently sealed. The freezer expansion line 72 typically forms a serpentine path around the inner walls of the reservoir creating an evaporator coil 77—to increase the heat transfer from the cold freezer lines to the walls of the reservoir and freeze the water bath in contact with the coils of the evaporator coil 77.

After passing through the chilled water reservoir, the refrigerant in the freezer line 72 enters the suction line and then is compressed by the compressor 70, after being compressed and returning to its liquid form, it passes through the condenser 78 which typically has one or more fans 79 blowing cooling air over the condenser 78.

The freezer expansion line 72 freezes a portion of the water in the chilled water reservoir 74 forming an ice-bank in proximity of the evaporator coil 77 and maintains the remainder of the liquid water in the reservoir (the water-bath) at a temperature that is preferably near, but above freezing so that the water bath in the reservoir does not freeze solid. The chilled water inside the chilled water reservoir 74 may be circulated to reduce localized freezing and to improve chilling as described later. Stirrers, water jets, moving paddles or rotating propeller-type blades may be used to circulate the water-bath in the chilled water reservoir.

Referring to FIGS. 2A-2C, the fluid path for dispensing chilled water is shown. A source of water, preferably a municipal water line connection 80 is reflected in the figures by a representative faucet. The source of line water 80 is in fluid communication through various tubes and pipes known in the art, with a prefilter 82 removing selected impurities of predetermined particle size or other content, from the water, and a water carbon-filter 84 removing further impurities, often impurities affecting taste. Any type of pre-filter 82 or water filter 84 may be used. Activated carbon filter media may be used in either filter 82 or 84. The specific tubing or pipes placing the various components in fluid communication are not described in detail herein as such tubing, pipes and fluid tight connections are known in the art. As reflected in FIG. 2A, the prefilter 82 and filter 84 may advantageously located outside of the drink station 20. The filters are typically located inside the cabinet-stand 22 so they are adjacent the drink station.

Figure 1D:
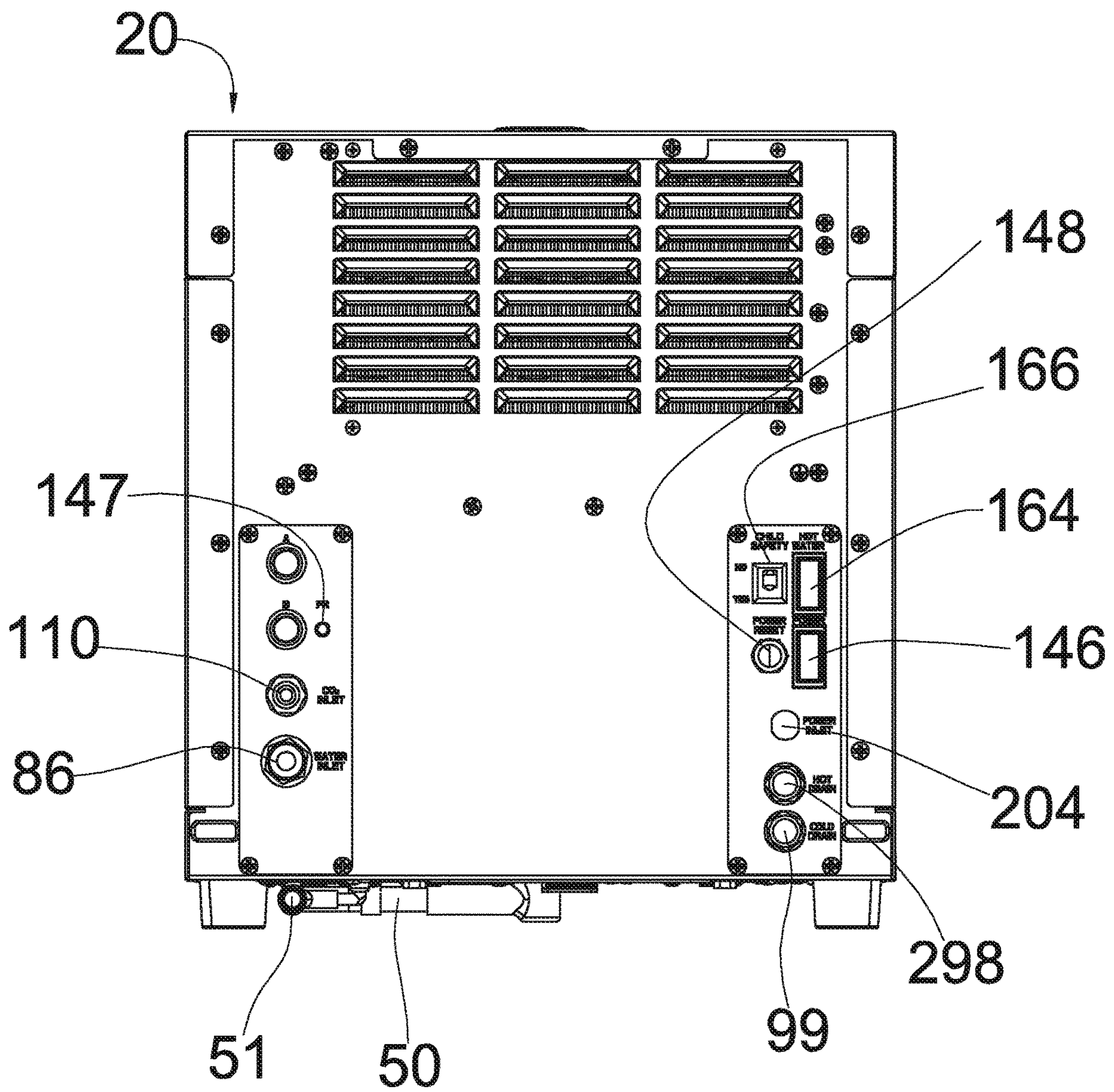
FIG. 1D is a back view of the drink station of FIG. 1B.

Referring further to FIGS. 2C, 1C and 1D the filtered water is placed in fluid communication with a water inlet port 86 on the drink station 20, at the back of the drink station. A flow meter 88 is in fluid communication with the water inlet port 86 and located upstream of any other fluid connections and immediately downstream of the water inlet port 86. But the flow meter could be located elsewhere, and for example could be located at or immediately upstream of the spigot 44. Moreover, the flow meter may be any type of flow meter, but the meter is in electrical communication with the controller 64 to monitor the volume of water passing into and being dispensed by, the drink station. The flow meter 88 is placed in fluid communication with a main valve 90 that can open or close to regulate fluid flow through the drink station. The main valve 90 is preferably a normally closed valve that blocks fluid flow through the valve and opens only when beverages are dispensed. The main valve 90 is in fluid communication with a water delivery pump 92 which pumps water to a drinking water chiller coil 94 immersed in the water-bath inside the chilled water reservoir 74. The chiller coil 94 lowers the temperature of the drinking water, but advantageously does not freeze the drinking water in the chiller coil as that could clog the coil preventing the drinking water to be dispensed. The drinking water chiller coil 94 is typically of stainless steel to reduce oxidation, scale buildup and avoid contamination. The downstream end of the drinking water chiller coil 94 is in fluid communication with a chilled water valve 96 that regulates the flow of chilled water to the spigot 44 through chilled water line 98. The chilled water valve 96 is preferably a normally closed valve. The chilled water valve 96 is normally in a closed position to block fluid flow through the valve. Advantageously, as shown in FIG. 2C, the chilled water valve 96, the main valve 90, the delivery pump 92 and chilled water button 56 are in electrical communication to open the valve 90 and 96, power the delivery pump 92 and dispense chilled water from the spigot 44. Therefore, the chilled water valve 96, main valve 90, delivery pump 92 and chilled water button 56 are in electrical communication with controller 64 through electrical communication lines 97 (FIG. 2C), to control the opening and closing of the appropriate valves to dispense chilled water from the spigot 44.

A cold water drain line is in fluid communication with drain in the bottom of the chilled water reservoir, which is in fluid communication with a cold water drain outlet 99 (FIG. 1D, 2A, 2B) to allow the chilled water reservoir 74 to be emptied of water for cleaning, maintenance, moving the drink station or other reasons. The cold water drain outlet 99 is shown as located on the back of the drink station 20 but other locations could be used.

The flow meter 88 measures the volume of fluid or water entering the drink station and sends signals reflective of that information to the control module 64. The main valve 90 can stop or allow all flow through the fluid chilled water button 56 on the drink station. The delivery pump 92 pressurizes the fluid lines so water flows through the fluid lines depending on which valves are opened or closed in various combinations. The water delivery pump 92 pumps or forces water at a predetermined pump pressure through various fluid lines of the drink station, including through the drinking water chiller coil 94, while the chilled water valve 96 regulates the flow of chilled (and filtered) water through the spigot 44. The chilled water valve 96 is actuated by various means, including electrical, pneumatic, or mechanical. Preferably, the chilled water valve 96 is an electrically actuated valve in electrical communication with the button 56 so that a user may press the button and the chilled water valve 96 will open to dispense chilled water to the spigot 44 for as long as the button maintains electrical communication, or for a predetermined time interval determined by an electrical circuit, or until a weight sensor or a proximity sensor, or a volume level sensor positioned below the drink container to send a shut-off signal when the sensor indicates the weight reaches a predetermined level or the sensor reaches a termination level, or a proximity position.

Figure 2D:
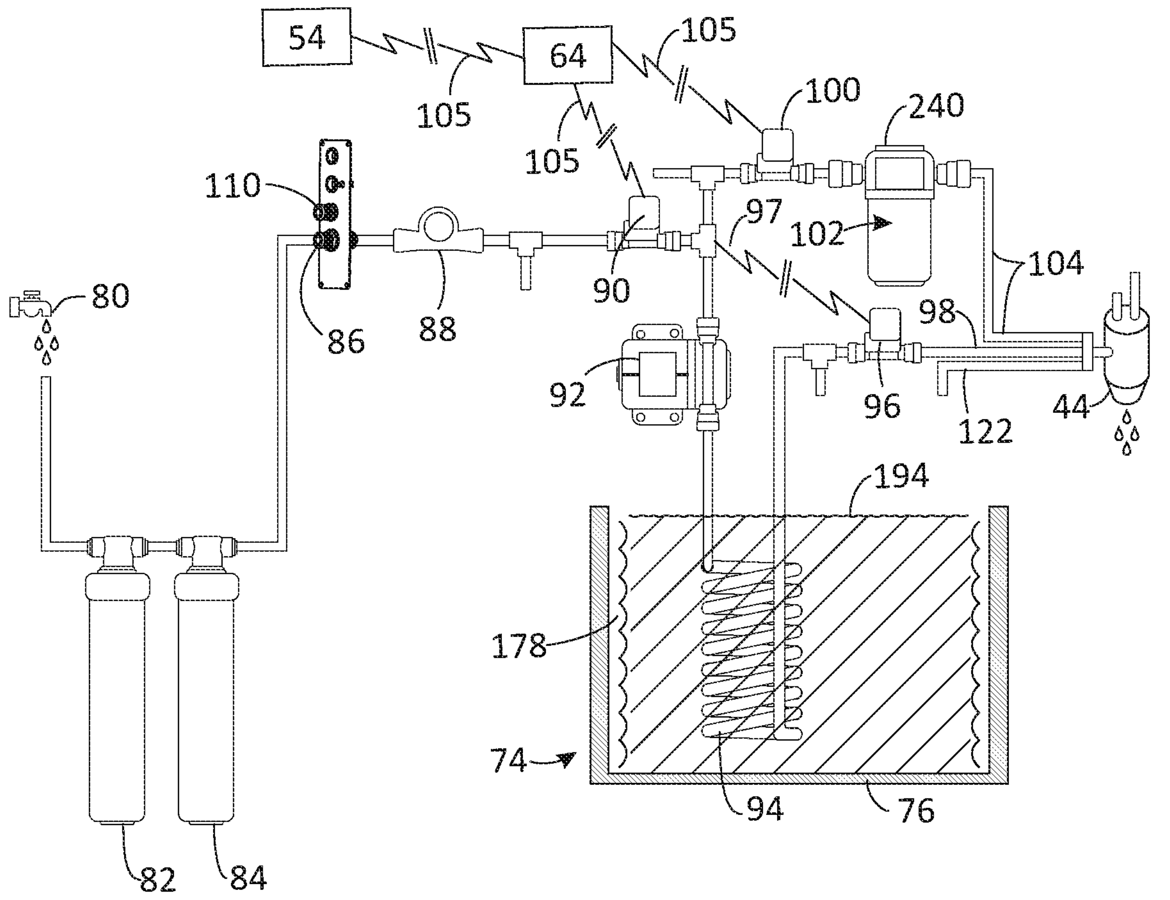
FIG. 2D is a simplified diagram of FIG. 2B, showing an alkaline water line with the chiller water line.

Referring to FIGS. 2A, 2B and 2D, the fluid paths and parts are disclosed for dispensing alkaline water when the alkaline button 54 is pressed. Water flows from the line source 80, through filters 82, 84 and inlet port 86 and flow meter 88 and main valve 90, to an ambient water control valve 100. The valve 100 is preferably a normally closed, ambient water valve 100 that passes the filtered line water to an alkaline cartridge 102 which is in fluid communication with the spigot through an alkaline water line 104. The alkaline cartridge 102 makes the filter line water alkaline, by adding one or more dissolved alkaline minerals or electrolytes, including, but not limited to, calcium magnesium, potassium, manganese, iron, phosphorous, sodium and zinc or by otherwise raising the pH of the incoming drinking water to make the water less acidic, resulting in a pH between 7.2 and 10.5. The alkaline cartridge is described later regarding FIGS. 2D and 5. The fluid line out of the main valve 90 advantageously flows through one or more fluid splitters, preferably through a T intersection with a first fluid channel in fluid communication with the drinking water chiller coil 94, and a second fluid channel in fluid communication with the ambient water valve 100 and the alkaline cartridge 102.

Figure 11A:
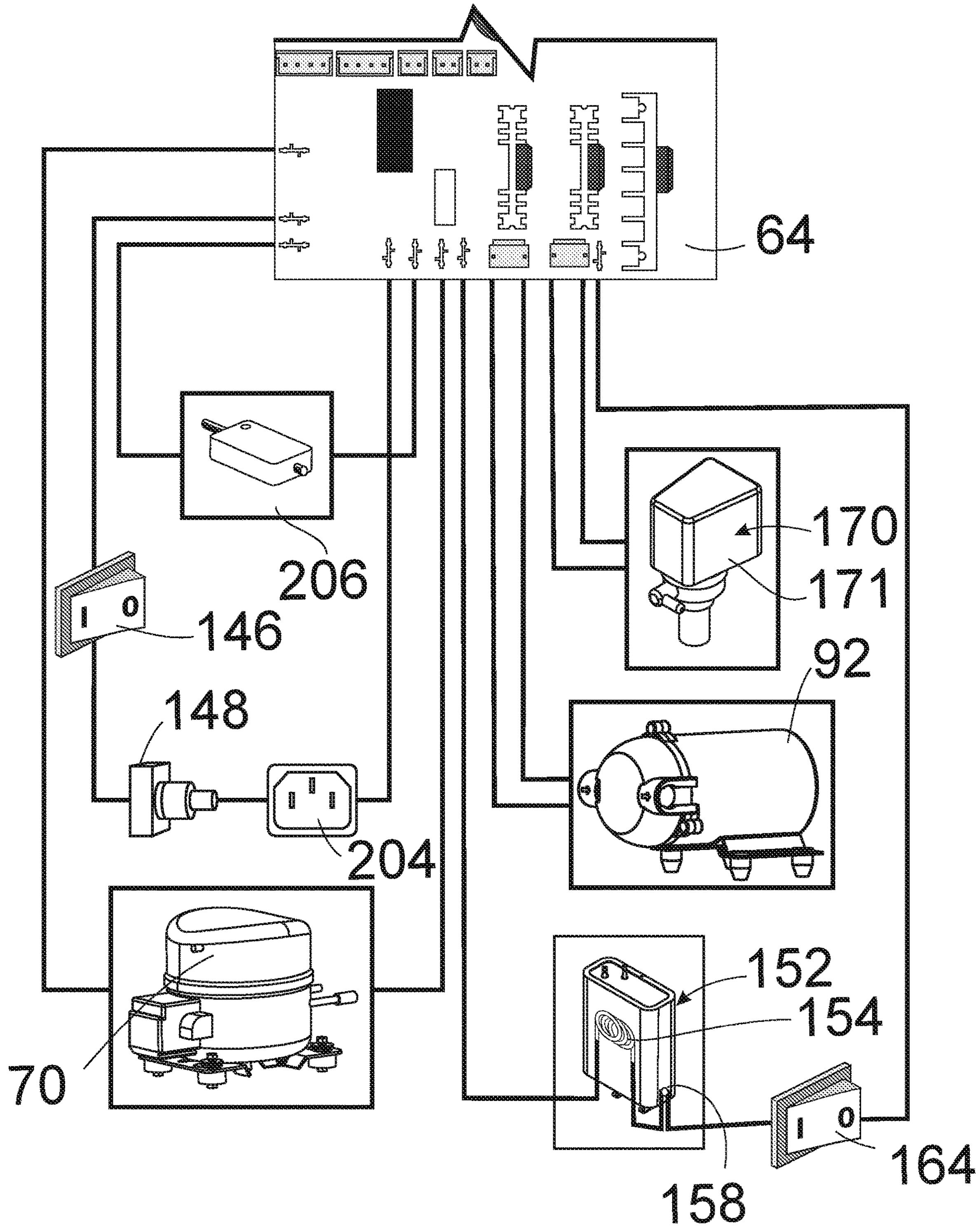
FIG. 11A is a schematic illustration of a control circuit for the various components of the drink station.
Figure 11B:
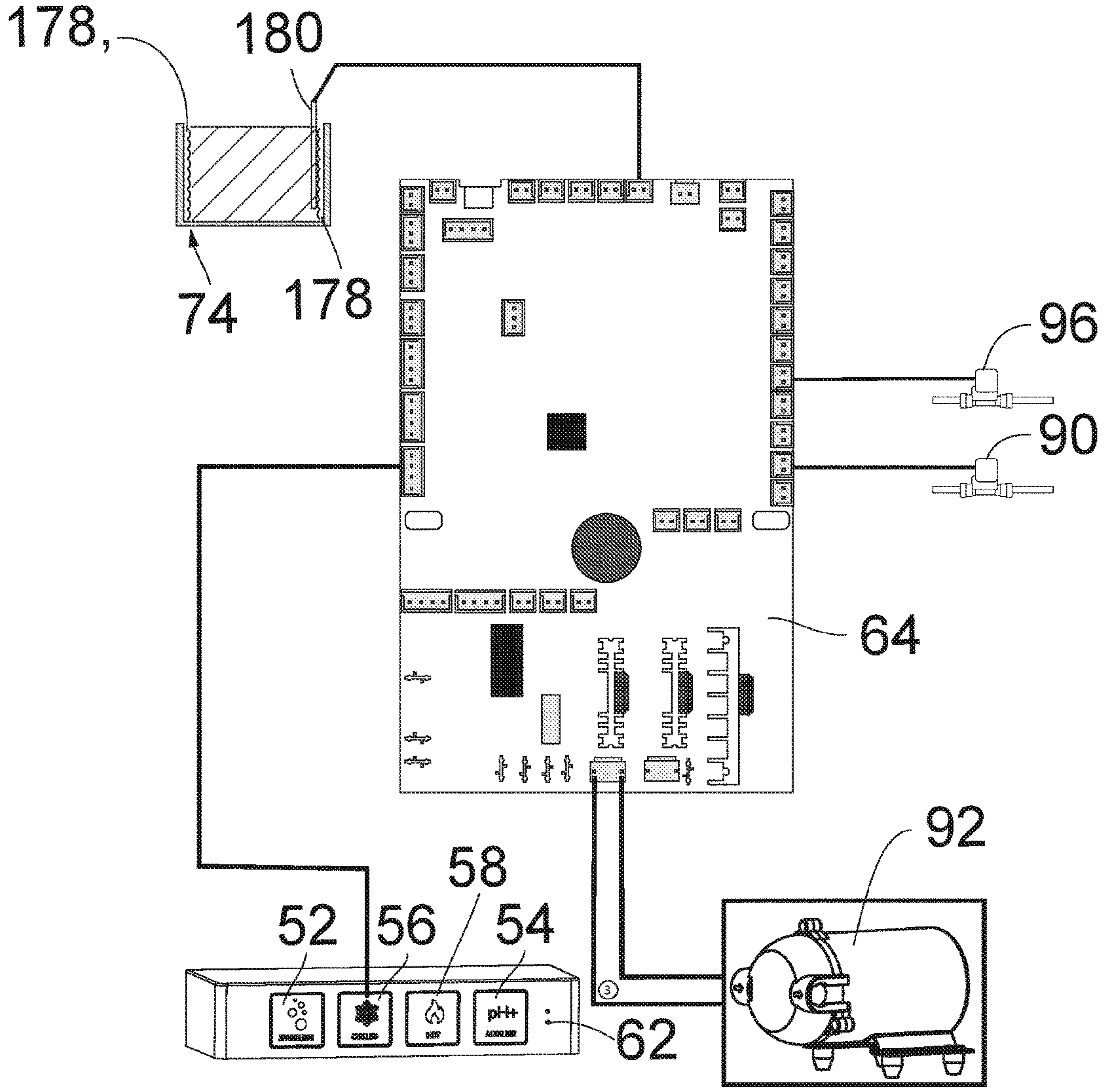
FIG. 11B is a schematic illustration of a control circuit for providing chilled water.
Figure 11C:
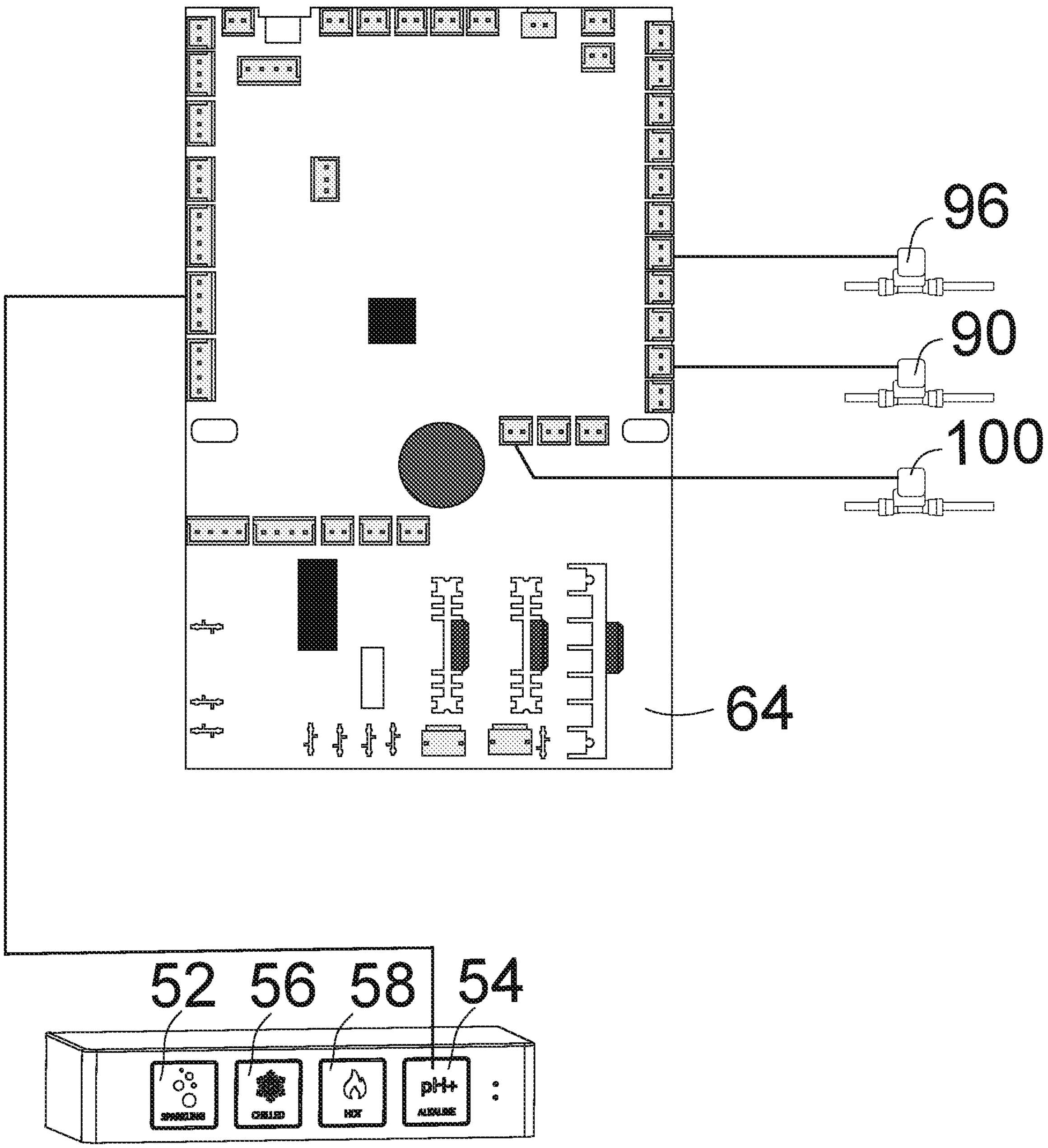
FIG. 11C is a schematic illustration of a control circuit for providing alkaline water.
Figure 11D:
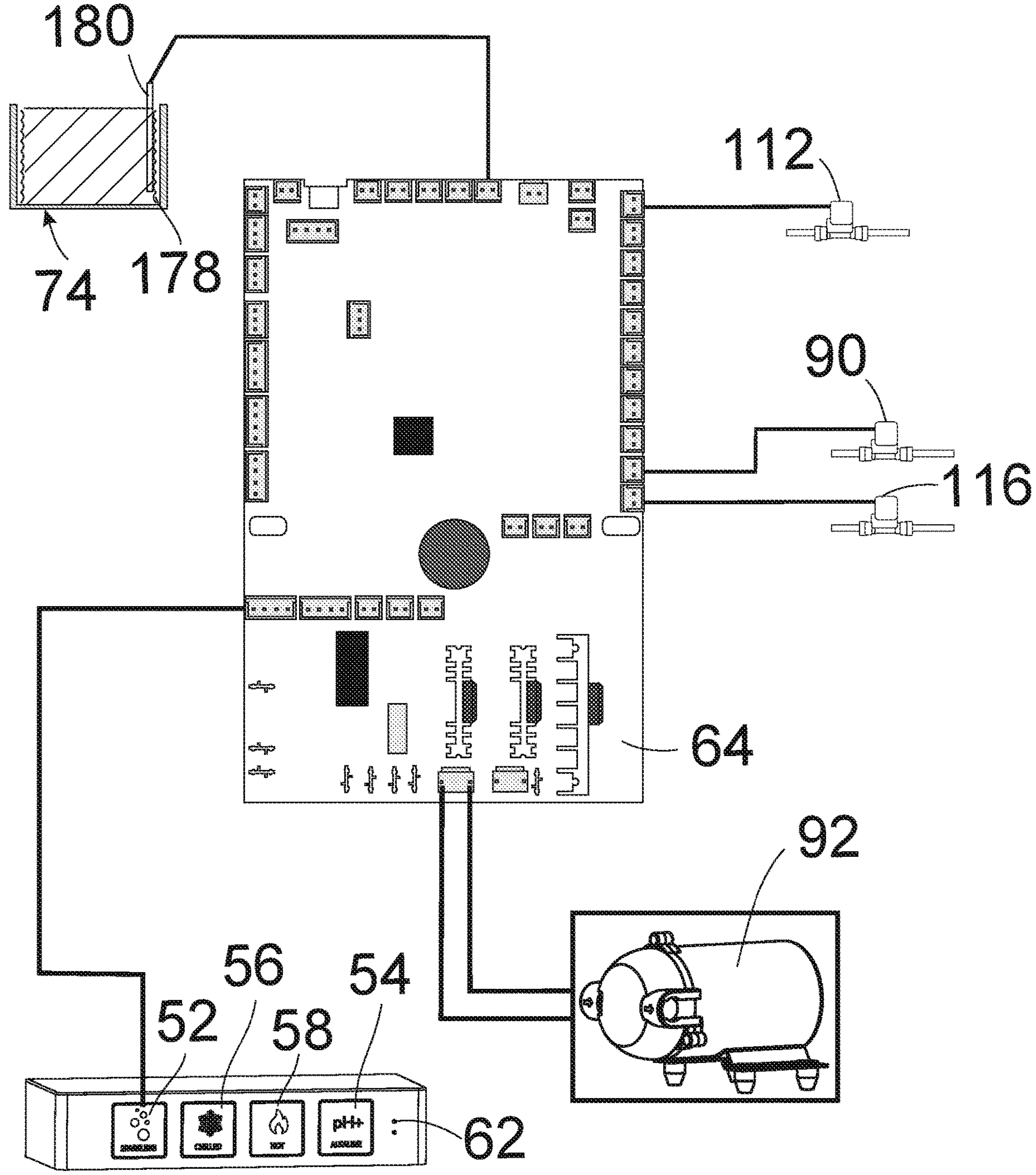
FIG. 11D is a schematic illustration of a control circuit for providing carbonated water.

Referring further to FIGS. 2D, 11A and 11C, the ambient water valve 100 opens or closes so the filtered water at room temperature flows into and through the alkaline cartridge 102. The ambient temperature water dissolves the alkaline minerals faster than does chilled water. The ambient water valve 100 may be actuated by various means, including electrical, pneumatic, or mechanical. Preferably, the ambient water valve 100 is an electrically actuated valve in electrical communication with the alkaline button 54 so that a user may press the button and the ambient water valve 100 will open to force ambient temperature water through the alkaline cartridge 102 and out the spigot 44 for as long as the button maintains electrical communication, or for a predetermined time interval determined by an electrical circuit, or until a weight sensor positioned below the drink container, or a volume level sensor or a proximity sensor to send a shut-off signal when the sensor indicates the level of the dispensed water reaches a predetermined weight threshold, or the sensor reaches a termination level, or proximity position.

Advantageously, the controller 64 opens both the ambient water valve 100 and the chilled water valve 96 so that both alkaline water and ambient temperature water are dispensed at the spigot at the same time. The relative time that the alkaline control valve 100 is left open or closed, compared to the relative time that the chilled water control valve 96 is left open or closed, with adjust both the temperature of the water dispensed by the spigot 44 and the amount of alkalinity. The addition of chilled water to the ambient alkaline water achieves cooler but less alkaline water than if only alkaline water was dispensed.

The ambient water valve 100 and the chilled water valve 96 and the main valve 90 and the alkaline activation button 54 are in electrical communication to open the appropriate valves and simultaneously dispense alkaline water and chilled water from the spigot 44. The taste of alkaline water is believed improved if consumed below ambient temperature, and preferably if 6° F.-15° F. below room temperature, and more preferably served between 50° F.-70° F. Adding alkaline water to chilled water, or vice versa, may adjust the temperature as desired.

The ambient water valve 100 is in electrical communication with controller 64 through alkaline electrical communication line 105 (FIG. 2D), to control the opening and closing of the appropriate valves to dispense chilled water from the spigot 44, with the other described valves being in electrical communication through dedicated alkaline water lines or through chilled water electrical communication lines 97. The controller 64 may contain a timer circuit to dispense relative amounts of alkaline water and chilled water to achieve a desired temperature based on the sensed temperature of the chilled water in the chilled water reservoir, and either the ambient temperature, or the sensed temperature of the alkaline water, or an assumed temperature of the alkaline water. Advantageously the pump 92 is not activated during dispensing of alkaline water so that the line pressure of the water source 80 forces water through the alkaline cartridge and out the alkaline line. But the pump 92 could be activated if desired, but preferably at a lower flow rate than used for chilled water, advantageously from 10% to 30% the flow rate used for dispensing chilled water. The various temperature sensors technically sense various parameters that may be directly or indirectly correlated with the temperature, rather than directly measuring or sensing the temperature itself. As used herein, references to detecting, measuring or sensing the temperature includes detecting, measuring or sensing parameters correlated with temperature.

In a further variation, the alkaline cartridge 102 may be omitted or bypassed in the manifold 240, so that ambient temperature water flows through the ambient water valve 100, and out what is normally the alkaline water line 104, so as to dispense filtered, ambient temperature water at the spigot 44. If the alkaline cartridge 102 and manifold 240 are omitted, then the alkaline water line 104 is more aptly referred to as an ambient water line.

Figure 2E:
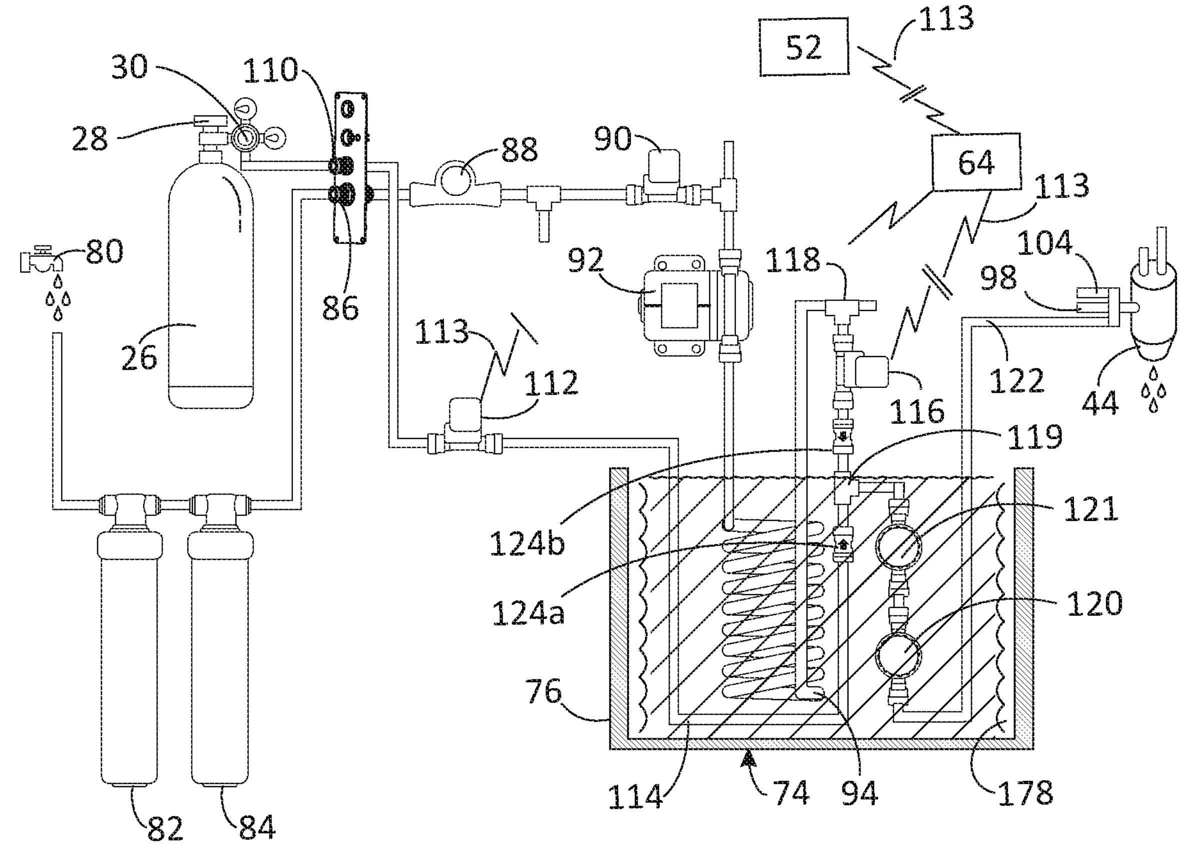
FIG. 2E is a simplified diagram of FIG. 2B, showing a carbonated water line using a carbonation mechanism.

Referring to FIGS. 2B, 2E, 11A and 11D, the fluid paths and parts are disclosed for dispensing carbonated or sparkling water when the carbonated water button 52 is pressed, with the carbonation added by carbon dioxide gas in a pressurized container 26. As before, water flows from the line source 80, through filters 82, 84 and inlet port 86 and flow meter 88 and main valve 90. The carbon dioxide gas tank 26 is in fluid communication with carbon dioxide inlet port 110 on the drink dispenser 20, with the port preferably located on a back side of the drink station. The carbon dioxide inlet port 110 is in fluid communication with a carbon dioxide valve 112 located inside the drink station and in communication with the carbonated water button 52 to regulate the amount of carbon dioxide from canister 26 passing through the valve. The carbon dioxide valve 112 is a normally closed, valve in electrical communication with a controller 64 and the carbonated dispensing button 52 through carbon dioxide electrical communication line(s) 113 (FIG. 2E). The carbon dioxide valve 112 is in fluid communication with a carbon dioxide chilling line 114 that passes through (into and out of) the insulation 76 on the wall of the chilled water reservoir 74 and through the chilled water inside the reservoir to place the carbon dioxide valve in fluid communication with a carbonation valve 116 that is also in fluid communication with the chilled water line. The carbonation valve 116 is a normally closed valve in electrical communication with a controller 64 to open and pass fluid to the spigot when the carbonation button 52 is pressed. The controller 64 is in electrical communication with the main valve 90 as previously described.

A first splitter 118 is upstream of the chilled water valve 96 (FIG. 2E) and is in fluid communication with the carbonated water valve 116 to regulate the volume of chilled water that intersects with the chilling carbon dioxide gas line 114 at a second splitter connection 119, such as a T-joint, to mix the chilled water and chilled carbon dioxide and preferably contains a venturi (not shown in FIG. 2E) in the splitter to enhance the mixing of chilled water and chilled carbon dioxide. If the second splitter 119 does not contain an internal splitter, then a venturi preferably immediately follows downstream of the splitter 119. The second splitter connection 119 is in fluid communication with one or more carbonators 120 and 121 that combine chilled water from line 116 with carbon dioxide gas from line 114 and, independently, carbonate the chilled water. The carbonator(s) 120 are described later. A carbonated water line 122 is in fluid communication with the carbonator(s) 120 and the spigot 44. Advantageously, first and second check valves 124*a*, 124*b* are on opposing sides of the splitter 119. The check valves 124 allow the chilled water and chilled carbon dioxide to pass in only one direction, downstream toward splitter 119 (FIG. 2E) which has a mixing venturi in it. The splitters 118, 119 are shown as located outside of the chilled water reservoir 74 but may be located inside the chilled water reservoir and inside the water-bath (as in FIGS. 2A and 2F).

The carbon dioxide gas valve 112 and carbonated water valve 116 regulate the amount of carbon dioxide gas and chilled water flowing to the carbonators 120 and 121 and out the carbonated water line 122 to the spigot 44. The valves 112, 116 may be actuated by various means, including electrical, pneumatic, or mechanical. Preferably, the valves 112, 116 are electrically actuated and in electrical communication with the carbonation button 52 so that a user may press the button and the carbon dioxide gas valve 112 and carbonation valve 116 will open main valve 90 will open too and the water delivery pump 92 will be powered on to provide predetermined or adjustable volumes of chilled carbon dioxide gas and chilled water to the carbonators 120 and 121 which generate the sparkling or carbonated water flowing to the spigot 44 for as long as the button maintains electrical communication, or for a predetermined time interval determined by an electrical circuit, or until a weight sensor positioned below the drink container, or until a level sensor or proximity sensor sends a shut-off signal when the sensor indicates the weight reaches a predetermined level or the sensor reaches a termination level or a proximity position.

Figure 2F:
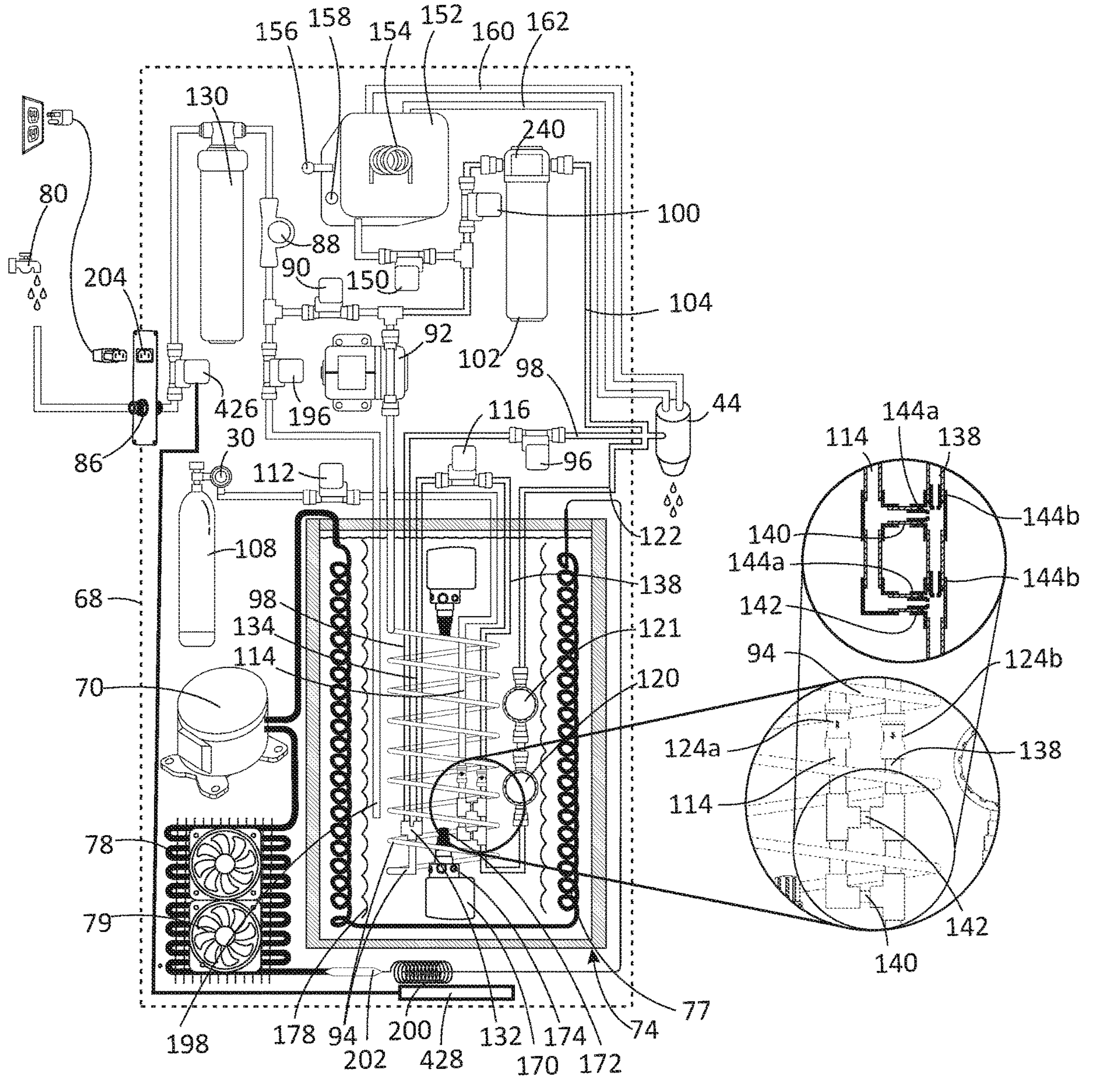
FIG. 2F is the same plumbing diagram of FIG. 2B, showing a drink station that contains inside its housing a smaller carbon dioxide gas tank or canister and a small water filter with a leak stopper system.

Referring to FIGS. 2A, 2F, 11A and 11D, alternative fluid paths and parts are disclosed for an alternate arrangement for dispensing carbonated or sparkling water when the carbonated water button 52 is pressed. The carbonation is added by carbon dioxide gas in a pressurized container, an internal carbon dioxide gas canister 108 located inside the drink station 20, as shown in FIG. 2F. Line water 80 is in fluid communication with water inlet port 86, which is in fluid communication with one or more internal water filter(s) 130. The filter(s) may be any type of water filter. The filtered water from filter(s) 130 is in fluid communication with flow meter 88 and main valve 90 and water delivery pump 92. Pump 92 forces water through the drinking water chiller water coil 94 immersed in the water-bath inside chilled water reservoir 74. The drinking water chiller coil 94 has a chilled coil splitter 132 that has a chilled water line 98 in fluid communication with chilled water valve 96 located downstream of the chilled water reservoir 74 to release water to the chilled water line 98 and spigot 44 as previously described in FIG. 2C.

In addition (FIG. 2F), the chilled coil splitter 132 has a first carbonated water line 134 in fluid communication with the carbonated water valve 116 that is located outside the chilled water reservoir 74. The carbonated water valve 116 is in fluid communication with one or more carbonators 120 through a second carbonated water line 138. After carbon dioxide gas from line 114 is mixed with chilled water from line 138 inside the carbonator(s) 120 and 121, the resulting carbonated or sparkling water is flowing outside the chilled water reservoir 74 through carbonated water line 122. The second carbonation line 138 interacts with the carbon dioxide gas chilling line 114 as described earlier regarding FIG. 2E, but in a different configuration as shown in FIG. 2F and described below.

In FIG. 2F, the drink station 20 has an internal carbon dioxide gas tank or canister 108 with a carbon dioxide gas pressure and flow regulator 30. The carbon dioxide canister 108 is in fluid communication with a carbon dioxide valve 112 which is in fluid communication with a carbon dioxide gas chilling line 114, a portion of which is immersed in the water bath of the chilled water reservoir 74 as described earlier.

Figure 3A:
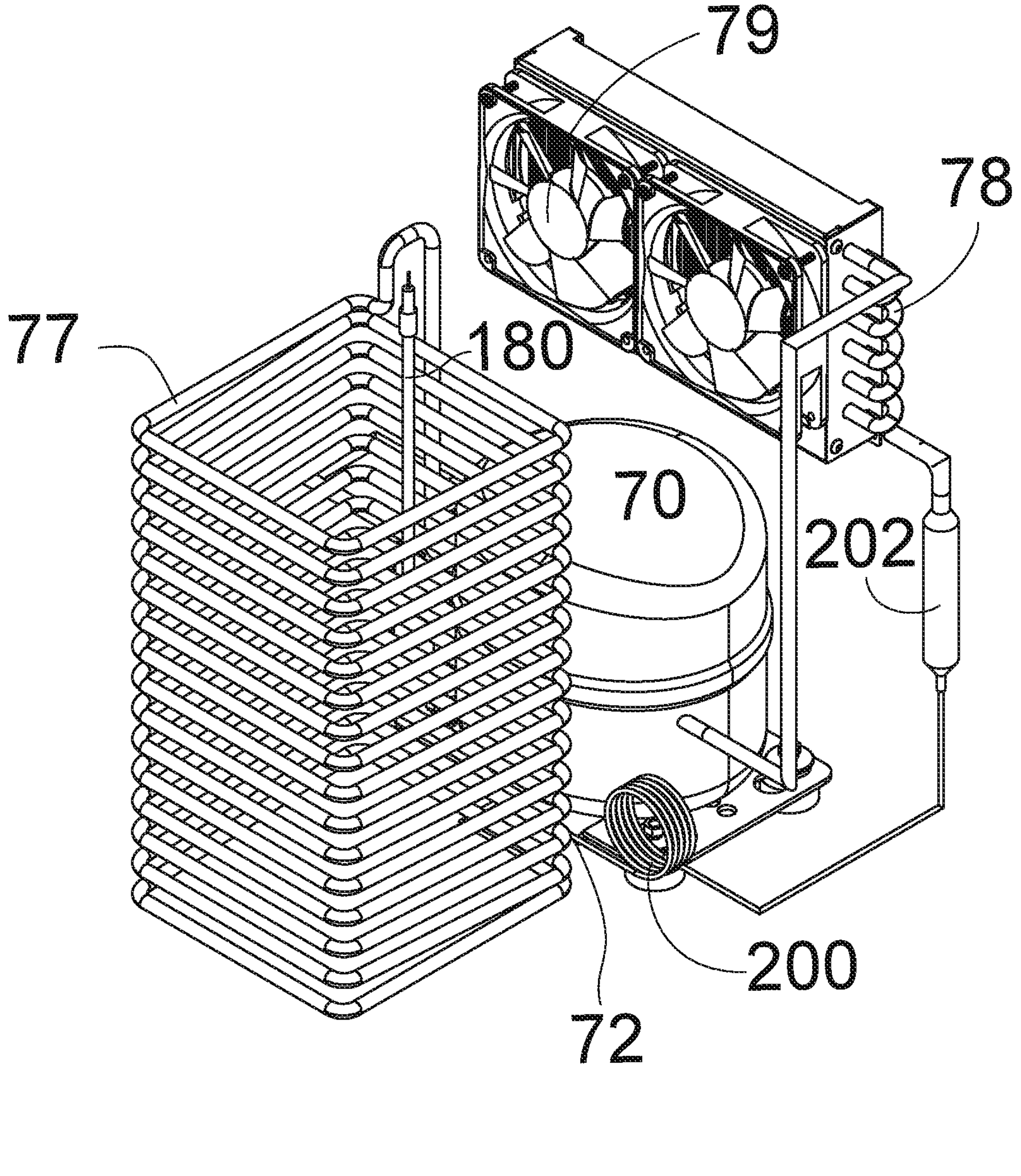
FIG. 3A is a perspective view showing portions of the freezer system of FIGS. 2A and 2F.
Figure 3B:
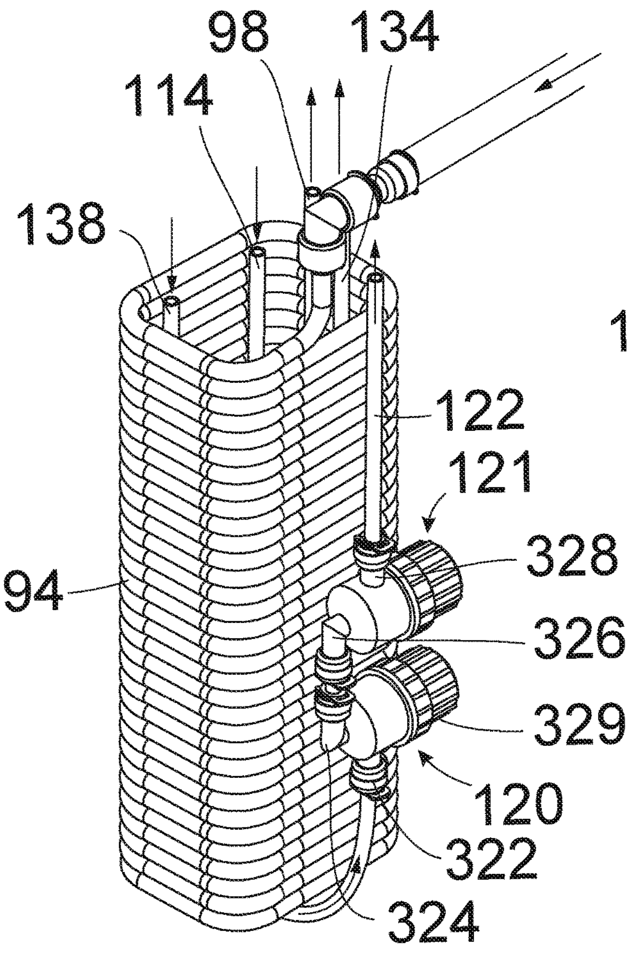
FIG. 3B is a perspective view showing a drinking water chiller coil and two in-line carbonator chambers.
Figure 3C:
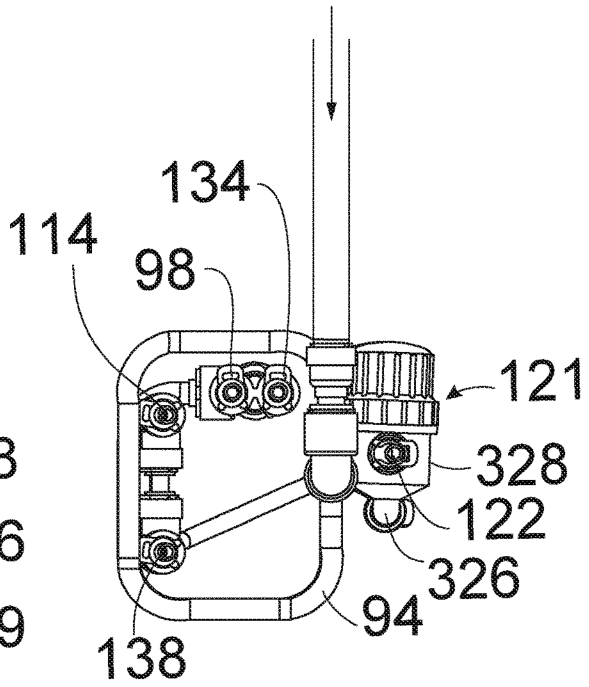
FIG. 3C is a top view of the drinking water chiller coil and carbonators of FIG. 3B.
Figure 3D:
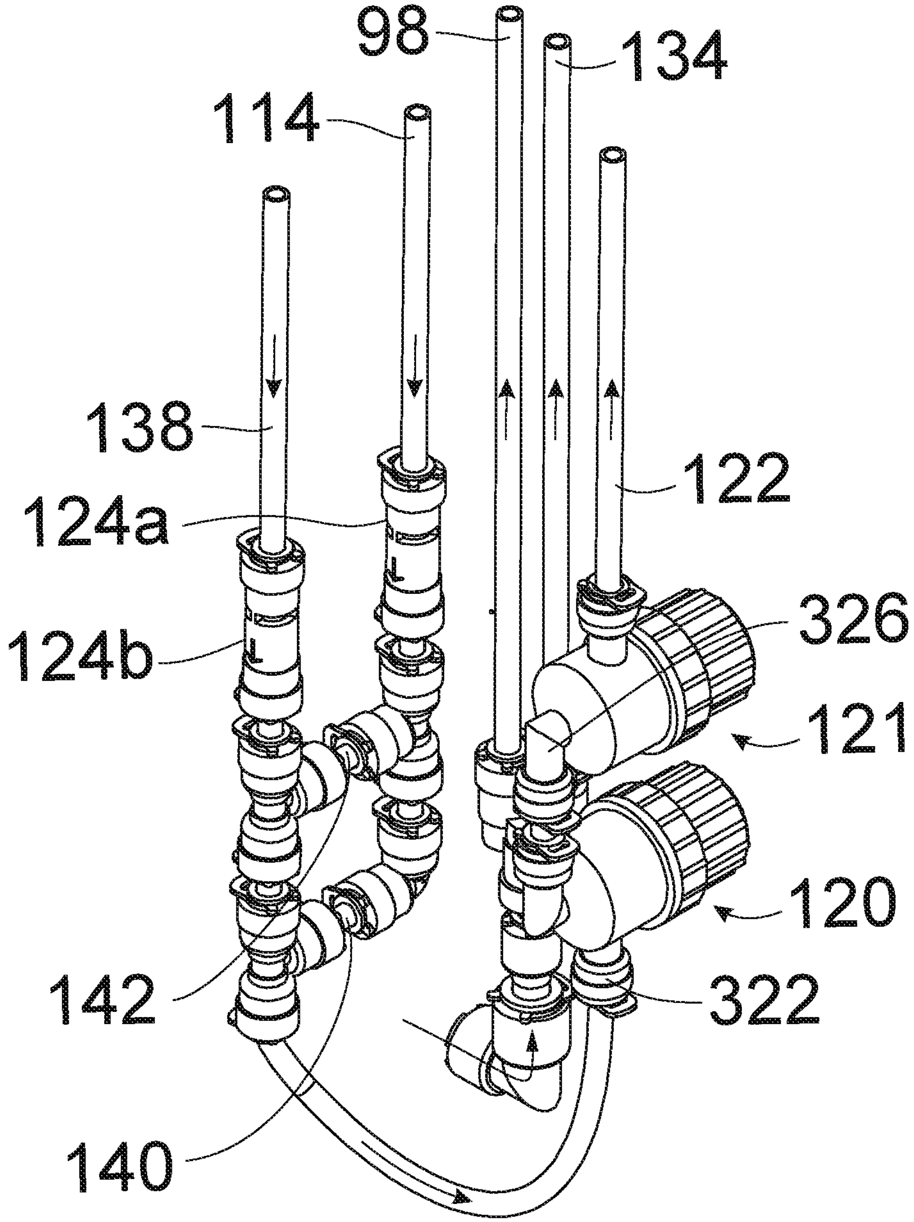
FIG. 3D is a perspective view of fluid lines and connections in the water drinking water chiller coil and the two carbonators shown in FIGS. 3B-3C.

As seen in the enlarged portions of FIGS. 2F and 3C-3D, the carbon dioxide chilling line 114 and the second carbonation water line 138 containing chilled water are connected to each other by at least one, and preferably two connectors 140, 142, each connector extending from the carbon dioxide chilling line 114 to intersect with and connect to the second carbonation water line 138 that contains chilled water. A venturi 144, also referred to herein as a static, venturi restriction device, is advantageously located in each of the connectors 140, 142 at the juncture with the other line, and a venturi 144 is located in the second carbonation line 138 at the two junctures of the connectors 140, 142. Thus, in the enlarged portion of FIG. 2F, a laterally extending connector 142 has a venturi 144*a* with the venturi downstream throat opening onto the vertically extending chilled water line 138, and the chilled water line 138 has a venturi 144*b* with the venturi downstream throat exiting immediately adjacent but at right angles to the venturi 144*a* in the connector 142. The second connector 140 has a similar construction.

The four venturis 144*a*, 144*b* intermix the chilled water and chilled carbon dioxide which exits out the downstream end of the first carbonation line 138 and is in fluid communication with the carbonator chambers 120 and 121. Two venturi devices 144*b* are aligned with a fluid line in communication with the carbonators 120, 121 while two venturi devices 144*a* are aligned perpendicular to that fluid line, and the outlet of each pair of venturi devices 144*a*, 144*b* are adjacent to each other and perpendicular to each other to achieve what is believed to be maximum intermixing. In some embodiments, only one venturi device is sufficient to accelerate the water from the second carbonated water line 138 and mix it with the carbon dioxide gas from line 114: this is the venturi 144*b* located at juncture 142. This venturi 144*b* located in the downstream of second carbonated water line 138 is believed to achieve superior intermixing of the carbon dioxide gas and chilled water and thus achieve improved carbonation. Orienting the juncture of the water line 138 and carbon dioxide line 114 at right angles to each other is believed to further improve the intermixing and further increase the carbonation of the water. Placing a venturi 144*a*, 144*b* at the two junctures 140 and 142 of the two lines and adjacent the other venturi is believed to further improve the intermixing and further increase the carbonation of the water.

While two sets of intersecting lines with the two connections 140 and 142 are shown and described, one set is believed sufficient. Carbonated water line 122 places the carbonator(s) 120, 121 in fluid communication with the spigot 44 to dispense chilled, carbonated water upon activation of carbonated water button 52 as previously described. As seen in the enlarged portion of FIG. 2F, a check valve 124*a*, 124*b* is placed in the carbon dioxide gas line (114) and in the second carbonation water line (138), respectively, in order to prevent backflow of fluids from the intermixing caused by the venturis 144*a* and or 144*b*.

Figure 2G:
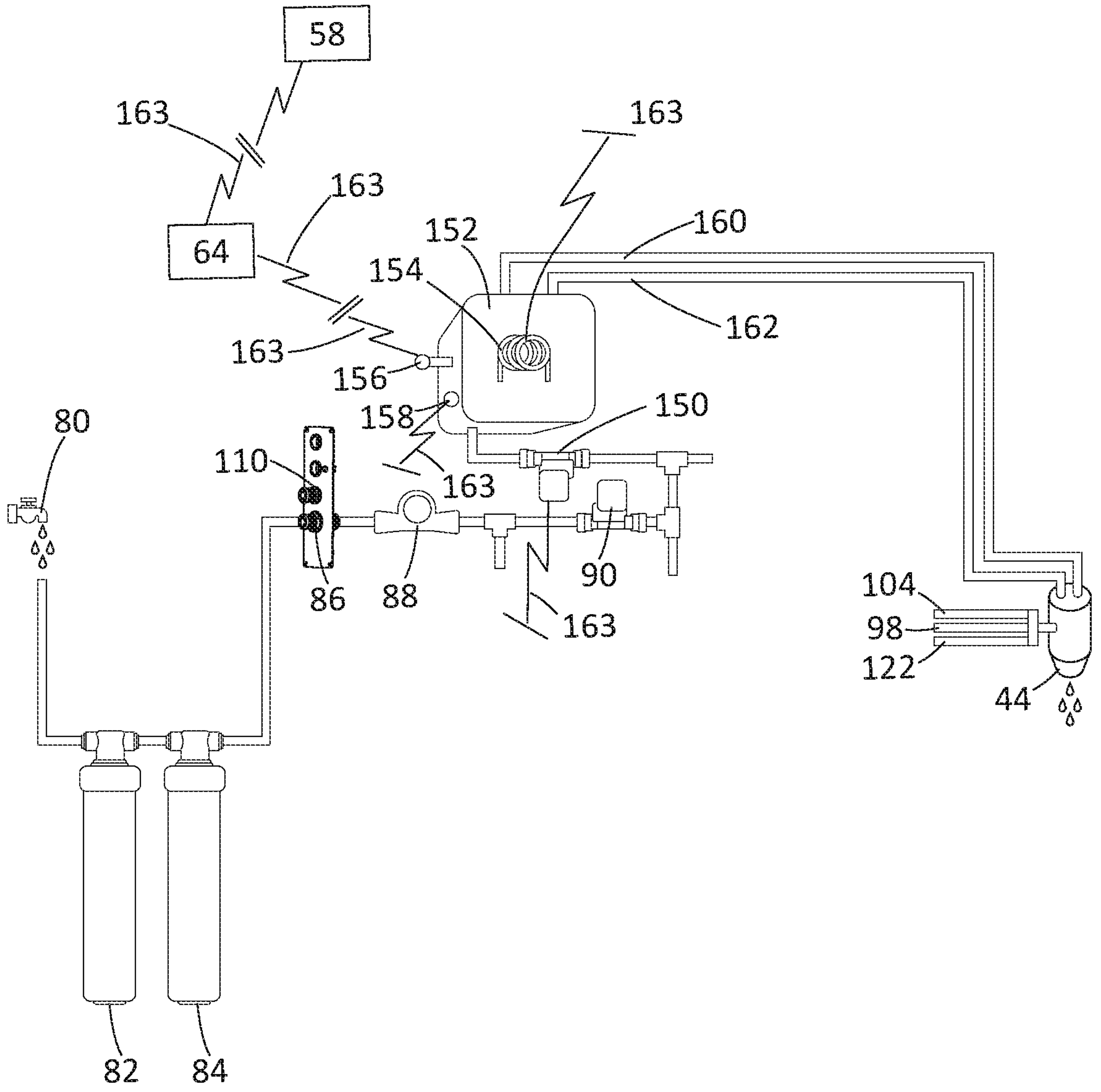
FIG. 2G is a simplified diagram of FIG. 2B, showing a hot water line.

Referring to FIGS. 2A, 2B and 2G, the fluid paths and parts are disclosed for dispensing hot water when the hot water button 58 is pressed. As before, water flows from the line source 80, through filters 82, 84 and inlet port 86 and flow meter 88 and main valve 90. The main valve 90 is placed in fluid communication with the pump 92 (not shown) and chilled water reservoir 74 (not shown). But the main valve 90 is also placed in fluid communication with a hot water valve 150 that controls the flow of ambient temperature water from main valve 90, to a hot tank 152 having an electrical resistance heating element 154 and having temperature sensor and regulating mechanisms, which preferably include a negative temperature coefficient (NTC) sensor 156 (a thermistor) with a measuring water temperature to regulate hot water temperature in connection with a controller 64, and backup temperature sensor 158 such as a thermostat to send a signal to the controller 64 that shuts off the heater if the temperature is too high, above a defined temperature threshold. The heater 154 thus heats the water in the hot water tank, with the temperature controlled by the NTC 156, and appropriate circuitry in a controller 64 in electrical communication with the thermostat 158, as a security shutoff of the heater if the temperature is too hot in case of malfunctioning of the NTC.

The hot water valve 150 is in fluid communication with hot water tank 152 that heats the water to a predetermined temperature and is in fluid communication with the spigot 44 through a hot water line 160 and through a vapor line 162. Heated water flows to the spigot 44 through hot water line 160. The vapor line 162 acts as a vent line to allow hot water to flow back to the hot water tank 152 after dispensing is finished so that a column or fluid line full of hot water is not in constant fluid contact with the spigot 44, thus avoiding a spigot that is continually heated and hot. In addition, it avoids that a mass of hot water remains in line 160 when the dispenser is not in use and cools down over time. Therefore, the next user selecting hot water from the dispenser will first get the water remaining in line 160 that has cooled down and, therefore, when dispensed, this portion of remaining water in line 160 would reduce the temperature of the hot water dispensed at the spigot. The vent line 162 avoids this undesirable possibility. A further description of the hot tank 152 and construction is provided later.

The hot water valve 150 regulates the amount of water flowing to the hot water tank 152 and ultimately the volume of water available to flow out of the spigot 44. The hot water valve 150 may be actuated by various means, including electrical, pneumatic, or mechanical. Preferably, the hot water valve 150 is electrically actuated and in electrical communication with the hot water button 58 so that a user may press the button and the hot water valve 150 will open to provide predetermined or adjustable volumes of hot water to the spigot 44 for as long as the button maintains electrical communication, or for a predetermined time interval determined by an electrical circuit, or until a weight sensor positioned below the drink container, or a volume level sensor, or a proximity sensor, to send a shut-off signal when the sensor indicates the weight reaches a predetermined level or the sensor reaches a termination level, or a proximity position.

Figure 11E:
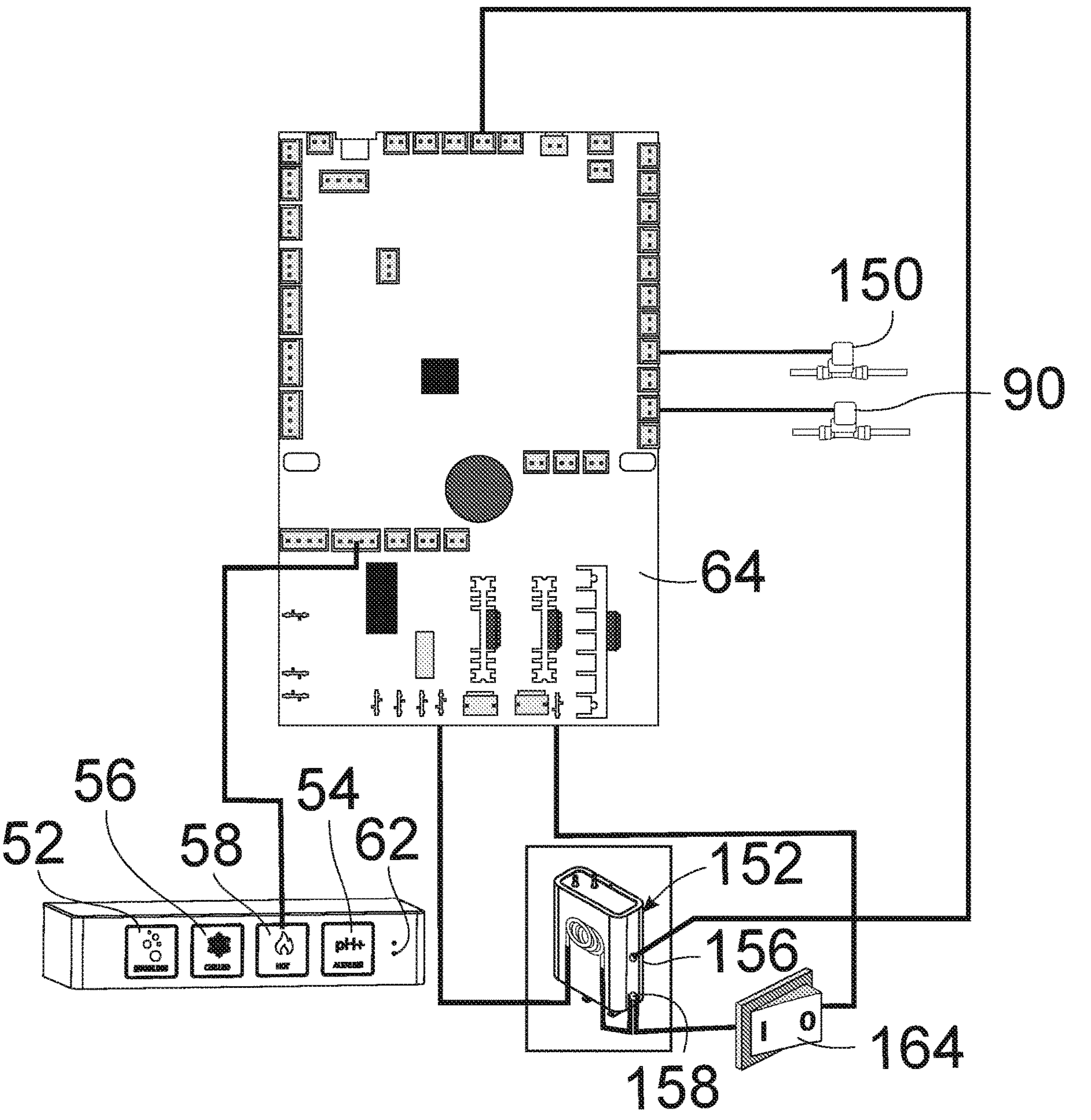
FIG. 11E is a schematic illustration of a control circuit for providing hot water.

Referring further to FIGS. 2G, 11A and 11E, thermostat 158, thermistor 156, heater 154, hot water button 58, and hot water valve 150 are in electrical communication to open the valve 150, together with main valve 90, and dispense hot water from the spigot 44 when the button 58 is activated, and to regulate the temperature of the water and prevent excessively hot water or damage to the heater tank 152. Advantageously, these electrical communications are through various heater electrical line(s) 163 (FIG. 2G) dedicated to each sensor, thermistor, thermostat, heater and the 2 valves involved in dispensing hot water of any temperature. A hot water off switch is also provided so that if the hot water is not expected to be used for an extended length of time, the hot water heater 154 may be shut off to conserve energy. Further, a child safety switch 166 may be provided (FIG. 1D), which leaves the hot water heater 154 powered and hot water available but disables to the hot water valve 150 (FIG. 2G) so a child may not accidentally dispense hot water. An adult may switch the child safety switch 166 off to dispense hot water using the hot water button 58 and switch the child safety switch back on the desired hot water is dispensed. Alternatively, a software code is provided, when touching a sequence of buttons in a certain way, although child safety switch may be enabled (or engaged), the code allows for a temporary bypass of the child safety switch and dispense, only one-time, hot water. The code reduces the problem of disengaging the child safety switch and then forgetting to re-engaging it back after hot water is dispensed. The hot water off switch 164 and the child safety switch 166 are in electrical communication with the controller 64 through separate electrical lines that are not shown. The child safety switch 166 and hot water off switch 164 are shown as located on the back of the drink station 20, (see FIG. 1D), but other locations on the drink station could be used. Moreover, an indicator light 62 may be provided to indicate whether or not the water is available, or the child safety switch is enabled. A red indicator light 62 is believed suitable to indicate hot water is available. When the hot water light 62 is off, it also indicates the child safety is enabled. When the light is on, the child safety is disabled, and hot water may be dispensed.

Figure 4A:
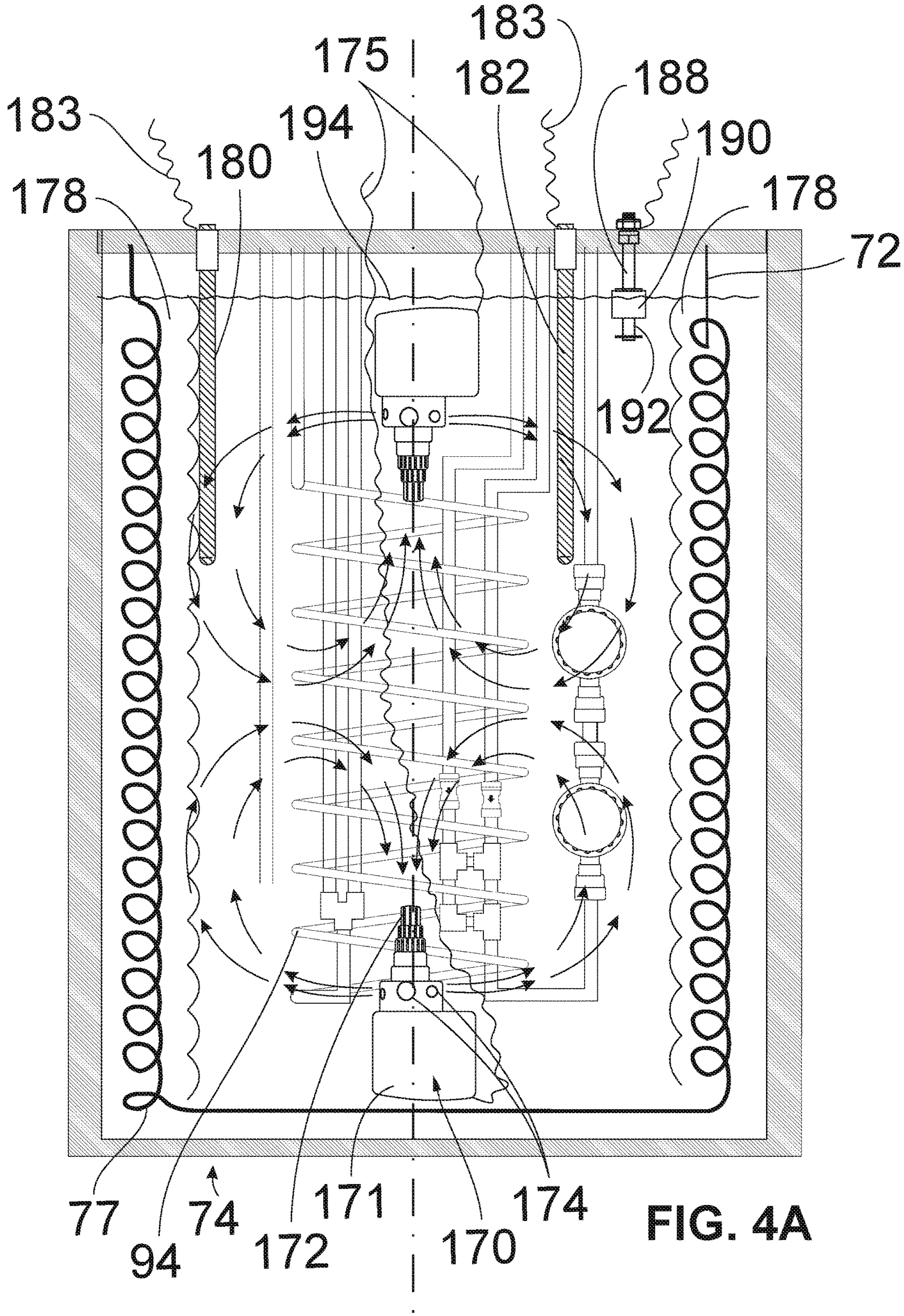
FIG. 4A is a schematic sectional view of the chilled water reservoir showing its contents, including two agitators and the circulation of the water-bath inside the chilled water reservoir which has a spiral-wound, drinking water chiller coil.
Figure 4B:
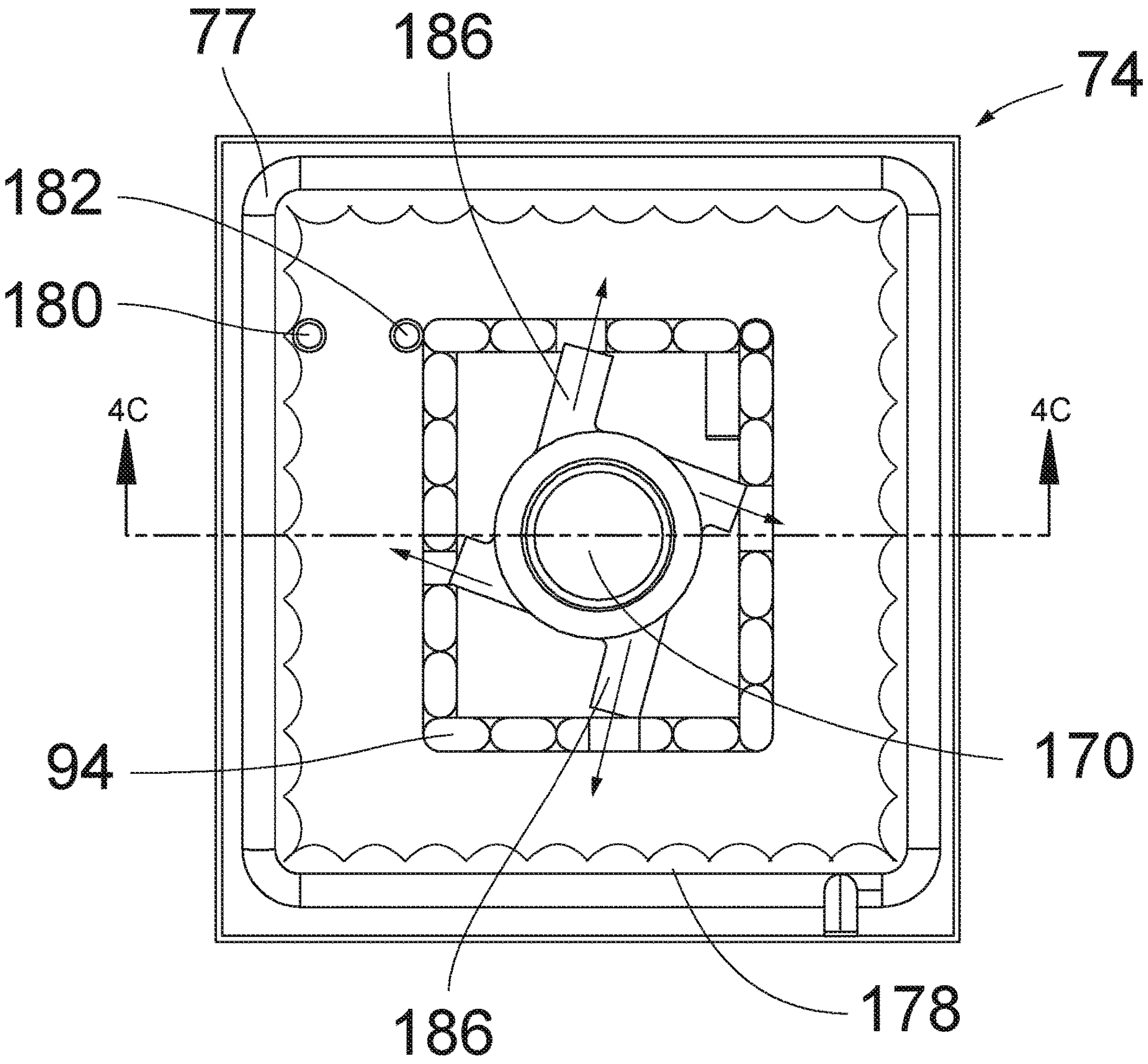
FIG. 4B is a top view of a chilled water reservoir showing its contents, including a single agitator pump with an outlet tube in a water bath inside the chilled water reservoir which has a vertically-undulating drinking water chiller coil arranged in a rectangular shape with the coil's sides parallel to the water reservoir sides.
Figure 4C:
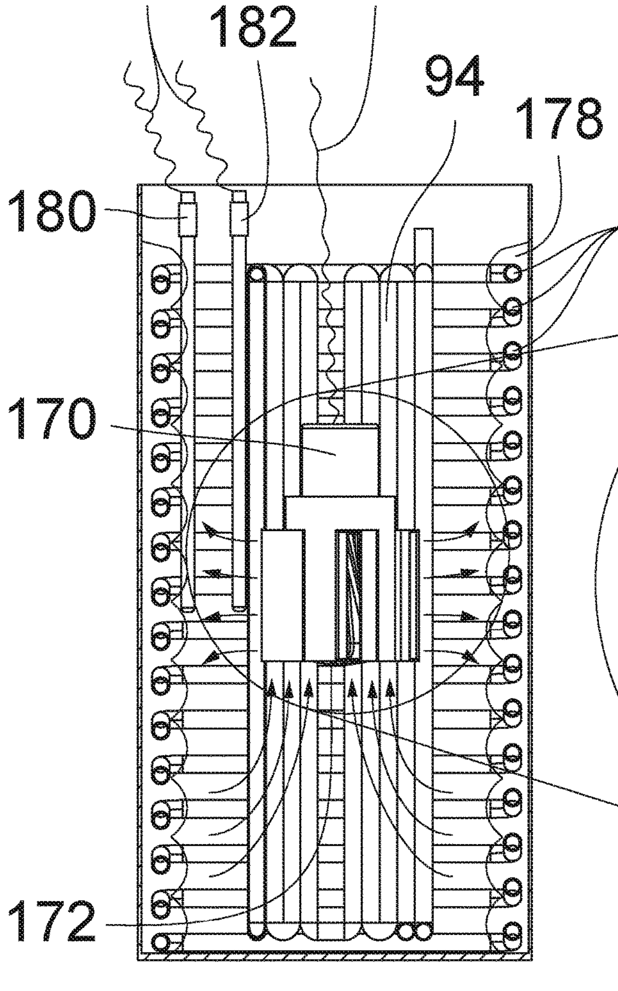
FIG. 4C is a sectional view taken along section 4C-4C of FIG. 4B showing the single agitator in an outlet tube and the resulting circulation path of the water-bath inside the chilled water reservoir.
Figure 4D:
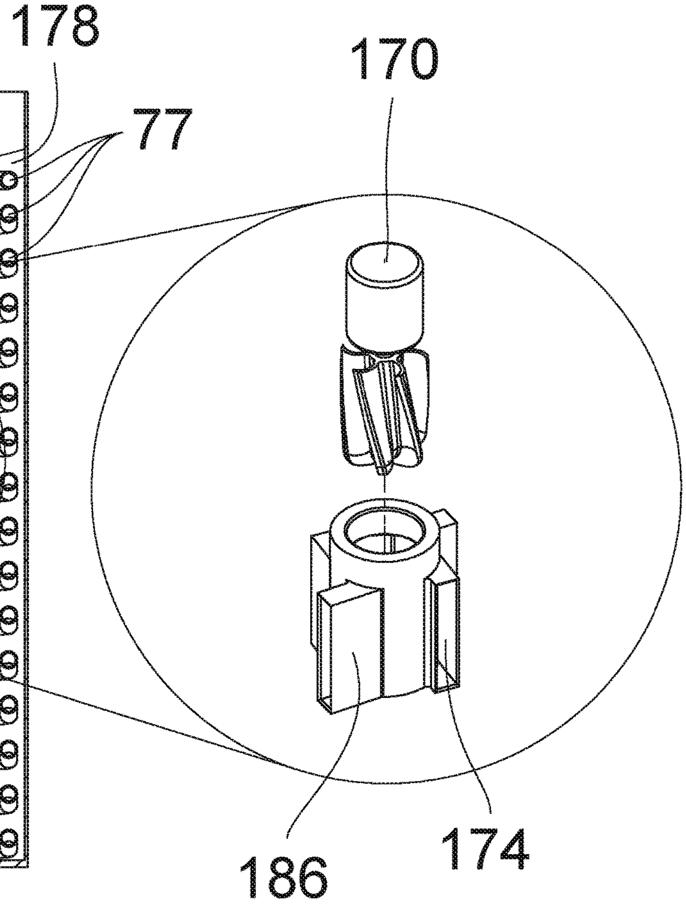
FIG. 4D is an enlarged, exploded view of the single agitator inside an outlet tube.
Figure 4E:
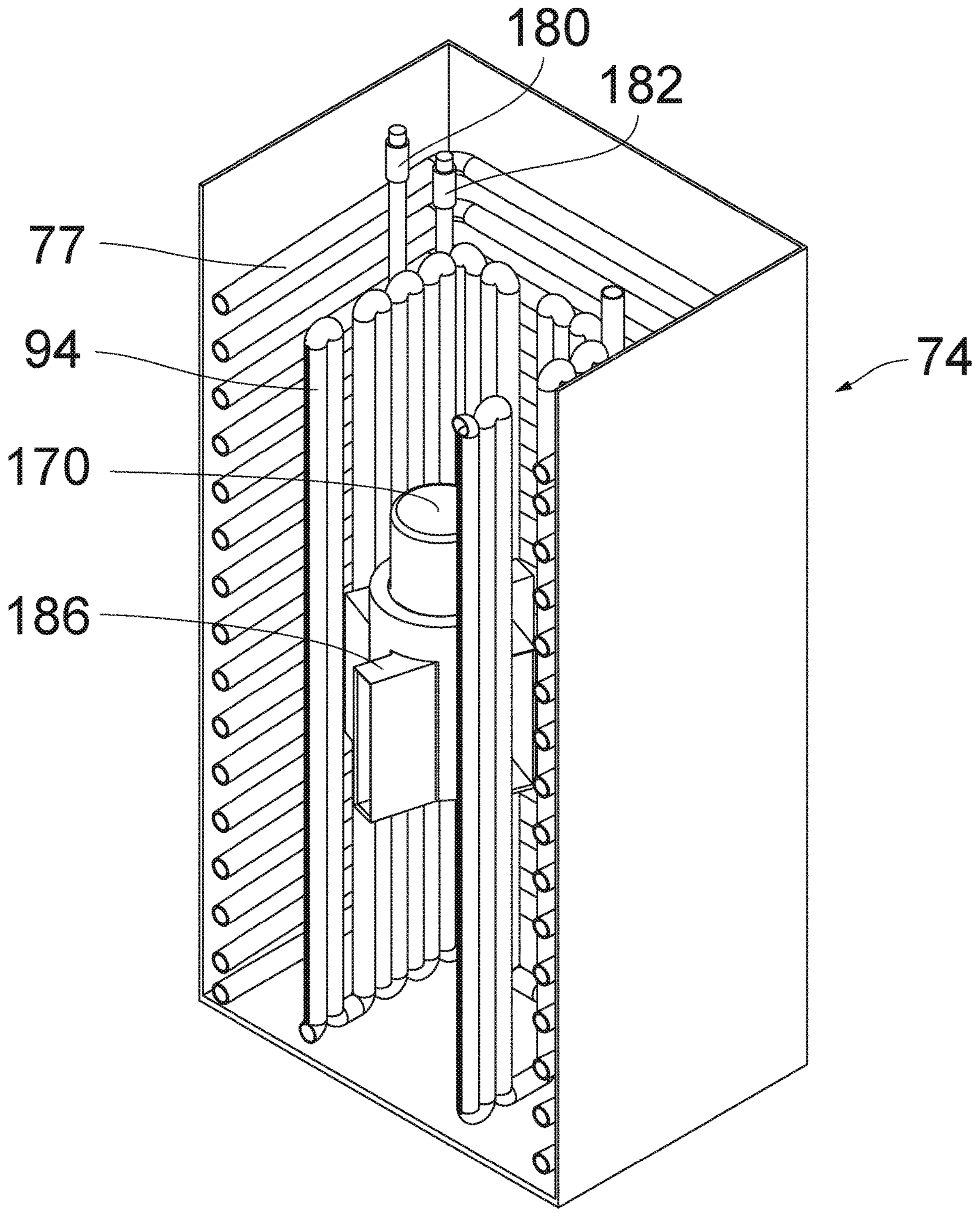
FIG. 4E is a perspective view of a partial section of the water bath, water chilling coils and agitator of FIGS. 4B and 4C.

Referring to FIGS. 2A, 2F and 4A, configurations including one or two agitator pumps 170 are shown. Each agitator pump 170 is believed to improve the convection coefficient between the ice-bank and the water-bath more than commonly used stirrers, water jets, moving paddles or rotating propeller-type blades. Agitator pumps have the advantage of being submersible, can take water from a specific direction—intake flow—and direct water to another specific direction-outflow. In particular, agitator pumps can be positioned in a way to take water in proximity of the drinking water chiller coil 94 and direct outflow water towards the ice-bank walls and the evaporator coils. A submersible agitator pump is designed that can direct outflow so as to avoid directing water towards temperature sensors.

An agitator pump, preferably contains a submersible agitator electrical motor 171 (FIG. 4A) that intakes water through an axial port or opening 172 which is preferably, but optionally, a nozzle, and expels water out outward a series of radial outlet ports or openings 174. The number of radial openings may differ, but it is believed that at least four openings are necessary, each of them directing the outflow of water valves that direct outflow of water towards one of the four walls of the chilled water reservoir against which the ice-bank wall is formed. The first port, the intake port, 172 thus has a flow path along the longitudinal axis of the drinking water chiller coil 94, while second outlet ports or outlet openings 174, create a flow path outward from that axis (see FIG. 4A). The two intake ports or nozzles 172 of the two agitators 170 in FIG. 4A advantageously extend along the longitudinal axis of the drinking water chiller coil 94 and face each other so that flow path of chilled water enters into the nozzle extends along and parallel to the axis extending between the nozzles and the longitudinal axis of the chiller coil 94. The two opposing agitators 170 circulate the water-bath inside the chilled water reservoir 74 and move the chilled water from the drinking water chiller coil to the ice-bank 178 and back towards the drinking water chiller coil 94, thereby allowing heat-exchange between the ice and the drinking water by forced thermal convection. The two agitators 170 are advantageously directly opposite each other and aligned along a vertical axis, with the inlet ports 172 forming intake nozzles. The intake nozzles 172 suck water along the central axis of the reservoir and the central axis of the drinking water chiller water coil 94, where the temperature of the water in the water bath is higher, while both agitator pumps expel water outward through various round openings or ports 174 and away from the longitudinal axis of the drinking water chiller coil 94, and preferably expels the water radially out of ports or openings 174 and towards the ice-bank. The flow paths of the agitator pumps, inlet ports 172 and outlet openings 174 advantageously create a spherical flow pattern circling outward from the longitudinal axis of the drinking water coil, toward and past the drinking water chiller coil 94, upward toward the middle of the reservoir, and then inward and back toward the nozzle of the same pump that expelled the water. Each agitator pump 170 advantageously creates a circulating spherical flow that is extends about midway between the two agitators 170 with the flow paths shown in FIG. 4A by arrows. Other flow paths may be created by angling the agitators 170 differently.

The agitators 170 are responsible of enhancing the heat exchange between the ice-bank and the water-bath inside the chilled water reservoir. The water in the reservoir is kept just above freezing. The thickness of the ice-bank 178 and, in general the amount of ice formed around the evaporator coil inside the chilled water reservoir is controlled by the NTC 180 in FIG. 4A. The ice-bank, when it melts during the heat-exchange process with the water-bath provides the system the necessary latent heat and act as a heat sink to maintain the water temperature low during periods of high demand. The ice 178 forms around the evaporator coil 77 which usually follows a serpentine path over the inner surface of the water reservoir sidewalls, so the walls of an ice bank 178 extend inward from the evaporator coil 77, while the top and bottom of the water reservoir are typically not frozen. Over time, the ice banks 178 extend inward toward the center of the chilled water reservoir 74 and away from the walls of the reservoir, to form the ice bank 178 encircling the vertical and cylindrical arrangement of the drinking water chiller coil 94. The refrigeration circuit and agitators 170 are operated and controlled so the ice bank 178 thickness does not encase the various fluid tubes and connections inside the drinking water chiller coil 94 and does not freeze the fluids inside those fluid tubes and connections.

Prior art drink stations use agitators 170 that are activated for predetermined periods of time after liquid is dispensed from the spigot, or simply based on the ice-bank 178 growth. Advantageously, the operation of the agitators 170 is controlled based on the temperature of drinking water chiller coil measured in the water-bath adjacent to the drinking water chiller coil 94. To measure the drinking water temperature a second NTC thermistor 182 is used. Referring to FIG. 4A, the chilled water reservoir has a first temperature sensor 180 (NTC) located at a predetermined distance from the evaporator coil 77 to regulate ice thickness, and has, at least, one second temperature sensor 182 (NTC) that is located on the external surface and is tightly attached or connected to the drinking water chiller coil 94. The sensor 182 is the drinking water temperature sensor and advantageously measures the temperature at or adjacent to the drinking water chiller coil 94. For more accurate temperature measurement of the drinking water chiller coil an in-line temperature sensor may be located directly inside the drinking water chiller coil itself. As used for these temperature measurements in the chilled water reservoir 74, the temperature "adjacent" an object means the temperature within 5 mm of the object and the various sub-ranges.

The second temperature sensor 182 is advantageously an NTC sensor having an electrical resistance that decreases as temperature increases, but other sensor types could be used. When the water temperature approaches freezing at the location of the drinking water chiller coil 94 as detected by the drinking water temperature sensor 182, the electrical power to the agitator electrical motor 171 is shut off so the agitators 170 stop circulating water inside the chilled water reservoir 74. Controlling the operation of the agitators 170 is believed unusual and advantageous, as it stops circulation of the chilled water and thus stops carrying heat away from the drinking water chiller coil 94, preventing freezing of the drinking water that must flow inside the drinking water chiller coil 94. At the same time, if the agitators 170 continue working, they will gradually reduce the thickness of the ice-bank when dispenser is not in use.

The first temperature sensor 180 inside the chilled water reservoir 74, also called the ice temperature sensor 180, is located parallel to the wall of the chilled water reservoir 74 and spaced a predetermined distance from the wall and from the evaporator coil 77 in a position as to allow ice to grow around the evaporator coil, but stop the refrigeration by powering off the freezer's compressor 70 electrically connected to the controller 64 (see FIG. 11A), when the ice-bank thickness reaches the ice temperature sensor 180. The ice temperature sensor 180 is located so that its outward facing surface that faces the evaporator coil 77 is at the desired wall thickness for the ice bank 178. When ice accumulates on the inside wall of the reservoir 74 and evaporator coil 77, the ice will increase in thickness by freezing the chilled water-bath in proximity of the evaporator coil, inside the chilled water reservoir 94. When the ice bank 178 expands and contacts the ice temperature sensor 180, the sensed temperature is freezing (32° F. or 0° C. or below) and the ice temperature sensor 180 sends an electrical signal to controller 64 which results in the power to the refrigeration system compressor 70 and fans 79 being shut off so that active cooling of the refrigerant in the freezer expansion line 72 stops and the evaporator coil stops freezing the water-bath around its coils. The fans 79 for the heat exchanger are also shut off. The shut-off temperature can be varied, as long as the temperature is correlated to a desired thickness of the ice bank 178, or to a desired volume of ice in the ice bank 178. The shutoff temperature is right below) 0° C. (corresponding to the freezing temperature of the water at atmospheric pressure). The range within which NTC 180 preferably works is between −3.0° C. and +1.0° C. In an interval of temperatures between −3.0° C. and −0.5° C. the refrigeration system (compressor 70 and fans 79) are powered off by the controller 64 which receives the temperature information from the NTC 180. Instead, in a temperature range between 0.1° C. and 2.0° C. the controller 64 activates the refrigeration system (by powering on both the compressor 70 and the fans 79), thus allowing new ice to be formed around the evaporator coil 77. Depending on the routing of the evaporator coil 77, the size, shape and location of the ice bank 178 may vary, but the freezer expansion line 72 and the evaporator coil 77 are designed to produce a uniform thickness of ice over a known area so that the melting of the ice can be predicted, and so that the thermal balance between the ice and the temperature of the water-bath inside the reservoir 74 can be predicted.

The agitator electrical motor(s) 171 is/are in electrical communication with controller 64 through the agitator electrical communication line 175 (FIG. 4A). The drinking water temperature sensor 182 and ice temperature sensor 180 are also in electrical communication with controller 64 through temperature sensor electrical communication lines 183. The controller 64 contains circuitry to independently and separately control both the ice-bank thickness and operate the refrigerator system (compressor 70 and fans 79), and the drinking water temperature in the drinking water chiller coil 94, by operating (powering on or off) the agitator(s) 170.

The drinking water temperature sensor 182 which is positioned adjacent or inside the drinking water chiller coil 94 measure the temperature of the drinking water inside the coil 94 either directly (if inside) or indirectly by way of calculating the conductivity coefficient of the stainless steel which is the material the water chiller coil's walls are made of. At a water temperature above a certain threshold water temperature called Lower Temperature Point (LTP) (which is a temperature between 0.01° C. and 1.5° C., preferably between 0.1° C. and 1.1° C. and in particular preferably right at 0.6° C.) the agitator(s) operates. At a water temperature below a certain threshold temperature called Upper Temperature Point (UTP) (between 0.3° C. and 3.0° C., preferably between 0.7° C. and 1.7° C. and in particular preferably right on 1.2° C.) the agitator(s) 170 are powered off by the controller 64. Therefore, preferably, above the LTP the agitator(s) 170 work, below the UTP the agitator(s) 170 do not work; this is believed to avoid consuming latent heat from the ice-bank without this latent heat being efficiently used to lower the temperature of the drinking water. In the range of temperatures between LTP and UTP, called the car-band, the agitator(s) do not work if they were not working and continue not to work until the temperature of the drinking water inside the chiller coil 94 reaches the UTP at which point the agitator(s) receive a signal to start working. The agitator pump will continue to work until the temperature of the drinking water goes back down. In this process when the temperature decreases from a temperature above the UTP, the agitator(s) 170 will continue to work until the LTP is reached. At this point the controller 64 shuts off the agitator(s). In summary, below LTP the agitator(s) do not work. Above the UTP the agitator(s) work. In the car-band of temperatures between the LTP and the TP, the agitator(s) will continue to work if they were working before (because the drinking water temperature was above the UTP), while the agitator(s) will continue to idle if they were not working before (because the drinking water temperature was below the LTP). In the range of temperatures between UTP and LTP the agitator(s) remain in its pre-existing working or non-working conditions.

In another variation, the agitator speed varies depending on the drinking water temperatures. The speed of the agitator increases as the temperature increases. Below the LTP the agitator(s) do not work. Above the LTP agitator starts working at a speed that is proportional to the rising of the temperature of the drinking water inside the chiller coil as detected by temperature sensor 182. The speed variation of agitator's electric motor 171 is controlled by the controller 64.

Referring to FIG. 4A, other embodiments use two agitator pumps 170 and, while both agitator pumps work above UTP and neither of the two agitator pumps work below LTP and have only one agitator pump working in the range of temperatures between UTP and LTP.

Referring to FIGS. 4B-4E, the outlet openings 174 of one or more of the agitator pumps 170 may have an outlet tube 186 to direct the flow from the outlet ports 174 to avoid directly impinging on one or more of the temperature sensors (e.g., 180, 182) in the chilled water reservoir 74. The depicted agitator pump 170 is shown as a cylindrical tube with four hollow fins which form four outlet tubes 186. Each outlet tube 186 extends outward from the rotational axis at an inclined angle to the outer periphery of the cylindrical tube so that two pairs of substantially parallel fins or outlet tubes 186 are provided which results in an outlet opening every 90°, each directed toward one of the walls of the chilled water reservoir 74. The four fins or outlet tubes 186 are hollow and open into the hollow interior of the pump housing. Each of the four fins or outlet tubes 186 has a rectangular cross-section, but other cross-sectional shapes could be used.

The rotor of the agitator pump (FIG. 4E) is depicted as having four curved flutes equally spaced about a rotating drive shaft, with the curved flutes fitting inside the cylindrical housing. The agitator shaft and rotor rotates at high speed (at least 3,000 rpm) so that the water from the chilled water-bath is sucked in from the bottom of the agitator pump through the vertically oriented intake port 172 and is forced out through the outlet openings 174, after being accelerated by the turbo-propeller shaped rotor of the agitator pump 170. The chilled water passes through each of the four fins or outlet tubes 186 as shown by the arrows indicating water inlet and outlets in FIG. 4D. The four fins or outlet tubes 186 in turn are arranged to direct the flow of water outward and in a plane orthogonal to the longitudinal axis of the drinking water drinking water chiller coil 94 and parallel to the vertically undulating, drinking water drinking water chiller coil 94. The water circulation path established by the outlet tubes 186 and the shape of the reservoir 74 a path that does not cause the water from the outlet tubes 186 to flow directly against one of the temperature sensors (e.g., 180, 182) and instead the flow path impacts a portion of the ice bank 178 or evaporator coil 77 around which the ice bank forms, before eventually reaching the vicinity of a temperature sensor.

Four fins or outlet tubes 186 are shown in FIGS. 4B through 4E, a configuration used to advantage in the event that there are four chilled water temperature sensors (e.g., NTC sensors 180, 182) with one sensor adjacent each corner of a chilled water reservoir having a square cross-section, so each of the four fins or four outlet tubes can be directed toward the middle of the space between each pair of adjacent temperature sensors. This arrangement works especially well, when the drinking water chiller coil 94 has vertically oriented, undulating coils as in FIGS. 4B, 4C, 4D, and 4E, rather than generally horizontal oriented coils as in FIGS. 3B, 3C and 4A and especially where the coils 94 have spaces through which the fins or outlet tubes may end or even protrude as shown in the figures. The water expelled in the four directions can therefore easily pass through the vertically oriented coils of the drinking water chiller coil 94 and directly hit the four walls of the chilled water reservoir 74 where the ice-bank 178 grows around the evaporator coil 77.

A single agitator pump is shown with four fins or outlet tubes 186, one aimed for the middle of each wall of the rectangular reservoir 74 and the ice bank 178 associated with each wall and between each pair of temperature sensors (e.g., 180, 182). While a single agitator pump is shown in FIGS. 4B-4E, a pair of agitator pumps, each with outlet tubes 186 may be used as in FIG. 4A. One or more of the outlet ports 174 of FIG. 4A could each have an outlet tube 186 on them with the outlet tubes being cylindrical in shape to mate with the depicted circular outlet openings shown in FIG. 4A, or the outlet tubes 186 could have a circular passage that transitions to a rectangular shaped exit.

Referring to FIGS. 2A, 2F and 4A, a filling flow path for the water inside the chilled water reservoir 74 is described. A water level sensor 188 (FIG. 4A) is connected to the reservoir to measure the water level inside the reservoir. The water level sensor 188 is preferably connected to the top of the reservoir but could be mounted off of the reservoir sides or components enclosed in the reservoir. The depicted water level sensor 188 has a shaft 192 extending downward a distance sufficient, so that a float 190 that is slidable on the shaft can move upward and downward. As the water level 194 (FIG. 4A) rises or falls, the float 190 moves up and down. When the water level 194 is below a predetermined level, an electrical signal is sent by the water level sensor 190 to a controller 64 that actuates opens a valve 96 to add water to the inside of the chilled water reservoir 74. Instead of a vertical moving float 190, a lever extending generally horizontally and having a float on its end cold be used. Other water level sensors are known in the art and could also be used to signal when the water level 194 inside the reservoir is below a desired level. The level desired is when the water bath completely covers the evaporator coil 77 and the drinking water chilled coil 94.

Referring to FIGS. 2A and 2B, the water flow path for adding water to the chilled water reservoir 74 is described. A chiller water reservoir filling solenoid valve 196 is downstream of the flow meter 88 and in fluid communication with the flow meter 88. The chiller water reservoir filling solenoid valve 196 is also in fluid communication with the inside of the chilled water reservoir through water filling line 198 which advantageously passes through the top of the insulation and top cover or lid or wall of the chilled water reservoir 74. The electrical signal from the water level sensor 188 (FIG. 4A) indicating water is needed, results in the chilled water reservoir filling solenoid valve 196 being opened so water flows through that valve and through the filling line 198 to add water to the inside of the chilled water reservoir until the water-bath level 194 reaches a determined threshold. When the water level sensor 188 indicates the water, level is at a predetermined level, the float 190 rises enough to cause the sensor 188 to send an electrical signal to the controller 64 that results in the chilled water reservoir filling solenoid valve 196 being closed to shut off the flow of water into the reservoir 74 through the filling line 198.

The drink station 20 is shipped without water in the chilled water reservoir 74. The chilled water reservoir 74 is preferably sealed so no fluid enters or leaves unintentionally, even when the drink station is inclined the fluid inside the chilled water reservoir 74 does not spill out. The water level sensor 188, and the water reservoir filling solenoid valve 196 and filling line 198 allow water to be automatically added and thus avoid manually carrying water to pour it into the chilled water reservoir, and avoiding the attendant, when the apparatus is installed, set up, or serviced, splashing and spilling of water on electronic and mechanical components. When electrical power to the drink station 20 is activated, the water level sensor 188 indicates that the chilled water reservoir is low on water, resulting in opening of the chilled bucket valve 196 until the chilled water reservoir 74 is filled until the float 190 rises to a predetermined level and an electrical signal is sent that results in the valve 196 being closed to shut off the water. If water is lost through evaporation and the water level 194 in the reservoir 74 falls then the water level sensor 188 can send a signal to the controller 64 to automatically add more water to maintain the water level 194 within a predetermined range of water levels.

A user may push the auto-fill button 60, or any predetermined sequence of buttons (FIG. 1) to cause the above described system to check the water level 194 in the chilled water reservoir using the water level sensor 188 and the received signal from that sensor may be used by a controller 64 to implement a fill cycle to top off the water level and bring it up to the full level. This manual check-and-fill provides a redundant system in the event the user believes the system is not automatically refilling, or in the event the user wants to ensure the chilled water reservoir is topped off, so the maximum volume of water in the cold water reservoir is available for an expected period of high usage of chilled water from the chilled water coil 94. This manually activated solution and the associated circuitry to manually activate the water level sensor 188 and a potential fill cycle, is alternative to the automatic filling.

The various water lines and electrical connections for components contained inside the reservoir 74 preferably pass through sealed openings in the top of the reservoir 74 and through the insulation on that top. Some electrical wires for such electrical communication are shown in the figures, and various fluid lines are shown in the figures. Such sealed connections are known and not described in detail herein. The sealed chilled water reservoir 74 is believed to offer advantages other than avoiding the risks of adding water to a reservoir surrounded by electrical connections and fluid lines. It makes performance more consistent because the water level 194 in the chilled water reservoir is controlled so the ice bank 178 has a more uniform thickness and volume which maintain the temperature of chilled water in the reservoir at a more constant temperature, and that maintains the temperature of the dispensed beverages at a more uniform temperature. Further, the sealed water reservoir 74 also reduces leakage of water from the reservoir into the surrounding environment, including its electrical and fluid connections, as may occur if the drink station 20 were tilted during repositioning of the drink station, or as may occur if the drink station were on a vehicle, boat or ship that tilts and sways.

The details of forming a sealed water reservoir 74 are not disclosed in detail. Advantageously though, a container may be formed with welded seams, and a top lid with appropriate sealed passages for the fluid lines and electrical wires may be provided. Rubber or silicon or other elastomeric sealing passages are known, and viscous sealant that hardens with time can also be used to seal such passages for fluid lines and electrical lines in the lid or container. A ring seal such as an O-ring seal or a labyrinth seal may encircle the lid or top of the reservoir to provide a fluid tight seal with the sidewalls of the container/reservoir.

Referring to FIG. 3A, the refrigeration system is shown in more detail. The compressor 70 compresses the refrigerant into a liquid and pushes it through the freezer expansion line or evaporator coils. The freezer expansion line 72 (i.e., evaporator coil) is shown in FIG. 3 as being wrapped in the shape of a cylinder with a generally square cross-section, to create an evaporator coil. The refrigerant turns into a gas as it passes through the freezer expansion line and absorbs heat from the water or ice inside the reservoir. The gaseous refrigerant returns to the compressor, where the cycle begins again with compressing the refrigerant. The heat generated by the compressor 70 is dissipated by the heat exchanger 78 and fans 79 which transfer the heat to the air blown through the exchanger 78 by the fans 79. A capillary tube 200 in the refrigerant flow circuit restricts the flow of the refrigerant a predetermined amount to vary the temperature. A drier 202 also in the refrigerant flow circuit removes moisture from the refrigerant. After the condenser, the refrigerant enters the drier 202 and the capillary tube 200 (the low-pressure side) then it enters again the water reservoir where the heat exchanging happens with the water-bath inside the water reservoir and the circulation cycle repeats. The depicted coil also shows the ice temperature sensor 180 that is advantageously located at a predetermined distance apart from the evaporator coil 77 (here the square-shaped coil) to control the thickness of the ice bank 178 (FIG. 4A).

Referring to FIGS. 1D, 2A and 2F, the drink station 20 has an electrical connection 204, preferably on the back of the drink station, to provide electrical power to the various electrical parts and sensors in the drink station. A standard electrical socket is believed suitable, configured to connect to a building electrical line through an appropriate electrical cord. The electrical connection 204 provides electrical power to the various valves, pumps, controllers (e.g., controller 64), lights and other electrically powered devices. Advantageously, the electrical connection 204 is in electrical communication with a transformer 206 (FIG. 11A) that reduces the electrical line voltage (120 V AC or 240V AC) to a smaller direct current voltage. A DC voltage of 24 VDC is believed suitable, and most or all of the various electrically powered components and sensors used herein may advantageously be configurated to operate on that DC voltage. The electrical heating element 154 may operate on the higher line voltage, or on a higher DC voltage.

Alkaline Cartridge

Figure 5:
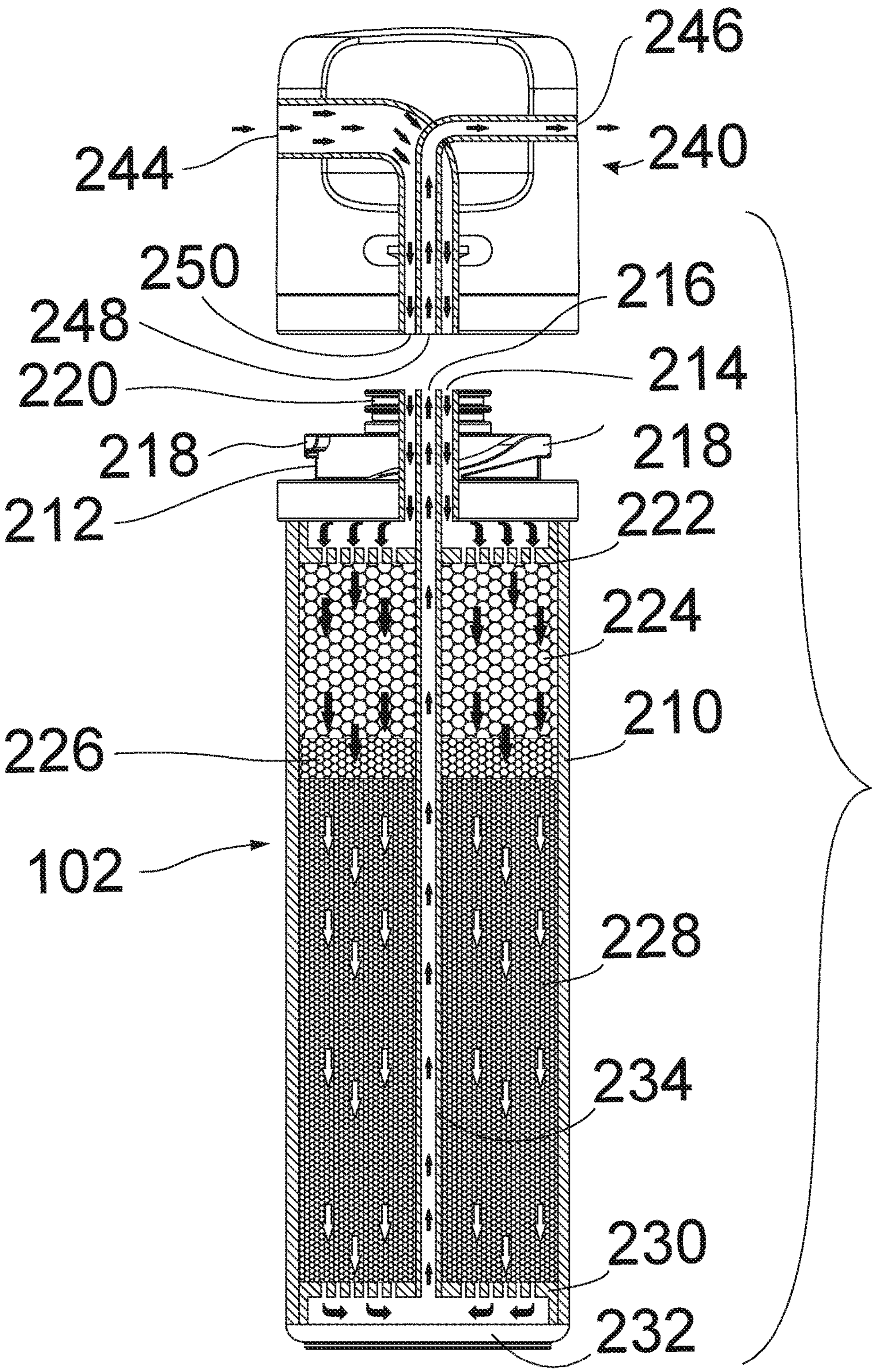
FIG. 5 is a sectional view along the longitudinal axis of an alkaline cartridge and mating manifold.

Referring to FIG. 5, the alkaline cartridge 102 is described in more detail. The alkaline cartridge resembles a water filter cartridge except that the contents of the filter material are changed. Such water filter cartridges are described in various patents, including U.S. Pat. Nos. 7,763,170 and 8,182,699. The complete contents of all U.S. patents, published and unpublished patent applications identified herein, are incorporated herein by reference.

The alkaline cartridge 102 has cartridge housing 210 that is typically cylindrical and extends along a longitudinal axis. The alkaline cartridge 102 has a cap 212 with a fluid inlet 214 and a fluid outlet 216. In the depicted embodiment the cap 212 is cylindrical and extends from the top end of the cartridge with a cammed mounting lugs 218 extending radially outward from at least two opposing sides of the cap. Each cammed lug 218 has a contoured top surface configured to mate with a corresponding surface in a manifold in the drink station that is described later. The fluid inlet and outlet 214, 216 are coaxial and extend along the longitudinal axis of a nozzle 220 extending from the center of the cap along the longitudinal axis of the cartridge. The nozzle 220 typically has one or more ring seals such as O-ring seals, encircling the nozzle to form a fluid seal with a mating surface in the manifold as described later. In the depicted embodiment the inlet 214 is an annular flow path encircling the cylindrical and centrally located outlet flow path 216, but the order and flow direction can be reversed. Also, other nozzle configurations can be used, including physically separated nozzles on different parts of the cap for each of the inlet and outlet.

The water inlet 214 is preferably in fluid communication with an inlet dispersing disk 222 that is shown as having a circular periphery with a plurality of axially aligned passages extending through the disk. An annular rim extends upward around the periphery of the disk. The disk and rim are sized to fit in a fluid tight manner with the inside of the (preferably cylindrical) housing 210. Inflowing water from inlet 214 hits the disk 222 and spreads outward and passes axially through the disk. The annular rim confines outwardly flowing water to the top surface of the disk and redirects water inward and through the axially aligned passages.

A bed of alkaline material 224 is located below the disk 222 and the disk advantageously restrains the top of the bed of material to retain it in position within the cartridge housing 210. The bed of alkaline material 224 advantageously comprises ceramic mineral balls made of alkaline materials, sometimes referred to as tourmaline balls, although the balls are advantageously manmade with porous ceramics. Various alkaline minerals may be intermixed with ceramic material or other binders and sintered to form particles, preferably spherical balls. Binders such as silica sol, polyvinyl alcohol and kaolin are believed suitable. A ceramic composition comprising 10-30 wt % of Al2O3; 10-30 wt % of SiO2; 0.1-1 wt % of P2O5; 0.1-5 wt % of K2O; 0.1-5 wt % of TiO2; 0.1-0.5 wt % of Fe2O3; 1-10 wt % of ZrO2; 0.1-1 wt % of AgO; 0.1-1 wt % of ZnO; 1-5 wt % of Na20; 0.5-10 wt % of CaSO3; 5-20 wt % of a calcium oxide antibacterial agent; and 0.1-2 wt % of a binding agent is believed suitable. The binding agent may include silica sol, poly (vinyl alcohol) and kaolin.

Various alkaline minerals and/or electrolytes may be made into a powdered form, rolled into spheres or balls, preferably with suitable binders, and sintered or fired to fasten the materials together. Water dissolves the alkaline materials as it passes through the alkaline bed 224. Alkaline materials include calcium, magnesium, manganese, potassium, iron, phosphorous, sodium and zinc. Others may be used. The alkaline bed 224 is designed so that the water passing through the bed and out the alkaline cartridge 102 has a PH of 7.2 to 10.0.

After passing through the alkaline bed 224, the alkaline water passes through a filter 226, preferably an ultra-filtration layer, and/or a nano-filtration layer or membrane. The filter 226 is layered between the bed of alkaline material 224 and a bed of activated carbon 228, preferably granular activated carbon (GAC). A second, bottom disk 230 is located below and holds the bottom of the bed of activated charcoal 228. The bottom disk 230 advantageously seals against the inner surface of the housing 210 and has a plurality of passages extending through the disk and axially aligned with the longitudinal axis of the cartridge 102. The bottom disk 230 advantageously has a downwardly extending annular rim encircling the periphery of the bottom disk 230, to form a chamber between the portion of the disk with passages and a closed bottom 232 of the cartridge 102.

A central tube 234 extends along the longitudinal axis of the alkaline cartridge 102 and places the chamber at the bottom of the cartridge in fluid communication with the outlet 216. During use, water flows into the inlet 214 and downward. The water is spread by the top disk 222 over the top of the bed of alkaline materials 224. The filter layer 210 removes mineral particulates from the water and as the water passes downward through the activated carbon layer 228 to further polish the water and improve its taste. Additionally, the GAC slows the flow of alkaline minerals and avoids or reduces sudden changes in alkalinity due to a sudden release of minerals in the water. After passing through the charcoal bed 228 the filtered collects in the bottom chamber between the bottom disk 230 and the bottom of the cartridge 102 where it flows up the central tube 234 and out the outlet 216.

The alkaline cartridge 102 is removably connected to a manifold 240 mounted in the drink station. As seen in FIG. 1, the drink station 20 has an access door 250 in one side of the drink station, and that allows access to the alkaline cartridge 102 to remove it from the manifold 240, and replace it with a fresh alkaline cartridge when the alkaline bed 224 is depleted or when the cartridge otherwise needs replacing.

Referring to FIGS. 2D and 5, the manifold 240 has an inlet port 244 in fluid communication with the ambient water valve 102 to receive a flow of water when the valve opens. The manifold 240 also has an outlet port 246 in fluid communication with the spigot 44 through the alkaline line 104. The bottom of the manifold has a receiving recess (not shown) that is configured to receive and mate with the nozzle 220 and its encircling O-rings to form a fluid tight connection between the manifold 240 and the alkaline cartridge 102. The bottom of the manifold has a receiving holding mechanism (not shown) with flanges located to mate with the cammed mounting lugs 218 to hold the alkaline cartridge from being pushed axially out of the manifold 240 by water pressure.

During use, the access door 242 (FIG. 1) is opened, the used alkaline canister 102 is rotated to disengage the lugs 218 from the manifold 240, and the canister is removed. A new canister 102 is inserted into the manifold and rotated to engage the lugs 218 with mating surfaces in the manifold and seal the cartridge nozzle 220 to the mating surface in the manifold. Plain water flows into the manifold inlet port 244 and out the manifold cartridge outlet 250 and then into the cartridge inlet 216. After passing through the various beds 224, 228 and filters 210 in the alkaline cartridge, the (now) alkaline water passes up the central tube 234 and through the cartridge outlet 216 and into the manifold cartridge inlet 248 and then out manifold outlet 246 an into the alkaline water line 104.

Hot Water Tank

Referring to FIGS. 2A, 2G, and 6A-6B, the hot tank 152 is described. The hot tank 152 has a tank housing 260 having insulation 261 on at least portions of the outer surface of the housing. The tank housing 260 encloses a hot water reservoir 262 in a lower or bottom portion of the housing and a vapor chamber 264 in the upper or top portion of the tank housing. The tank housing 260 is shown as having a rectangular configuration with insulation 261 on the top and bottom surfaces of the tank housing, but other configurations can be used. A heater 154 extends from a bottom of the tank housing 260 upward and is located near a first end of the housing 260. The heater 154 advantageously includes an electrical resistance heating element enclosed in a stainless-steel enclosure to reduce scaling on the outside of the heater when it is immersed in the water being heated.

The heater 154 extends a predetermined distance upward into the hot water reservoir. A temperature sensor 156, preferably a thermistor and more preferably an NTC sensor, extends from the end wall into the hot water reservoir. The temperature sensor is preferably an NTC sensor in a stainless-steel housing and is advantageously located very close to (within 1 mm) the flat top of the heater 150, and preferably located so it physically contacts the top of the heater 150. If the temperature sensor 156 contacts or nearly contacts the heater 156, a spike in the temperature at the sensor 156 can indicate a low water level in the hot water reservoir 262. The temperature sensor 156 is in electrical communication with a controller 64 that uses the sensor's signal to either apply or shut off electrical power to the heating element 268 to maintain the temperature of the water in the hot water reservoir 262 within a predetermined rage of temperatures. A controller 64 that activates the heating element 26° F. at 170° F. and shuts off the electrical power at 210° F. or 99° C. is believed suitable.

A thermostat 158 is located in the end wall of the tank housing 260 adjacent the heater 150. In the event the temperature sensor in the thermostat 158 fails and the water in hot water reservoir 262 gets above a predetermined threshold, the thermistor 156 sends a signal to the controller 64 that results in cutting off electrical power to the heating element. A layer of water separates the thermostat 158 from the adjacent heater 150 so the thermostat senses the temperature of the water, preferably the temperature at the bottom end of the heater and the hot tank. The thermostat 158 regulates the temperature of the heater 154. The thermostat 158 may be attached at any other locations within the hot water reservoir as long as it measures the water temperature and is immersed most of the time. The thermostat 158 normally opens an electric circuit interrupting power to heater 154 when the temperature of hot tank exceeds 100° C. The maximum temperature can be varied, and it is not uncommon for other water heaters in drink stations to have the maximum temperature at 120° C.

The vapor chamber 264 is separated from the hot water reservoir 262 by a dividing wall 274 that separates the hot water reservoir 262 from the vapor chamber 264. A first tube, control tube 276, has a first end that extends through the top side of the hot tank housing 260 so the first end is located outside the tank housing 260 where it may be connected to the hot water line 160. The control tube 276 has an opposing, second end referred to a slotted end 278, which is in fluid communication with both the hot water reservoir 262 and the vapor chamber 264. The slotted end 278 has a plurality of slots 280 extending along a longitudinal axis of the control tube 276 and extending through the wall of the hollow tube. Four, equally spaced slots 280 are used in the depicted embodiment. The control tube 276 is preferably of stainless steel to reduce corrosion and scaling that may alter the slot dimensions over time.

A vent opening 282 also extends through the wall of the control tube 276 near the end of the slots 280. The vent opening 282 is small enough that water does not drip out of it when the control tube is filled with hot water, and it provides an air path to ensure hot water does not get air-locked in the control tube 276 and hot water line 160 when the spigot 44 is shut off or closed, as the pressure pulse in the hot water line from shutting off or closing the spigot 44 to stop dispensing hot water will vent through the vent opening 282 and assure immediate venting and backflow of hot water through the control tube into the hot water reservoir 262 in a continuous flow of hot water, and reduces or avoids dripping of water out of the control tube into the hot water reservoir. This vent opening 282 is optional. The slots 280 and vent opening 282 are located inside the vapor chamber 264. The slotted end 278 is in fluid communication with the hot water reservoir 280 through a discharge opening 284 in the dividing wall 274 which discharge opening is advantageously, but optionally, in an alignment structure.

Figure 6A:
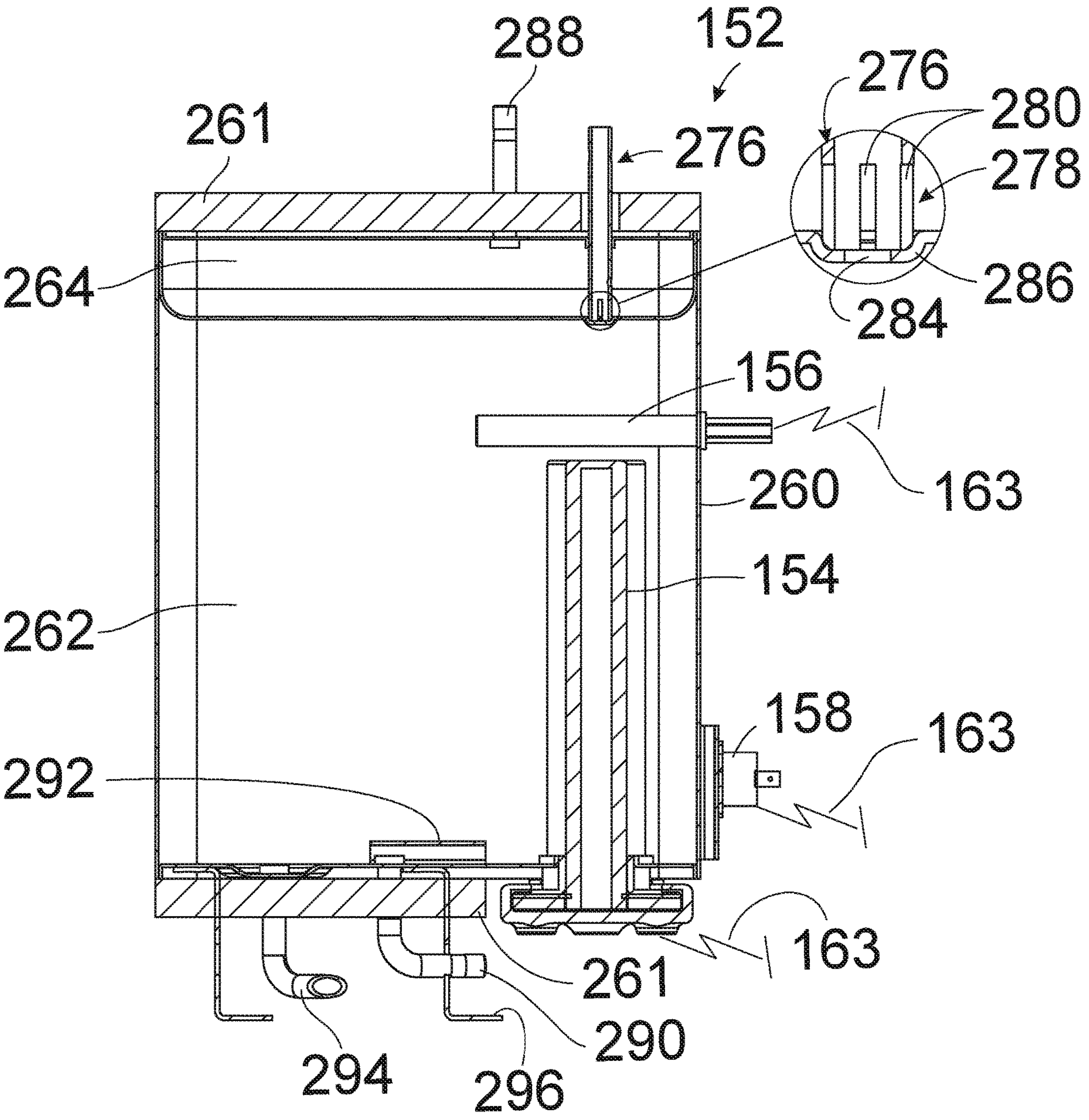
FIG. 6A is a cross-sectional view of the hot water tank of FIG. 6C, taken along section 6A-6A of FIG. 6C.
Figure 6B:
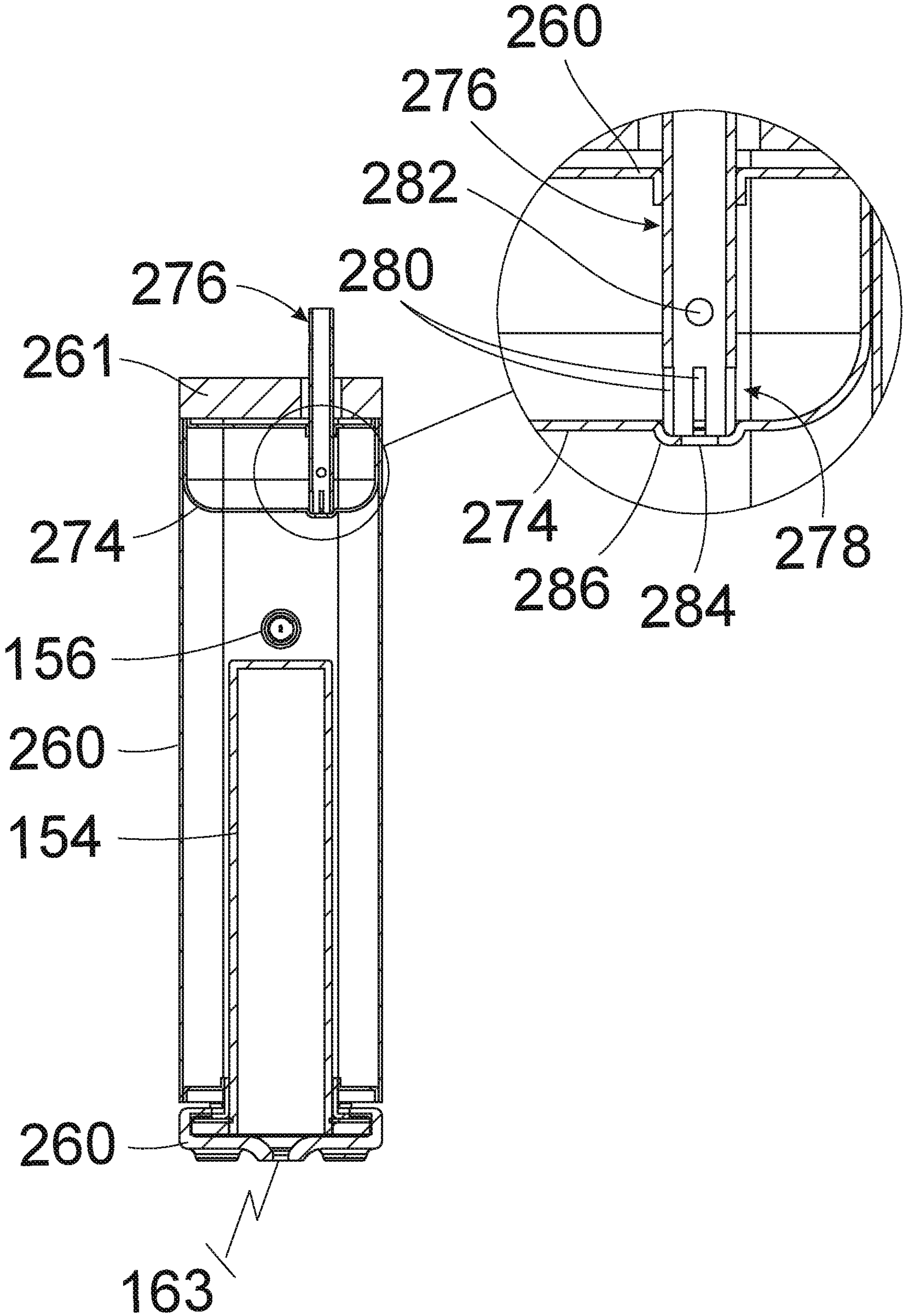
FIG. 6B is a cross-sectional view of a hot water tank of FIG. 6C, taken along section 6B-6B of FIG. 6C.
Figure 6C:
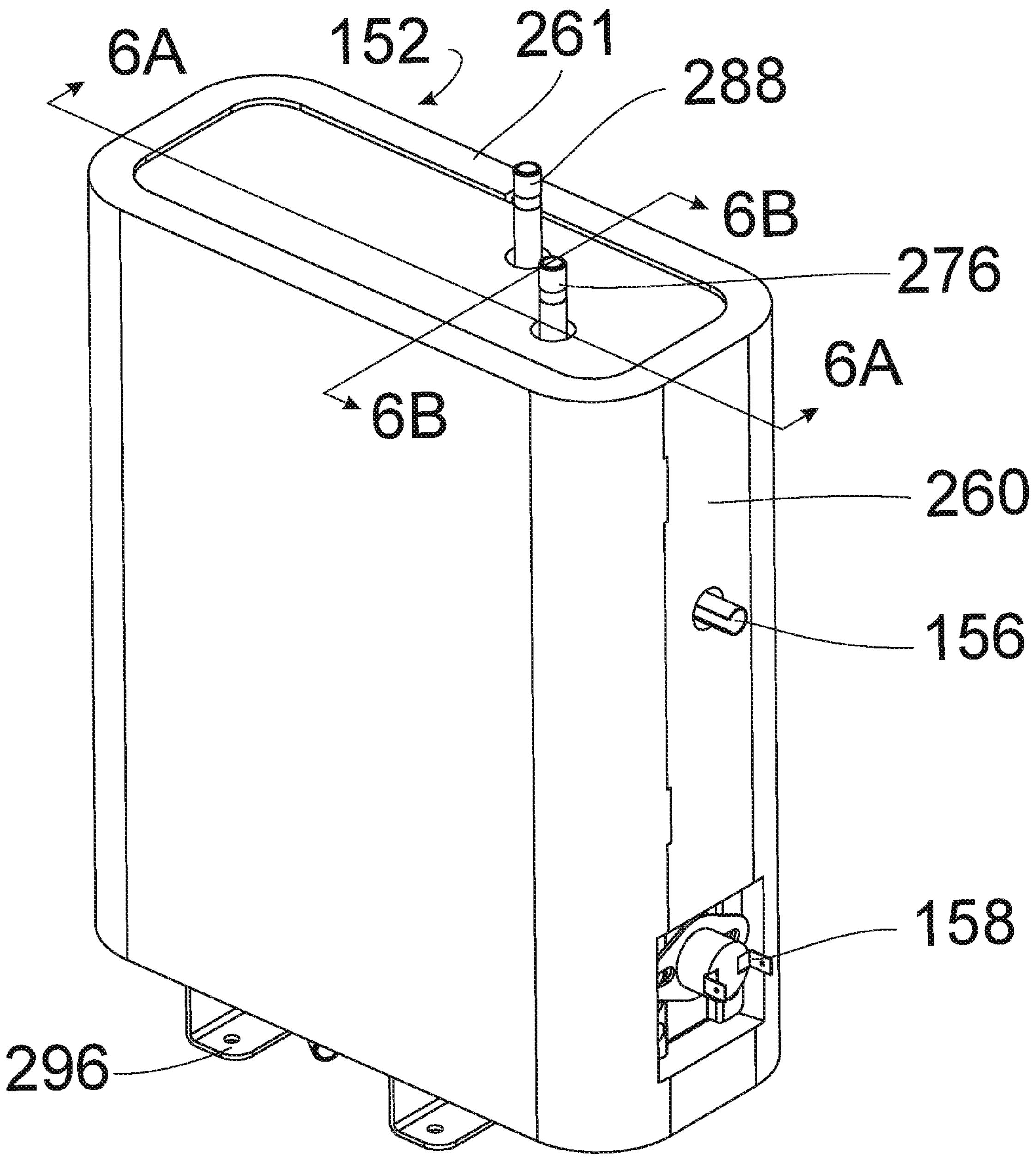
FIG. 6C is a perspective view of a hot water tank.

In the depicted embodiment of FIGS. 6A-6B, the dividing wall has an alignment structure to align the control tube 278 with the discharge opening 284. The alignment structure is shown as seating recess 286 in the dividing wall 274 with the seating recess shaped to receive the distal end of slotted end 278 and hold the slotted end 278 in a fixed position aligning the center of the control tube 276 with the discharge opening 284. In the depicted embodiment the control tube 276 is a cylindrical tube and the seating recess 286 is a shallow, circular recess in the dividing wall 274.

A second tube, vent tube 288 extends through the top of the hot tank housing 260 and insulation 261 to be placed in fluid communication with the vent tube 262 and spigot 44. A water inlet 290 is located in the bottom of the hot water reservoir 262 to place the hot water reservoir 262 in fluid communication with the hot water valve 150 to supply water to the hot water reservoir. The water inlet 290 is shown as a tubular fitting extending downward and sideways to connect to the fluid line from the hot water valve 150. Optionally, the water inlet 288 may have a deflector or directional device 292 inside the hot water reservoir to direct incoming water parallel with the bottom of the hot water reservoir 262, so the hot water reservoir fills from the bottom up, pushing the hot water toward the discharge opening restrictor 284. The deflector brings the incoming water closer to the heater and favor the mixing of the incoming water at room temperature with the rest of the water inside the hot water reservoir 262. A hot water drain fitting 294 (FIG. 6A) is advantageously located in the bottom of the hot water reservoir 262 and is preferably at a low point of the hot water reservoir or in a recessed portion so water drains out the reservoir when it is desired to empty the reservoir. The drain fitting 294 is shown as a tubular fitting passing through the bottom wall of the hot water housing 260 and insulation 261 and is located in a drain recess. The drain discharge fluid line for the hot water tank is not shown in the flow diagram of FIG. 2G but is advantageously in fluid communication with the hot water drain outlet 298 (FIG. 1D) on the back of the drink station 20. A further fluid may be connected to the drain outlet 298 to connect the outlet to a building drain line.

Mounting brackets 296 are connected to the housing 260 to connect the hot water tank 152 to supporting structure within the drink station 20. The depicted mounting brackets 296 are shown as two L-brackets fastened to the bottom of the hot water tank 152, with the water inlet 290 passing through an opening in one of the brackets In use, steam from the heated water in the hot water reservoir 262 rises and passes through the discharge opening 284 and into the vapor chamber 264. If steam condenses into water in the vapor chamber 264, the condensed hot water passes through the slots 280 in the slotted end 278 of the control tube 276 and through the discharge opening 284 and into the hot water reservoir 262.

In use, pressing the hot water button 58 opens the hot water valve 150, which opens to pass water through the water inlet 240 in the bottom of the water tank 152, where the deflector 292 directs the incoming water parallel to the bottom of the hot water reservoir 262 and forces the hot water at the top of the reservoir up and into through the discharge opening restrictor 284 and through the control tube 276 and into the hot water line 160 to the spigot 44 for discharge. As water is forced through the discharge opening restrictor 284 and into the hot water line 160 it creates a suction effect that draws steam from the vapor chamber through the slots 280 and into the stream of water passing through the hot water line and through the spigot 44. The steam contains more energy than hot water and provides a more efficient heating system to provide hot water at the spigot 44 and provides extra heat energy to compensate for the heat loss as the hot water passes through the hot water line 160 which is preferably hot actively heated, although it is insulated. All of the chilled water lines in the drinking station may be insulated.

When the spigot 44 closes, the cessation of fluid flow causes a reflux pressure which can push hot water into the vapor line 162 and back toward the hot water tank 152. The vapor line 162 acts as a ventilation line so that a vacuum lock in the hot water line 160 does not prevent the hot water from flowing back into the hot water tank 152, but instead air pressure urges the hot water to flow back along fluid passage 160 (and if water enters it, along vapor line 162) from the spigot 44 through the hot water line 160 and into the hot water tank 152. The vent opening 282 also allows fast reflux or return of hot water to the hot water reservoir 162 as the pressure pulse from closing the hot water dispensing spigot 44 may ensure the water in the control tube 276 is not air locked and instead flows out of the tube and into the hot water reservoir. Hot water returning through the hot water line 160 passes into the hot water reservoir 262 while hot water from the vapor line 162 passes into the vapor chamber. The vent opening 282 also reduces small volumes of water from being trapped by an air lock in the control tube 276 or slotted end 278. Water in the vapor chamber from any source passes though the slots 280 in the slotted end 278 of the control tube 276 and passes through the discharge opening 284 and into the hot water reservoir 262. The hot water line 160 from the hot water tank 152 to the spigot 44 is advantageously inclined at least slightly upward, so that gravity urges the hot water to flow backwards from the spigot to the hot water tank.

The volume of the hot water tank 152 is selected based mostly on the volume of hot water demand, with a larger tank 152 used when a large volume of hot water is expected to be dispensed at spigot 44. The relative volumes of the vapor chamber 264 and hot water reservoir 262 are also important because the vapor chamber 264 reduces the usable volume of hot water in the hot water reservoir 262, and if the volume in the vapor chamber 264 is too small then reflux water from shutting off or closing the spigot 44 can enter the vapor chamber 264. Similarly, the inflow of water into the hot water reservoir 262 is important so that hot water flows through the control tube 276 and spigot 44 rather than flow into the vapor chamber 264. The relative flow through the discharge opening restrictor 284 and input fitting 294 are regulated to achieve optimum operation, with the discharge opening 284 acting as a flow restrictor to ensure pressure to force hot water through the discharge tube and create a vacuum in the vapor chamber 264 that sucks out the hot vapors rather than flood the vapor chamber with hot water flowing through the slots 280. In a sense, the flow through the control tube 276 is regulated so the hot water passes through the restrictor 284 at a flow rate sufficient to create suction at the slots 276 rather than flowing water through the slots and into the vapor chamber.

Conceptually, the volume and pressure of water entering the hot water tank 152 and the volume and pressure of water exiting through the control tube 276 are balanced to create a suction at the slotted end 284 located inside the vapor chamber 264 that entrains steam from the vapor chamber into the hot water flowing upward to the spigot 44, with sufficient pressure to flow the hot water upward to the spigot. In one preferred embodiment, the water inlet 294 has a diameter of 4.4 mm to provide a flow rate of 1 liter per minute through the discharge opening 284 so that the hot water from the chamber will pass through the smaller sized flow restrictor formed by discharge opening 284 which has a diameter of 3 mm at a flow rate sufficient to suck hot water vapor through the slots 280 and into the water stream entering the hot water line 160 and to the spigot 44 which is at an elevation higher than the hot water tank 152 and the hot water outlet 276. The slots 280 are advantageously sized to create a venturi effect when the minimum desired flow rate is achieved. Four slots 1 mm wide and 4-5 mm long are believed suitable in the preferred embodiment. A vent opening 282 about 2-3 mm diameter is believed suitable for the above described slotted end 278. Advantageously, the flow rate of 1 liter per minute is a minimum flow rate at a line pressure of 40 psi and is selected as a design criteria because most municipal water lines have a line pressure that is 40 psi or greater.

Using a hot water tank 152 located below the dispensing spigot 44 is believed to offer several advantages in connection with the design of the beverage dispensing system. The discharge opening 284 is sized smaller than the fluid inlet 290 which increases the discharge pressure with which hot water is forced from the hot water tank 152 and that increased pressure is used to push the hot water to the spigot 44 which is higher than the hot water tank. That increased discharge pressure is used to create the venturi effect which sucks steam from the vapor chamber 264 and entrains it in the stream of water directed to the spigot 44. The inflow of water through the inlet 290 at the line pressure (or other regulated pressure above 40 psi) is directed by deflector 292 to force the hottest water at the top of the hot water reservoir 262 out the discharge opening. The location of the hot water tank 152 below the spigot 44 allows water to drain with gravity and return to the tank (once the vent line 162 releases the vacuum that might hold the water in the line) and thus allows the spigot to be cooler than if it remained in thermal contact with the hot water in the hot water line 160 even when no water was being dispensed.

Carbonators

Referring to FIGS. 2E, 3B-3D, and 7A-7C, the electronic carbonation system is described. This system is described in U.S. patent application Ser. No. 16/329,043, filed Feb. 27, 2019, titled Method and Apparatus for Instantaneous On-Line Carbonation of Water Through Electrostatic Charging, the complete contents of which are incorporated herein by reference. Briefly described, an apparatus is provided for carbonating a mixed input flow of pressurized and refrigerated carbon dioxide and water. A first cartridge is disposed within a carbonation chamber that includes porous micromesh net in fluid communication with an input flow and a central cavity in fluid communication with the carbonation chamber output port. The micromesh net is configured to break up chains of water molecules passing through the net, to enhance bonding between the water and carbon dioxide molecules within the cartridge. The micromesh net also responds to the flow of water and carbon dioxide molecules impacting and passing through the net by generating a passive polarizing field that has a polarizing influence on the water molecules to further enhance carbonization. Beads may be provided within the cartridge for capturing and stabilizing carbon dioxide molecules to yet further enhance bonding between the water and the carbon dioxide molecules.

Figure 7A:
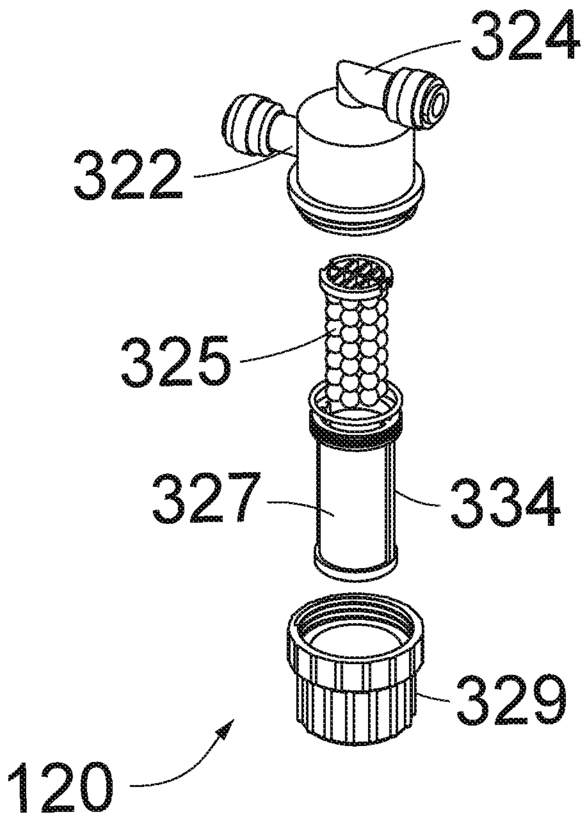
FIG. 7A is an exploded perspective view of a carbonator chamber that increases carbonation.
Figure 7B:
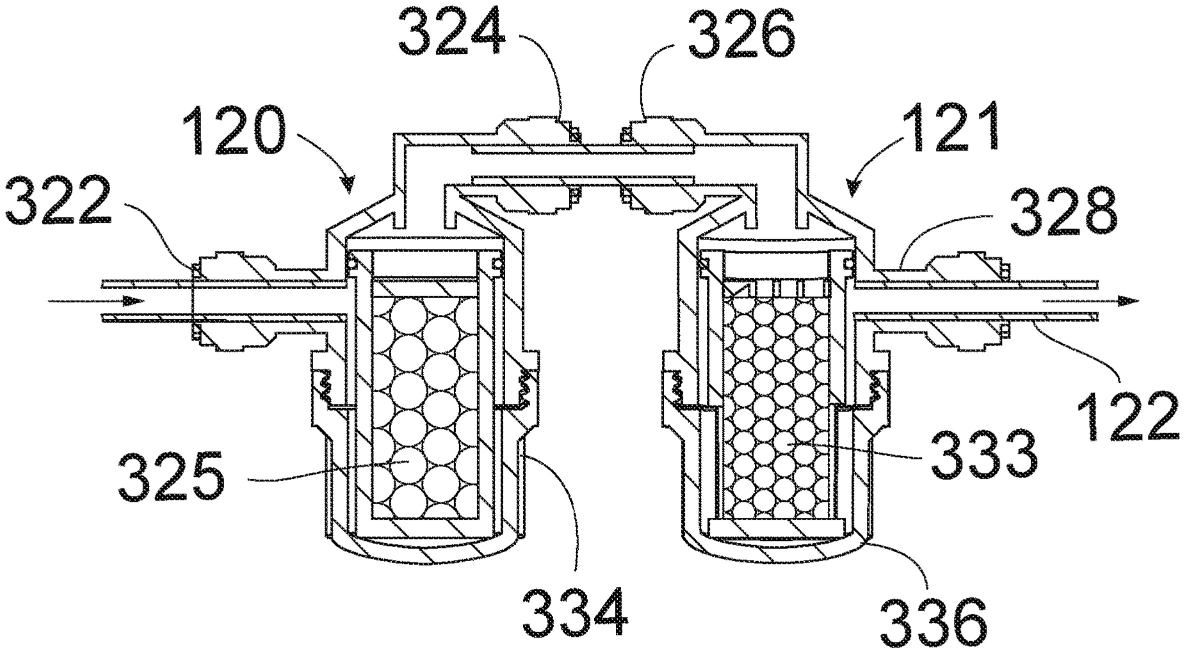
FIG. 7B is a sectional view of a first embodiment of a carbonator system using two carbonators.
Figure 7C:
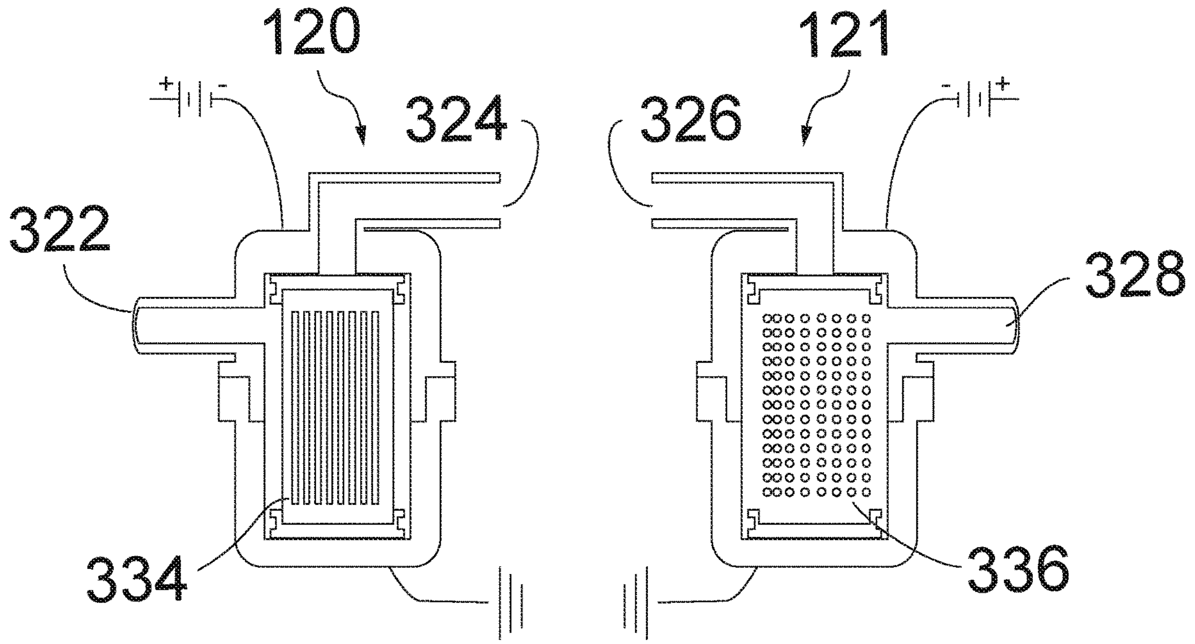
FIG. 7C is a sectional view of an alternative embodiment of a carbonator system using two carbonators.

More specifically, in reference to FIGS. 7A-7C, the construction is described first, then the operation. The first carbonation chamber 120 defines an interior having a first (preferably cylindrical) micromesh net 334 and optionally a plurality of cylindrical nets or a plurality of first glass beads 325. The second carbonation chamber 121 defines a similarly shaped interior having a second plurality of glass beads 333 within a second (preferably cylindrical) micromesh net 336 like that of net 334.

The carbonated water lines from the cold water and carbon dioxide mixed in the venturi in the splitter 119 (FIG. 2E) or the intermixing venturis in fluid lines 138, 140, 142 (FIG. 2F) are in fluid communication with the input port 322 of the first carbonation chamber 120. The flow from that first carbonation chamber 120 passes out of first chamber output port 324 and into the second carbonator inlet port 326. The flow through the second carbonation chamber 121 is from the second chamber input port 326 and out of the second chamber output port 328 which in turn is in fluid communication with the chilled carbonated water line 122.

The first carbonation chamber 120 defines an interior preferably having a 100 μm micromesh 334 and a plurality of 5 mm glass beads disposed within the carbonation chamber 120. The micromesh 334 can vary in size. The second carbonation chamber 121 preferably defines a 400 μm micromesh net, within which are plurality of 1 to 3 mm glass beads. The micromesh nets are preferably cylindrical.

Each carbonation chamber 120, 121 thus advantageously has a cap 325 and a base 329, with the chambers 120, 121 defined by the cap portion 325 and the base portion 329. The cap and base are shown as having elongated portions with mating threaded portions at the joined ends so the long body of the cap and base form the respective chambers 120, 121. But the cap 325 and base could be shorter and on opposing ends of an elongated tube which forms the main portion of the chamber.

The micromesh net 334 extends about the interior chamber and is shown as forming a cylindrical tube with the glass beads 325 disposed inside the micromesh net 334. Micromesh net 334 advantageously has a top and bottom support ring (FIG. 7A). Other devices, including an internal port may be provided to facilitate flow rate between the chambers to facilitate fluid flow between the interior of the micromesh net 334 and the carbonation chamber input port, and to facilitate fluid flow through and about the beads inside the micromesh net. The micromesh net and beads may be provided as a single unit or cartridge, with the grate 334 holding the beads 325 inside the cartridge 327 and net (FIG. 7A).

Fluid flow into and out of the carbonation chambers may be varied. In use, carbonated water output from the second carbonation chamber 121 communicate to the carbonated fluid line 122 or communicated to a flow compensator which in turn is in fluid communication with the carbonated fluid line 122 and the outlet spigot.

As the water molecules pass through the micromesh net 334, 336 the charge on the net is believed to influence water molecules orientation because it is known in the art that water molecules are polarized. Such passive polarization, created as a consequence of the interaction of the molecules and the net, thereby enhances the dipole bonding between the water and carbon dioxide molecules.

Alternatively, the micromesh net may be implemented as a pair of concentric nets 334 (FIG. 7C) connected to a voltage source, to provide active polarization of the nets to enhance orientation of the water molecules passing through the net. The particular orientation of current flow through the nets may be implemented in accordance with the desired polarization of the water molecules as they pass through the nets.

As indicated above, the first carbonator 120 and its carbonation chamber 120, may include the micromesh net 334, through which the input water and gas mix passes, is preferably formed of one or more independent rings of micromesh metal, such as stainless steel. The passage of the carbonated water through the micromesh net 334, breaks the long molecule compounds of water while creating a weak electrostatic field due to the high-speed passage of more polarized molecules which, within a short period of time (less than one second) the more polarized molecules of the fluid mix (water and carbon dioxide) so the short (broken) chains of water molecules have a higher likelihood of forming dipole to dipole electrostatic connections with the carbon dioxide molecules. In the present embodiment, static electric fields are self-induced by the passage of polarized molecules: creating electrical induction. Other embodiments of the same apparatus may utilize a process in which electric fields are artificially generated externally, through a common DC power supply, or multiple DC power supplies, resulting in highly polarized water and gas molecules that are immediately oriented, in accordance with the electrical filed generated on the net. Whichever is the solution adopted (induced electrical field or artificially generated), the result is high polarization and orientation of the molecules of liquid and gas. In case of passively induced electrical fields, not only does the induced static electric field contribute to the polarization of molecules transiting within, but the polarization itself modifies the electric field that is generated.

Although the electrostatic field herein generated by the passage of polarized molecule is expected to be relatively weak, the resulting increase in the polarization of water molecules increases the likelihood of the formation of bonds between the water molecules and the carbon dioxide molecules, whose bonds, as known in the art, are particularly weak. This is because as the degree of polarization of each water molecule is increased the total number of water molecules with a high degree of polarization is increased. By breaking the long chains of molecules and gradually orienting the same, in response to the electrostatic field, there is an increase in the (temporary) formation of carbonic acid inside the water, and the resulting water has been found to be more highly carbonated. In addition, the water molecules have been found to retain a bond with the carbon dioxide molecules that mitigates dispersion of the carbon dioxide molecules, (i.e., bubbling, when the carbonated water is exposed to air during dispensing). As bonds are increased, the carbonization in water is higher and more durable over time, as the carbonated water sits in an open glass or bottle.

In the illustrated embodiments, the micro mesh nets are formed of thin stainless-steel strands of approximately 2 to 100μ in diameter, having an open mesh area of approximately 5 to 800μ. A micro mesh net 334, 336 may be formed of other materials, and the size of the strands/open mesh areas and may be varied as suited for specific pressure levels, flow rates, desired levels of carbonation and other factors.

Beverage Container Alignment Light

Figure 8A:
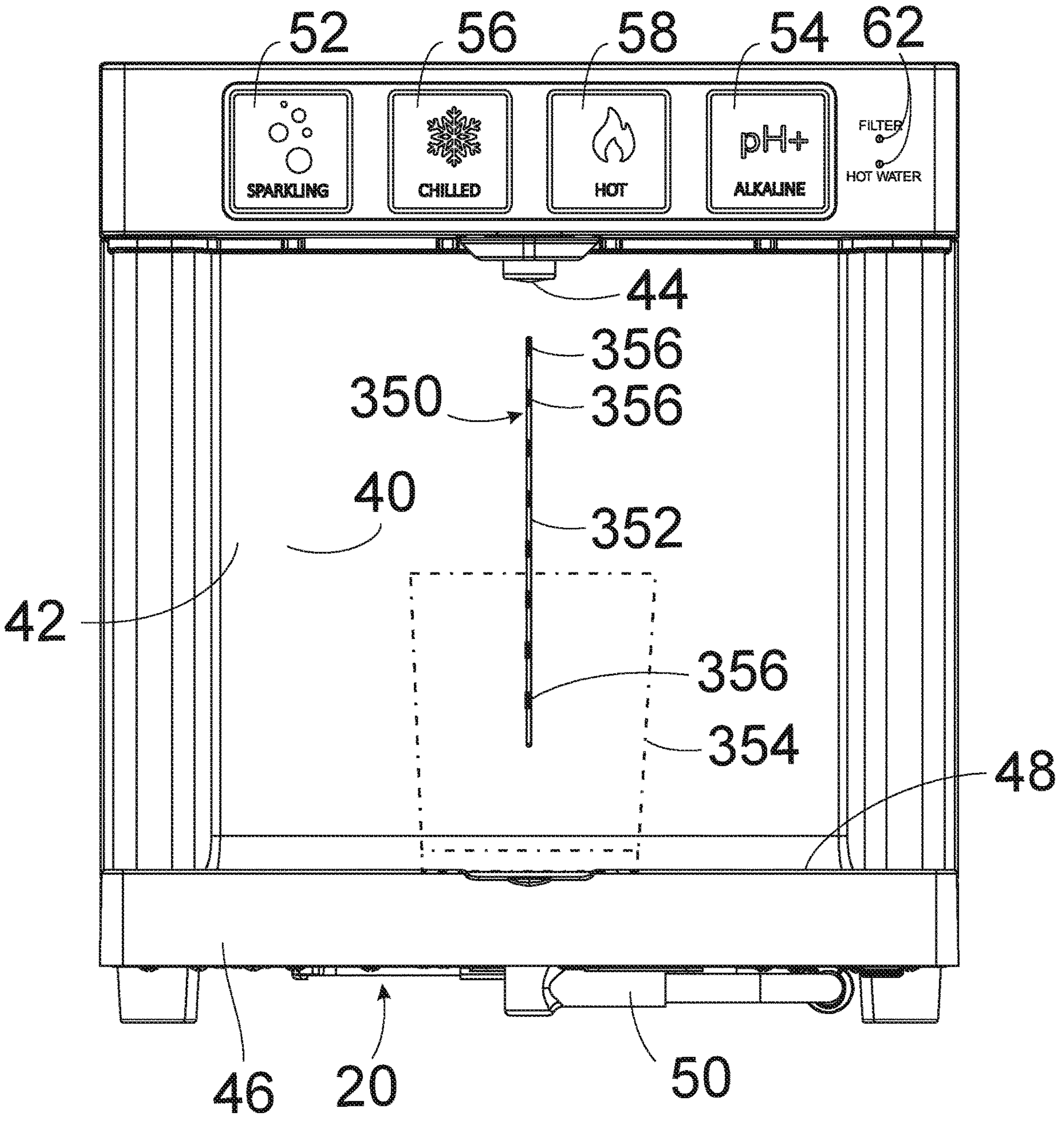
FIG. 8A is a front view of the drink station with a different number of dispensing buttons and with an optional cup alignment mechanism.
Figure 8B:
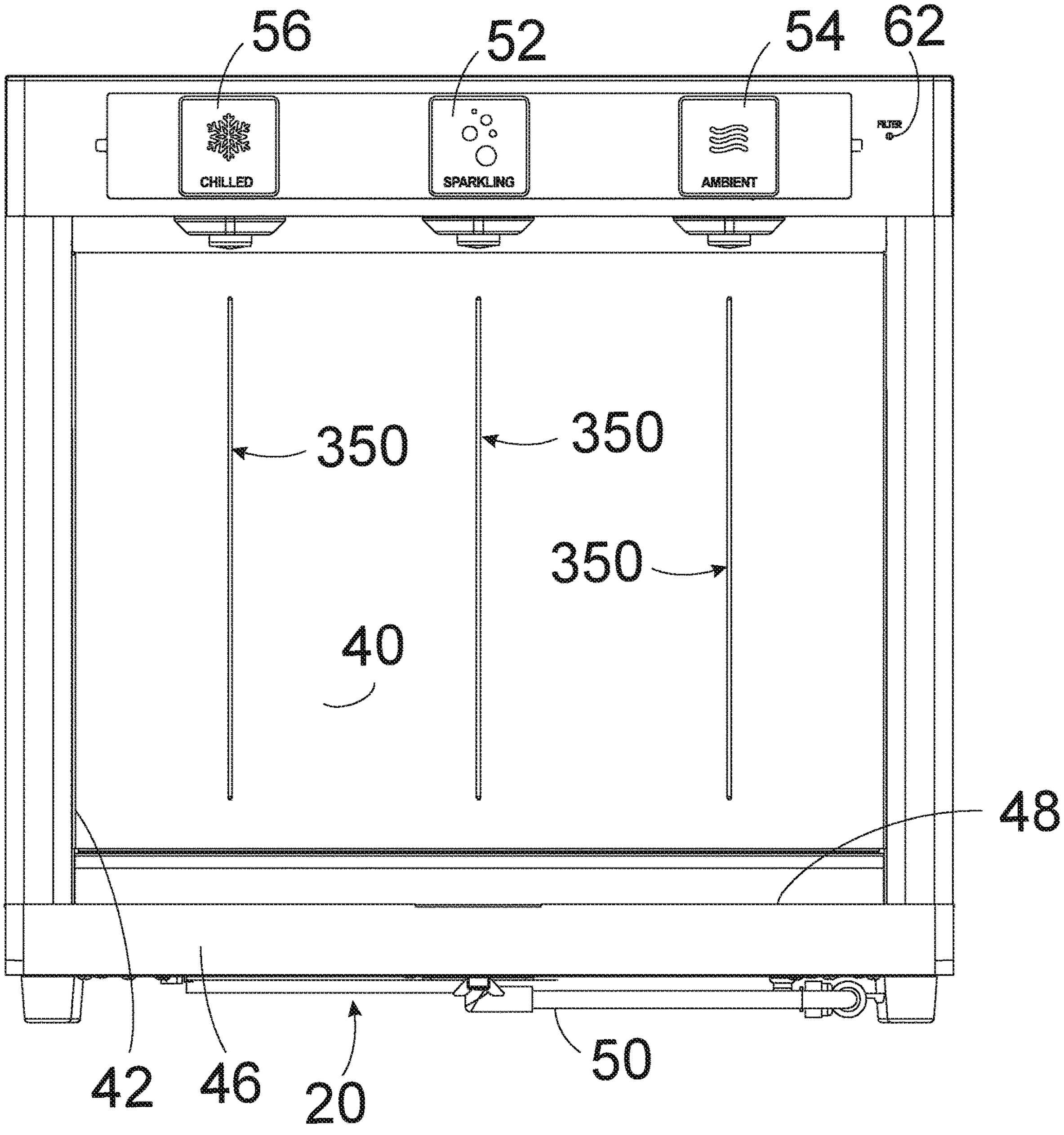
FIG. 8B is a front view of the drink station with a different number of dispensing buttons and plural spigots and with an optional cup alignment mechanism.

Referring to FIGS. 8A-8B, the drink station 20 is shown having only four drink dispensing buttons instead of five as in FIG. 1A and having a drink alignment mechanism 350. The drink alignment mechanism may be used with the embodiment of FIG. 1, as may the fewer number of buttons. The four drink dispensing buttons are dispensing button 52 for carbonated or sparkling water, button 56 for chilled water, button 58 for hot water, and button 54 for alkaline water. The auto-fill button 60 is omitted. Four buttons allow the use of larger buttons and larger printed indicia on the buttons to identify which button activates the dispensing of which beverage. Advantageously, the drink buttons are on the top portion of the drink station, above the filling area 40 and drain pan 46 and drain grate 48, but the location can be varied. A plurality of indicator lights 62 are also advantageously on the top panel of the front of the drink station, with the indicator lights 62 preferably including a red light to indicate if hot water is available, and with another light that indicates the water filter or alkaline cartridge needs replacing. Various ways of achieving the electrical connection and activation of these indicator lights are known and not described herein.

Advantageously, a single spigot 44 is used to dispense all of the beverages, as in the drink station of FIG. 1. The drain pan 46 and its drain grate 48 preferably extend across a substantial width (i.e., side-to-side) of the front of the drink station 20 so a user may set several beverage containers or drink cups 354 on the drain grate for faster and easier filling of the containers and cups. To help the user visually align the cup with the spigot a light bar 352 is provided that extends vertically and is aligned with the dispensing nozzle of the spigot 44. The visual alignment avoids difficulties associated with using a circular, cup-sized recess below the dispensing spigot to align the cups with the spigot because the recess creates an offset that allows cups to tilt and fall over when empty or when being filled.

The light bar 352 advantageously takes the form of an elongated, lighted member that is electrically controlled to create a visual light that moves from the top of the filling area 40 downward toward the bottom of the drink station and drain pan 46 in a repeating pattern, and with the visual length of the light bar aligned in a vertical plane through the spigot and parallel to the opposing, rectangular sides of the drink station 20 as shown in FIG. 8A. The light bar 352 is connected to the sidewall 42 that separates the filling area 40 from the inside of the drink station. The light bar 352 advantageously includes a plurality of LED's 356 arranged in a vertical line on the sidewall 42 and extending downward from a location on the sidewall behind the spigot 44 and vertically aligned with the spigot 44 on that sidewall. If the beverage container is aligned laterally along the width of the drain grate 48, the spigot 44 will dispense its stream of liquid into the center of the beverage container.

Advantageously, the light bar 352 includes a plurality of LED's 356 close enough together that each individual LED may be separately and sequentially activated by a timer and control circuit to create a repeating pattern of lights extending from the top of the light bar to the bottom of the light bar. Advantageously, the LED's are located behind a strip of clear or translucent plastic that forms a shield, so the LED's 356 are shielded from the dispensed beverages being splashed on the LED's. Advantageously, an elongated slot in the sidewall 42 may be formed with the plastic shield filling the slot for easy cleaning. The illuminated light bar 352 allows a user to visualize the stream of liquid dispensed from the spigot 44 and assists in aligning a beverage cup with the dispensed liquid.

As indicated by the dashed lines in FIG. 8B, if the drink station 20 has more than one spigot 44, more than one light bar 352 may be used, with one light bar 352 associated with a different one of the spigots and aligned with that spigot as described above. A continuously lit light bar 352 is believed usable, but less desirable. The timing and electrical control circuits to achieve the repeating cycle of moving lights is known, as reflected by various holiday lighting decorations, and are not described in detail herein.

Each of the LED's 356 or other light source for each of the light bars 352 is in electrical communication with the controller 64 which contains electrical circuitry to activate the lights in a stationary or repeating pattern when electrical power is provided to the controller 64, or when a drink selection button 52, 54, 56, 58 or 60 is activated. The controller may contain a timer circuit that shuts off the lights after a predetermined time of illumination without intervening activation of one of the drink selection button. If a light bar 352 is provided for each spigot the light bar only for that spigot may be activated to provide the described lamination.

System Operation

There is thus advantageously provided a dispensing apparatus (FIG. 2A-2G) such as drink stations 20 for chilled and sparkling drinks that includes a main water inlet port 86 and one or more water flow lines in fluid communication with the devices described below, including a water delivery pump 92 which is in fluid communication with at least one stainless steel drinking water chiller coil 94 that is at least partially inserted into a heat exchanger that preferably takes the form of a chilled water reservoir 74, to chill the incoming water from the water delivery pump. Other heat exchanging devices can be used, but the chilled water bath achieved with the chilled and insulated reservoir 74 is preferred. A water line splitter 132, preferably located inside or downstream of the drinking water chiller coil 94 splits the chilled water line into at least one chilled water line 98 in fluid communication with the spigot 44, and at least one sparkling water line 122 that is ultimately in fluid communication with the spigot 44. The beverage station also has a normally closed chilled water valve 96 positioned downstream of the drinking water chiller coil 94 and downstream of the water line splitter 132.

A normally closed sparkling carbonation, such as water valve 116 is positioned downstream of the drinking water chiller coil 94 and downstream of the water line splitter 132. At least one normally closed carbon dioxide valve 112, preferably a valve, is positioned on the gas line from the internal carbon dioxide gas canister 108 to a static venturi-restriction device 144 (FIG. 2F) or the venturi in the splitter 119. The at least one static venturi-restriction device (144, 119 splitter with venturi) allows carbon dioxide gas to enter into the chilled water, preferably at a location downstream of the drinking water chiller coil 94. Preferably, one or more static in-line carbonation chambers 120, 121 produce instantaneous and additional carbonation of the water, device 120, 121 positioned downstream of the venturi devices 144, 119 (splitter with venturi), and at least partially inserted into the heat exchanger of the chilled water reservoir 74 and preferably adjacent drinking water chiller coil 94.

An electronic controller 64 is configured to control the water delivery pump 92, and the three normally-closed valves 96, 116 and 112 and is in communication with these valves and with the drink selection buttons 52, 56 associated with those valves and the dispensing of chilled water and carbonated water from the spigot 44. Advantageously, the controller 64 is in electrical communication with the identified valves and buttons through the electrical communication lines described herein, or such other electrical communication lines as are appropriate to the specific application. These three valves are normally closed so drink dispensing apparatus has a the normally closed chilled water valve 96, a normally closed sparkling water valve 116 and a normally closed carbon dioxide gas valve 112.

The beverage dispensing apparatus 20 has at least two selectors, such as buttons 52, 56 to alternatively dispense either chilled still water or chilled carbonated water. When the chilled still water selector 56 is activated, the water delivery pump 92 is powered on by the controller 64, and the normally closed, chilled water valve 96 is excited electrically to open and allow chilled still water to be dispensed from spigot 44. When the chilled sparkling selector 52 is activated, the water delivery pump 92 is powered on, the sparkling water valve 116 and the carbon dioxide gas valve 112 are both excited to open to allow carbonated water to be dispensed from spigot 44.

While the beverages are described as being dispensed from the same spigot 44, they could be dispensed from separate spigots or from other dispensing devices. Further, when the electricity used to open the normally closed valves described herein is removed or shut off, the valves close. Thus, they are described as being "excited to open." The closed valve may be considered to be shut off or turned off, and an open valve may be considered as being turned on as with a water faucet in a sink. Thus, open and closed valves correspond to opening and closing valves or turning valves on and off. But regardless of the detailed operation, the controller 64 or control module 64 contains opens and closes the various valves and turns power to various pumps on and off and applies power to and receives signals from various sensors. The basic control schematics for the electrical controls are described herein, but other control circuits and control logic and modules are believed usable.

In further variations of the above described beverage dispensing apparatus 20, the normally closed main inlet valve 90 is positioned downstream of the main inlet port 86 and controlled by the controller 64 such that when any selector button 52, 54, 56, 58 or 60 is activated, the main inlet valve 90 is excited and opens. The apparatus 20 preferably includes a flowmeter 88 electrically connected to the controller 64 that allows the controller 64 to measure the quantity of water passing through the flowmeter, and thus to indicate the volume or quantity of water being dispensed through the spigot 44. Such control, communication and volume measuring is known in the art and not described in detail herein. The apparatus 20 also may have an ambient temperature water line 104 in fluid communication with a normally closed ambient water valve 100, in communication with the controller 64, and preferably in electrical communication with the controller 64 and an ambient water selector button mounted adjacent the other buttons. When the ambient water selector button is activated, a signal is sent to the controller 64, opens the ambient water valve 90 to allow ambient temperature water to be dispensed when the valve 90 is in fluid communication with the spigot 44, without any intervening devices that change the character of the ambient temperature water.

There is also provided a beverage dispensing apparatus for chilled, sparkling and alkaline water production that includes the beverage dispensing apparatus described above, including the main water inlet port 86 in fluid communication with the water delivery pump 92, at least one stainless steel drinking water chiller coil 94 that is at least partially inserted into a heat exchanger shown in the drawings as chilled water reservoir 74. The dispensing apparatus 20 also includes the chilled sparkling water line with at least one carbonation system at least partially inserted into the same heat exchanger, with the carbonation system including the canister 108 of carbon dioxide gas, at least one venturi 140 in the splitter 119 or intersecting fluid lines 114, 138, 140, 142, and/or the carbonation chambers 120, 121. The dispensing apparatus includes the normally closed chilled water valve 96, the normally closed sparkling water valve 116, the least one normally closed carbon dioxide gas valve 112 positioned on a gas line from the carbon dioxide gas tank 108.

This dispensing apparatus further advantageously include an ambient temperature water line 104 in fluid communication with filtered water at the input port 86 or in fluid communication with water filter 130, both of which (when present) are in fluid communication with the normally-closed ambient temperature water valve 90. This apparatus further advantageously includes an alkaline chamber 102 that release pre-selected minerals into the water and positioned in fluid communication with the ambient water line 104, downstream of the normally closed ambient temperature water valve 100. When the alkaline selector 54 is activated, the electronic controller 64 opens both the ambient water valve 100 and also opens the chilled water valve 96 so that both ambient water from the alkaline chamber 102 (i.e., alkaline water) and chilled water are both dispensed and mixed at the outlet, such as spigot 44.

In further variations of the alkaline water dispensing apparatus, the controller 64 opens and then closes the chilled water valve 96 for a time interval which is shorter than the time interval that the ambient water valve 100 stays open. That provides more chilled water to the fluid outlet (e.g., spigot 44) which both cools the water at the outlet and reduces the alkalinity of that water. In still further variations of the alkaline water dispensing apparatus, the alkaline chamber includes a cartridge containing mineral crystal balls inside a bed having granular activated carbon (GAC). Advantageously, the cartridge is configured so that it is releasably fastened to a fluid manifold in the apparatus 20, and is preferably configured so the cartridge can be easily be changed by rotating it to unlatch the cartridge from the fluid manifold after which the cartridge is moved axially out of the manifold. Other releasable connections are known for connecting water filter cartridges to refrigerators and those releasable connections may be used with the alkaline cartridge.

In still further variations on the above beverage dispensers 20 with the internal carbon dioxide gas canister 108 and the carbonators 120, 121, and the alkaline canister 102, the dispenser may contain a hot tank 152 with a hot water reservoir 262 in fluid communication with the main water valve 90, preferably a normally closed valve 90, and hot water valve 150, which is also preferably a normally closed valve. The valves 90, 150 and hot water selector 58 are in communication with the controller 64. When the hot selector 58 is activated, the hot water valve 150 and the main water valve 90 are excited to open and allow inflowing ambient temperature water from the main valve to force hot water from the top of the hot water tank into hot water line 160 which is in fluid communication with an outlet, such as spigot 44. Advantageously, the hot tank includes a vapor chamber in fluid communication with a hot water reservoir so that steam may collect in the vapor chamber. The hot water flows through a control tube passing through the vapor chamber which tube has a venturi that sucks steam from the vapor chamber into the hot water stream that is ultimately dispensed at the outlet. Advantageously, a return vapor line places the vapor chamber in fluid communication with the outlet, such a spigot 44, to provide a pressure release that allows the hot water to drain back along the hot water line and into the hot water reservoir in the hot tank. The hot tank 152 advantageously has a heating element 154 inside which is configured to heat the water at temperatures ranging between 205° F. and 170° F., and a temperature sensor NTC 156, both controlled by the controller 64 to control the heating element and maintain the water temperature within that temperature range. Advantageously the NTC 156 is immediately adjacent to and preferably contacting the heating element to provide a heater shut off if the temperature suddenly changes which is reflective of a water level below the thermistor.

When the water inside the hot water reservoir 262 is at a temperature, as detected by the temperature sensor, at or below the lower setting point, the controller 64 powers on the heating element 154 and keeps it powered on until the temperature of the water reaches the upper setting point as detected by the temperature sensor when the controller 64 stops powering the heating element. If the temperature sensor in the thermistor 158 does not work, the temperature of the wall of the hot tank will increase and the thermostat 156 opens the electric circuit 163 to cut the power to the heating element 154. The sudden increase of temperature that arise when the water level is low is detected immediately by the thermistor adjacent to the heater and a signal to the controller 64 is sent to cut the power to the heater.

The above described beverage dispensing apparatus 20, the dispensing nozzle or spigot is in fluid communication with any combination of chilled water through the chilled water line 98, carbonated water through the carbonated water line 122, both ambient temperature alkaline water and chilled alkaline water through the alkaline water line 104, and hot water through the hot water line 160. These different types of water may be dispensed sequentially, or simultaneously, in any combination by the controller 64 which opens and closes the appropriate valves, including main flow valve 20, hot water valve 150, chilled water valve 96, and carbonation valves 112 and 116. Additionally, the amount of carbonation can be varied depending on the activation of the carbonators 120, 121. The inlet water at inlet port 86 may be filtered or unfiltered, and whether filtered or not, may have one or more internal filters 130, or external 82, 84 in fluid communication with the water inlet 86 to further purify the water.

FIG. 2F shows the filter 130 internal to the beverage dispensing apparatus 20 and upstream of the flow meter 88 and the main inlet valve 90. Alternatively, the filter or filters 130 internal to the beverage dispensing apparatus may be positioned downstream of the main inlet valve 90 and fluid communication lines are arranged such that the water passing through the main inlet valve 90 goes first through the water filter 130 before passing to each of the hot water valve 150 in fluid communication with the hot tank 152, the ambient water valve 100 in communication with the alkaline cartridge 102, the chilled water valve 96 in fluid communication with the drinking water chiller coil 94, or the carbonation valve 116 in fluid communication with the carbonators 120, 121 and in downstream fluid communication with the carbon dioxide gas cartridge 108.

Referring to FIG. 4A, there is also provided an improved chiller for cooling fluid used for beverages in a beverage dispensing apparatus for chilled and/or sparkling drinks. The apparatus includes a heat exchanger that employs a water-bath/ice-bank refrigeration system to create a cold-water bath and includes technology which includes chiller 74 containing water (the water-bath cooling fluid) and having chiller walls 76 that are thermally insulated from the external ambient temperature to reduce heat dispersion. The chiller or chilled water reservoir 74 contains an evaporator coil 77 that is preferably copper and immersed in the water in the chilled water reservoir 74. The evaporator coil 77 contains a refrigerant gas which, during its expansion phase, reduces the temperature of the water surrounding the evaporator coil in the chiller 74 and forms an ice bank 178 around the evaporator coil. The chiller includes a drinking water chilled coil 94 preferably made of stainless steel and containing circulating water that is cooled as it passes through the cooling coil, with circulating pressure and flow provided by a water delivery pump 92. The drinking water chiller coil 94 is at least partially immersed into the water-bath of the chiller and advantageously immersed for the full length of the horizontally extending or laterally extending coils of the drinking water chiller coil 94.

Referring to FIG. 4A, an inline instantaneous carbonation system configured to mix the water refrigerated inside the drinking water chiller coil 94, with carbon dioxide gas, is at least partially, immersed into the water bath of the chilled water reservoir. This includes the fluid lines between the carbon dioxide gas valve 112 and the carbonators 120, 121. The chiller has an optional discharge line to either drain the water bath from inside the chilled water reservoir by gravity through drain 126 (FIGS. 2A-2B) in the bottom of the cold-water reservoir. At least one temperature sensor 182 is arranged inside the chilled water reservoir 74 and positioned in contact with the drinking water chiller coil so that when the temperature of the drinking water reaches a predetermined value at least one agitator pump 170 is activated with the agitator pump configured to circulate the chilled water in the chilled water reservoir 74 or chiller so the water circulated by the agitator pump circulates around and is preferably in thermally conductive contact with the ice 178.

The agitator pump 170 advantageously includes a submersible pump inside the chilled water reservoir 74 and advantageously located at one of the bottom or top of the drinking water chiller coil 94, and advantageously aligned with a central, longitudinal axis of that drinking water chiller coil 94. Preferably, there are two agitators 170 each with a water intake located on that central, longitudinal axis and each with a plurality of radial water outlet ports which outlet ports are preferably in a plane orthogonal to that longitudinal axis. More preferably, the water flow of each of the two agitators 170 creates a spherical circulation flow pattern extending from the agitator pump outlet ports to about halfway to the other agitator.

Advantageously, the controller 64 is in communication, and preferably in electrical communication with a water level sensor 188 that senses the water level 194 of the chilled water reservoir and when the water level reaches a predetermined low level, the sensor sends an electrical signal (or other type of signal) to the controller 64 which sends a signal that opens the normally closed chilled water valve 196 to fill the water level 194 up to a maximum water level determined by the sensor.

Referring to FIGS. 3A and 4, the freezer expansion line 72 which is the evaporative line or coil of the refrigerating system of FIG. 3A shown schematically in FIG. 4A, is advantageously formed into a single tubular coil that conforms to the shape of the water reservoir thereby forming the evaporator coil 77. In the FIGS. 3A and 4 evaporator coils are shown as a generally square shape, so the coil 77 has rounded corners with straight sides forming the coil.

Referring to FIGS. 9A-10B, the refrigeration system comprises a freezer system (as does the system of FIGS. 3A and 4) and is referred to as a freezer system. The freezer system's evaporative coil may advantageously have a coiled configuration arranged in a figure eight coil 401. Thus, a single, continuous evaporator coil 401 having a uniform diameter along its length, may be wound to produce a figure eight freezing coil effectively forming two separate tubular freezer coils 402, 404, each tubular coil surrounding a separate chilled water reservoir so that two chilled water reservoirs 412, 414 are formed (one within each portion of evaporator coil 402, 404), resulting in two chilled water reservoirs within a single housing formed the freezer system's single, evaporative line that forms the figure eight evaporator coil 401. This figure eight coil arrangement 401 results in an enlarged center ice bank that helps form the two water reservoirs within the single housing. This figure eight configuration is believed to provide an increased volume of chilled water for periods of high demand, and the central ice bank is believed to provide a more uniform and colder temperature of the chilled water than designs using the single tube evaporative freezer line 72 (or evaporator coil 77) as in FIGS. 3A and 4. While the single drinking water chiller coil 94 may contain 0.3 liter, the figure eight coil 422, 424 may contain 0.6 to 1 liter of drinking water. The single chilled water coil 94 in its chilled water reservoir 74 may advantageously produce over 6 gallons per hour of water at 40° F. or colder. The figure eight chilled water coil 422, 424 in its chilled water reservoir is believed to produce more than twice that volume and up to 15 gallons per hour of water at 40° F. or colder.

Figure Eight Evaporative Freezer Coil

A single tube 401 of the refrigeration system's evaporative line that freezes water on the outside of the evaporative line advantageously forms the figure eight cooling coil 401, with that single tube 401 bent to form a series of figure eights extending in a serpentine manner with each successive figure eight stacked above the prior ones to form a figure-eight coil extending upward along the vertical axis. The material of the freezer coil is made in copper or other suitable metals. The refrigeration system forming a figure eight evaporator coil 401, is thus bent to form first and second, interconnected, tubular coils 402, 404. First freezer coil 402 forms one portion of the figure eight coils and the second freezer coil 404 forms the other portion of the stacked figure eight coil 401.

The tubular arrangement of the coils 402, 404 is advantageously formed with two opposing, straight and parallel sides. Each figure eight is formed by plurality of coil segments with parallel and opposing sides 402*a*, 402*b* (or 404*a*, 404*b*) joined by a straight back 402*c* (or 404*c*) that is perpendicular to those opposing sides, and with the juncture of the two opposing sides and back having rounded corners. The tubular coils 402, 404 are connected by first and second, preferably straight, connecting coil segments 402*d*, 404*d*. Connecting coil segment 402*d* extends from tube 402*a* to tube 404*a* in the adjacent level or layer of the figure eight coils, while second connecting coil segment 404*d* extends from tube 404*b* to tube 402*b* in the adjacent level or layer of figure eight coils. The connecting segments 402*d*, 404*d* are interleaved where they cross between the two coils 402, 404. The opposing sides of the coils 204, 404 are formed by a plurality of coil segments 402*a*, 402*b*, 404*a*, 404*b*, respectively and a majority of the coil segments 402*a* through 402*d* and 404*a* through 404*d* are advantageously parallel and slightly inclined upward to allow for the intersecting segments 402*d*, 404*d*.

Figure 10A:
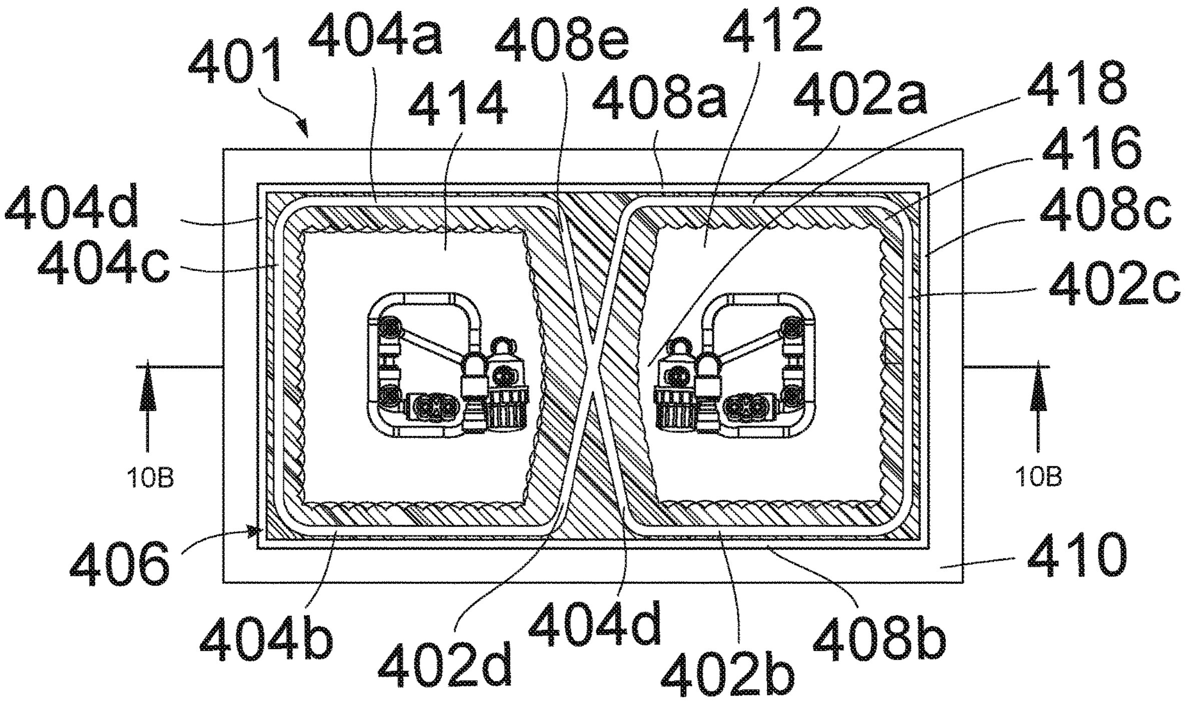
FIG. 10A is a top view of an insulated chilled water reservoir containing a figure eight cooling coil an ice bank and two drinking water chiller coils, each with two carbonator chambers.
Figure 10B:
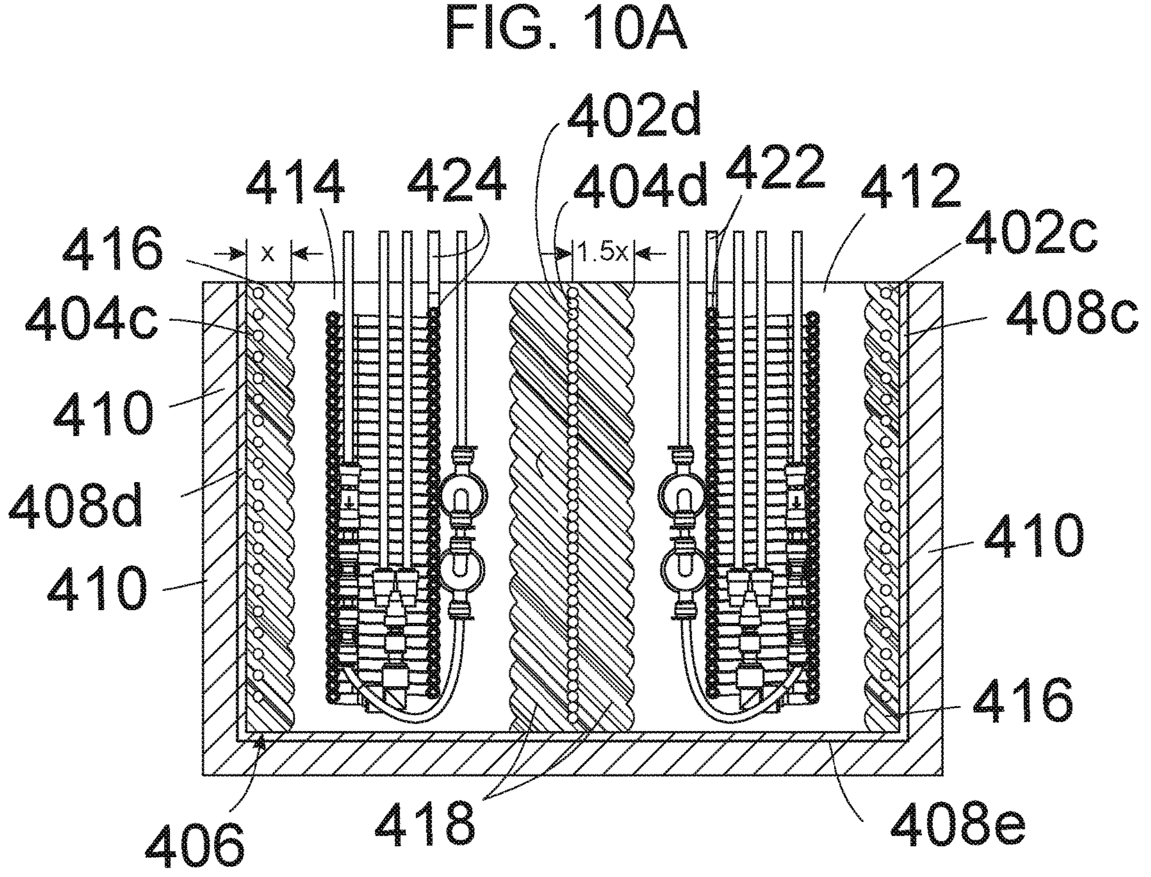
FIG. 10B is a sectional view taken along section 10B-10B of FIG. 10A.
Figure 10C:
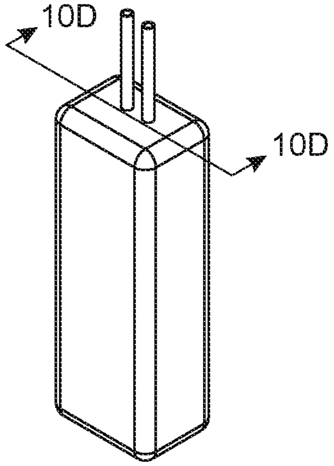
FIG. 10C is a perspective view of a water booster reservoir.
Figure 10D:
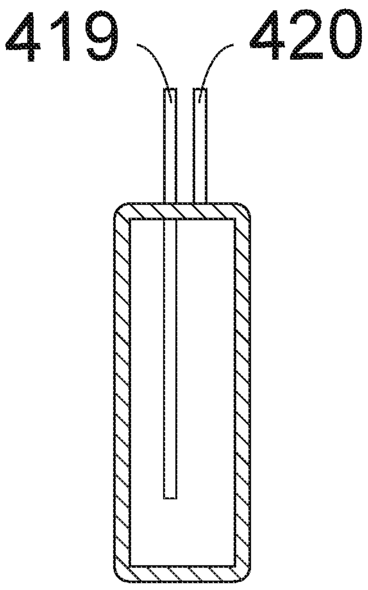
FIG. 10D is a sectional view taken along section 10D-10D of FIG. 10C.
Figure 10E:
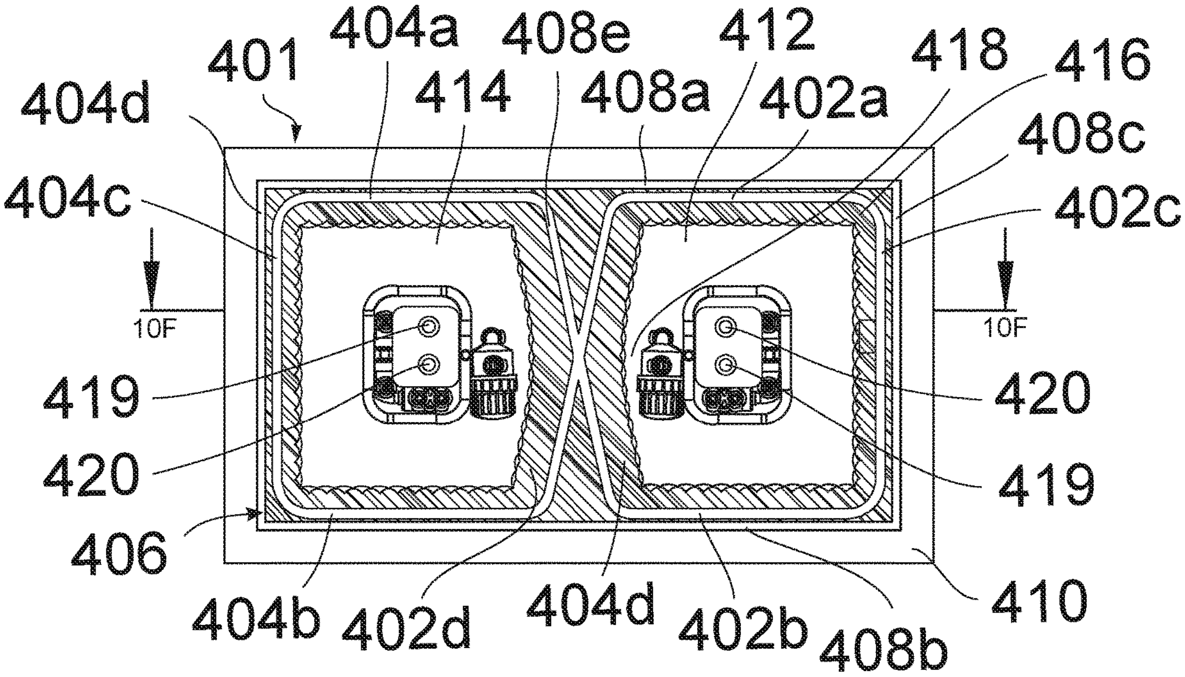
FIG. 10E is a top view of the insulated chiller water reservoir of FIG. 10A with two water booster reservoirs of FIG. 10C.
Figure 10F:
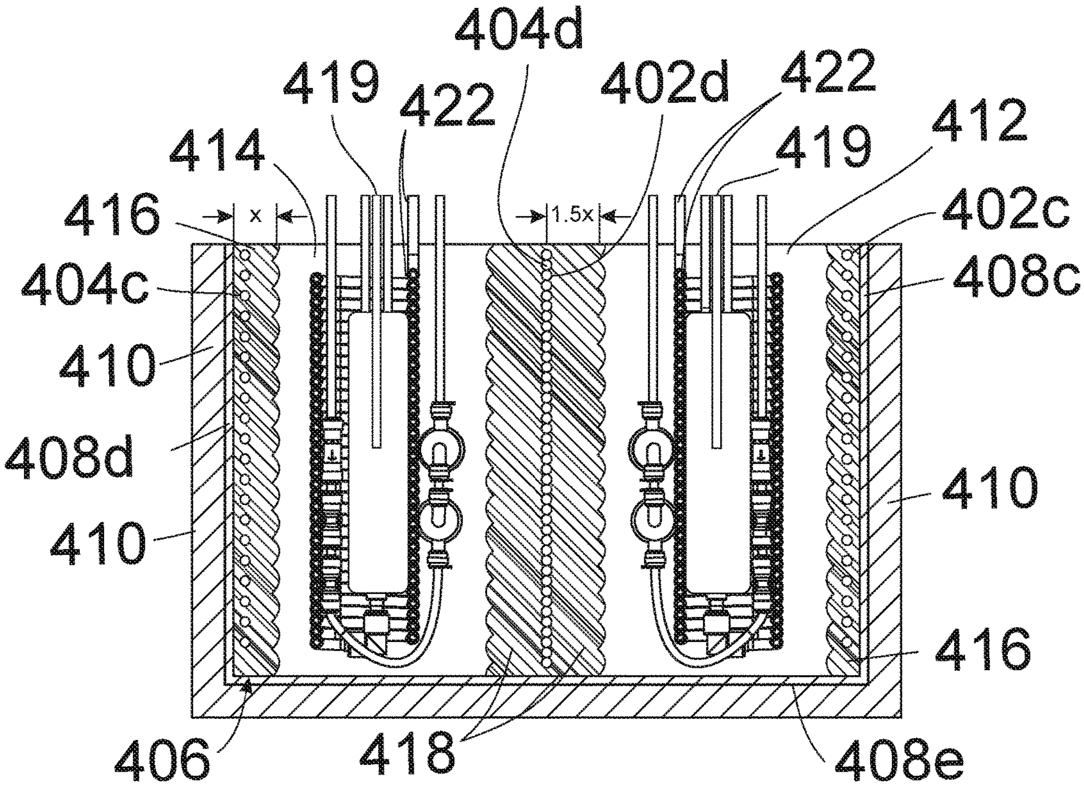
FIG. 10F is a sectional view taken along section 10F-10F of FIG. 10E.

As seen in FIGS. 10A-10B, the water reservoir 406 has walls 408*a*, 408*b* and 408*c* enclosing the tubular freezer coils 402, 404. Advantageously, coil segments 402*a*, 404*a* are parallel to and connected to opposing ends of the first reservoir side wall 408*a*. Advantageously, coil segments 402*b*, 404*b* are parallel to and connected to opposing ends of the second reservoir side wall 408*b*. Advantageously, coil segments 402*c* are parallel to first reservoir end wall 408*c* while coil segments 404*c* are connected to second, opposing reservoir end wall 408*d*. The reservoir 406 has a top side (not shown as the top is removed) and a bottom side 408*c*.

The connecting segments 402*d*, 404*d* extend between opposing walls 408*a*, 408*b* and extend across the width of the water reservoir 406. At the location where the connecting segments 402*d*, 404*d* cross each other, the crossing coil segments advantageously form a substantially continuous stack of freezing coil segments 402*d*, 404*d* as seen in FIGS. 9A and 10B (the vertical line of circles at the center of the reservoir).

The reservoir walls 408*a-e* form a fluid tight, thermally insulated enclosure with sealed openings for the various fluid connections and electrical connections described with respect to the first embodiment and additional ones for the second chilled water reservoir 414. The reservoir walls 408*a-e* are advantageously insulated by insulation 410, with any fluid communications or electrical communications also passing through the insulation as well as the water reservoir. A lid may be removable to allow physical (e.g., repair) access to the inside of the reservoir, but if so, the lid is advantageously sealed to the remaining portions of the water reservoir walls in a fluid tight manner, so water does not leak out the water reservoir.

Figure 9A:
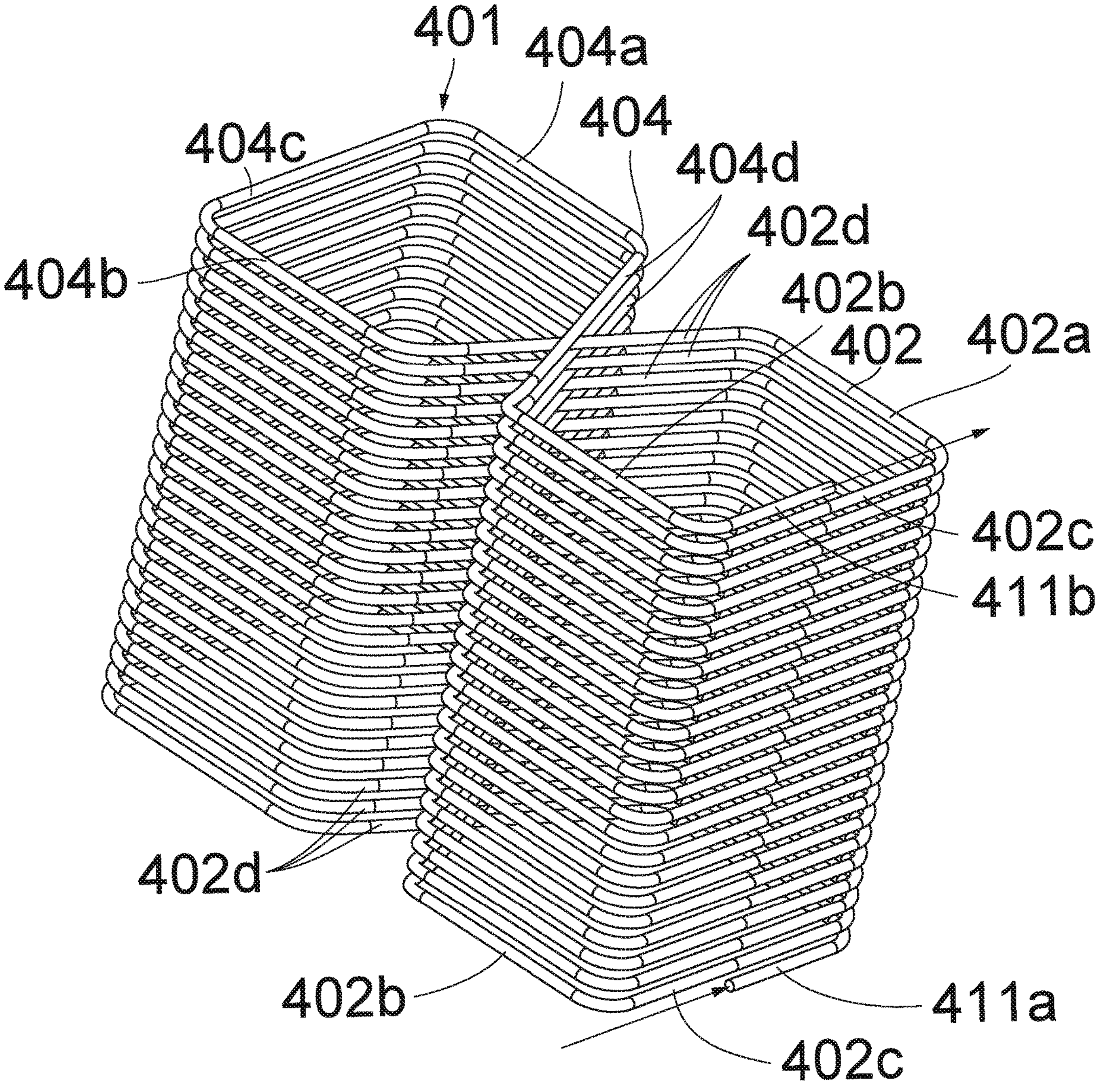
FIG. 9A is a perspective view of a figure eight evaporator coil.
Figure 9B:
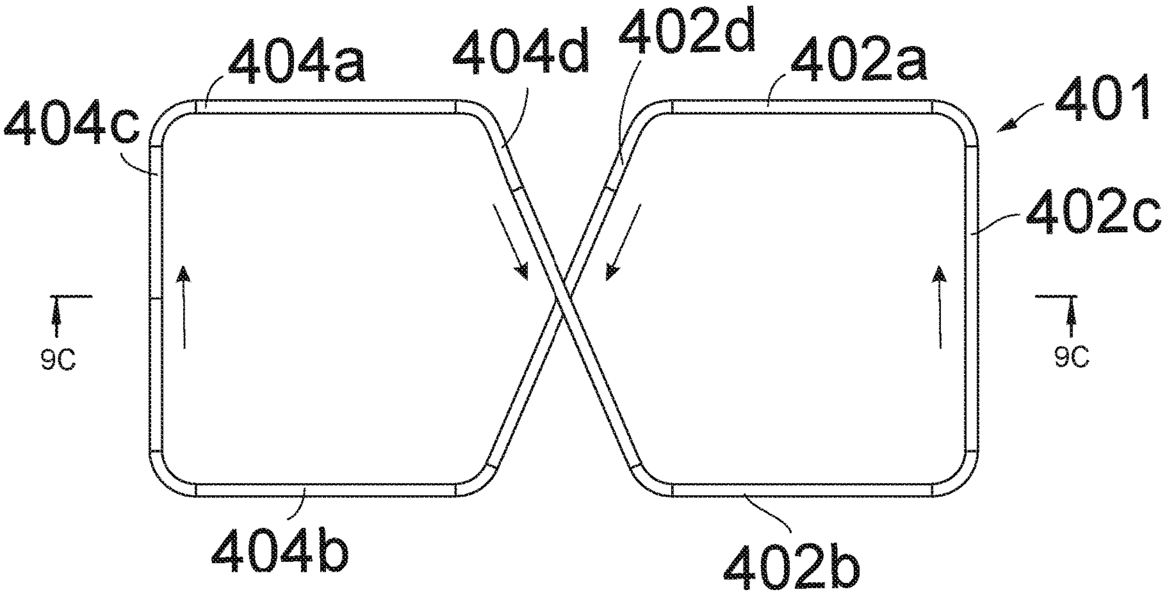
FIG. 9B is a top view of the figure eight evaporator coil of FIG. 9A.
Figure 9C:
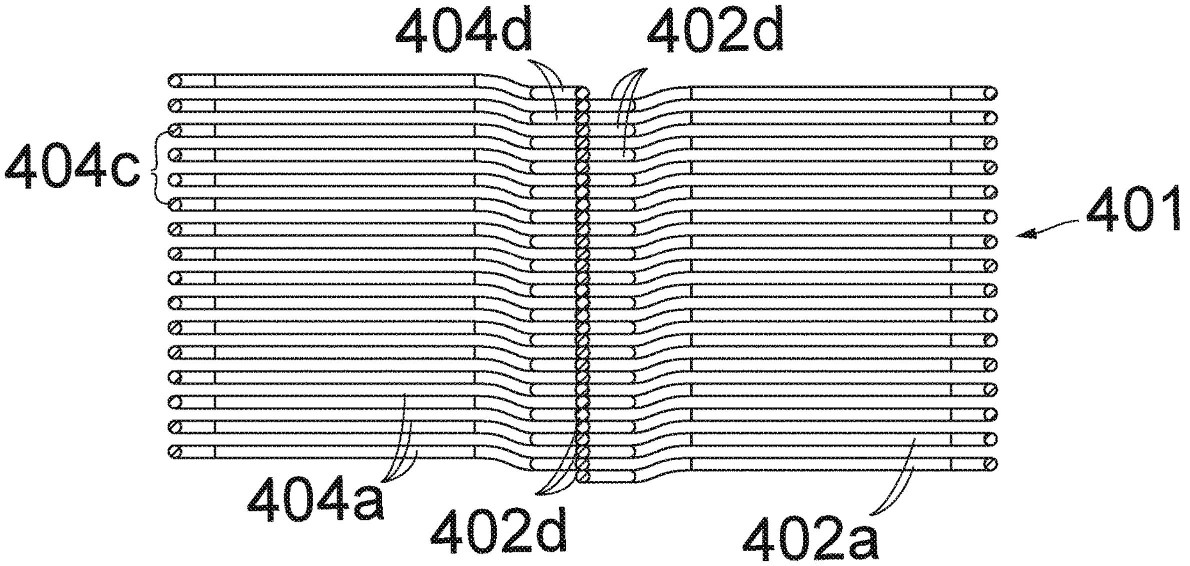
FIG. 9C is a sectional view taken along section 9C-9C of FIG. 9B.

The single freezer expansion line that is coiled to form the figure eight configuration 401 is shown in FIG. 9A has an inlet end 411*a* and an outlet end 411*b*. The inlet end 411*a* is in fluid communication with a compressor 70 as shown in FIG. 3A and the outlet end 411*b* is in fluid communication with a heat exchanger 78 as in FIG. 3A. In the depicted embodiment the circulation of the refrigerating or freezing fluid (e.g., a Fluro hydrocarbon) is in a direction as shown in FIGS. 9A and 10A. The fluid circulation direction of the refrigerating fluid is not believed critical but is described to illustrate the use of a single tube to form the figure eight circulation coil.

Referring to FIGS. 10A-10B, the tubular freezer coils 402 contain chilled water reservoir 412 while tubular freezer coils 404 contain chilled water reservoirs 414. The tubular freezer coils 402, 404 freeze the water in the reservoir 406, which results in a layer or bank of ice 416 forms along the ends and sides 408*a-d* abutting or adjacent to the coil sides 402*a-b*, 404*a-b* and coil ends 402*c*, 404*c*. This is generally referred to as the wall bank 416 of ice. The freezer coils 402, 404 extend from the bottom 408*e* of the water reservoir 406 to the top of the water line when the reservoir is full and can thus freeze a wall of water from the bottom of the reservoir to the top of the reservoir, along the walls 408*a*, 408*b* of the reservoir to form the wall bank of ice 416.

But where the connecting segments 402*d*, 404*d* of the evaporator coil 401 approach each other and cross the, the water forms a middle or center ice bank 418. Depending on the dimensions of the water reservoir 406 and the construction and temperature of the figure eight cooling coil, the middle or center ice bank 418 can advantageously extend entirely across the width of the water reservoir 406.

The crossing of the connecting segments 402*d*, 404*d* increases the cooling capacity and freezing capacity at the location where the connecting segments cross each other, and as shown in FIG. 10B, can effectively double the freezing capacity at the crossing location because of the extra ice-bank produced and its thickness. As the angle between the connecting segments increases, the freezing increases at the center and decreases at the outer end adjacent the reservoir walls 408*a*, 408*b*. As the angle at which the connecting segments decreases, the connecting segments are closer together for longer lengths and the freezing capacity increases. Thus, the angle at which the connecting segments 402*d*, 404*d* cross each other may be increased so the connecting segments are further apart along a longer portion of their length in order to decrease the freezing capacity along their length. The angle at which the connecting segments 402*d*, 404*d* cross each other may be reduced so the connecting segments are closer together along a longer portion of their length in order to increase the freezing capacity along a greater portion of their length. Freezing the water between two opposing walls of an elongated reservoir 406 may thus effectively create a center, blocking ice bank 418 formed by the ice frozen by the crossing segments 402*d*, 404*d*. The shape of that center ice bank 418 thus may be varied and may be increased in thickness in a direction between the end walls 408*c* and 408*d* of the water reservoir 406. An angle of 20°-30° from a plane that is perpendicular to the side walls 408*a*, 408*b* is believed suitable for a water reservoir having a width between those sidewalls of 10-15 inches. As the distance between the sidewalls 408 increases, the angle usually decreases and approaches smaller angles of 10-20° for larger water reservoir widths with sidewalls further apart.

Referring to FIG. 10A, the shape of the ice bank 416 along the side walls 408*a*, 408*b* and end walls 408*c* and 408*d* is preferably a uniform thickness X-except at the location of the center ice bank 418. Advantageously, the center ice bank 418 has a thickness that is at least twice the thickness of the wall ice bank, and advantageously from 2-4 times as thick along a substantial majority of its width and height. The center ice bank 418 advantageously has a substantially uniform thickness along its height, which advantageously extends from the bottom 408*e* of the water reservoir 406 to the top of the water level in the reservoir.

As seen in FIGS. 10A-10B, first and second drinking water chilled coils 422, 424 preferably made of stainless steel, are located inside respective first and second tubular freezing coils 402, 404 and the respective first and second chilled water reservoirs 412, 414. The ice banks 416, 418 advantageously encircle the drinking water chiller coils 422, 424 and preferably the inward facing side of the ice banks 416, 418 are separated from the outward facing side of the drinking water chiller coils 422, 424 by a distance that is the same around a majority of the area of the ice banks and chilling coils that face each other, and that is preferably the same around a substantial majority of the area of the ice banks and drinking water chiller coils that face each other. The chilled water circulation is achieved by agitators as described previously, with the ice banks 416, 418 controlled by temperature sensors for each tank as described previously. Advantageously, two ice temperature sensors are used, one for each chilled water reservoir 412, 414 to ensure the thickness of the center ice bank 418 is the same in each chilled water reservoir. But it is believed suitable, but less desirable, to have only one ice sensor in either one of the chilled water reservoirs 412 or 414. The control of the various components associated with the figure eight coil 401 is as described regarding FIGS. 1 and 8, using controller 64 to coordinate and control the various components.

A refrigeration system with the figure eight coil 401 provides a larger volume of chilled water than does the single coil freezer design, while doing so with a single compressor and expansion coil. Moreover, the center ice bank 418 can be thicker in the end-to-end direction between reservoir walls 408*c* and 408*d* because the connecting segments 402*d*, 404*d* of the freezer coils 402, 404 may be configured to create a thicker ice bank in that direction. The thicker center ice bank 418 allows a larger reserve of ice to melt if the chilled water in the reservoirs 412, 414 becomes warm because of high demand resulting in high flow of water through the two drinking water chiller coils 420, 422. The melting ice banks 416, 418 provide a thermal reserve to stabilize temperature variations as the ice melts when the water in the chilled water heats up and the melting ice. The thicker center ice bank 418 thus allows more temperature stability in the chilled water contained inside each chilled water reservoir 412, 414.

Referring to FIGS. 1A and 1D, Filter Reset (FR) button 147 (FIG. 1D) is used to reset a timer whose clock is included in controller 64. The FR button 147 resets the dispensing volume total value (determined by flow meter 88). These resets may be automatically done every time an old water filter 32, 130 is replaced by a brand-new water filter, regardless of whether the water filter is externally accessible (filter 32) or internally located (e.g., filter 130). During use of the beverage dispenser, controller 64 registers and stores information concerning the time the dispenser has been in operation (i.e., powered on). Contemporaneously, flow meter 88 measures the total volume of water the same apparatus has dispensed and because flow meter 88 is in electrical communication with the controller 64, the information may be readily processed by the controller 64. When either the clock has reached a specific time setting associated with replacing the water filter (normally six months), or whether the flow meter has detected a total volume of water dispensed (normally six thousand gallons), which of the two separate thresholds is reached first, the controller sends a signal to the filter indicator 62 (FIG. 1A) and the indicator starts blinking (e.g., a LED indicator light starts blinking). By pressing and holding the FR button 147 (FIG. 1D) for a number of seconds, both the clock and the volume metering counter in the controller 64 are reset to zero and the cycle repeats. Normally FR button 147 is pressed anytime water filters 32, 130 and alkaline chambers 132 are changed and the FR button 147 and controller 64 may be used to track the use of each, and send a signal to an indicator (e.g., indicator 64) to notify users that replacement is needed.

Referring to FIG. 6A, hot water tank 152 has a heater, or heating element 154, inside the hot water reservoir. Heater 154 may have a stainless-steel shirt or encasement, preferably made of AISI 304, or preferably AISI 3016 stainless steel. Because of the particular makeup of these stainless steels, there is limited scaling build up and no rust over time. In addition, the presence of the NTC thermistor 156 is positioned at less than 2 mm distance (preferably 0.5 mm to 1.0 mm) distance from the heating element 154 allow a precise monitoring of the heat transfer from the heating element. Heat is believed to be mainly transferred from the heating element 154 to the water inside the hot water reservoir by conduction and convection, and in case of low water or no water inside the hot water reservoir the heat is believed to be transferred mainly by radiation. A sensor 156 having a NTC sensor can accurately monitor the temperature; due to its proximity to the heating element 154 and the heat transferred from such heating element to the surrounding environment and to sensor 156. In case of low or no water inside the tank, the maximum temperature the hot tank is exposed to is believed to be the same as in the case where the hot water tank is full of water. The cycling between the maximum temperature setting and the minimum temperature setting of the hot water tank will be longer in case of low or no water inside the hot tank because air transfers or conducts heat at a slower rate than does water. But it is believed that the hot water tank 152 can operate for long time without thermally degrading the heating element 154 even when water is totally evaporated from the hot water tank as may arise when the dispensing apparatus has not been in use.

The electronic control module 64 of the beverage dispensing apparatus also allows a user at any time to change the "factory window setting" of the three main NTC temperature sensors 156, 180 and 182. By commands directed to the controller 64, the setting of the either or both the maximum temperature and the minimum temperature of each of the three main temperature sensors may be changed. Each of these three temperature sensors 156, 180 and 182 control the operation of other components to maintain temperatures at the location of the sensor between a maximum and a minimum setting points. Sensor 156 advantageously operates from 96° C. and 80° C.; sensor 180 advantageously operates from 0.6° C. and 1.2° C.; and sensor 182 operates from 0.4° C. and −1.8° C. Each of the above settings can be modified manually by holding the FR button 147 for a predetermined minimum time (e.g., more than 10 seconds) until the buttons 52, 54, 56 and 58 start flashing and, by touching each of them, in accordance with a predetermined software code, user can selectively change, increasing or reducing the max and min temperature settings of each of the temperature sensors 156, 180 and 182. By changing the temperature setting of sensor 156, a user can increase the temperature of the hot water dispensed by the apparatus in accordance with personal preferences. By changing the temperature setting of sensor 180, a user can produce less ice or more ice, for example making the apparatus produce a lot of extra ice to build a thicker ice-bank which provides a larger energy storage and a lot of latent heat to meet a high consumer demand, as may arise when the apparatus is installed in a busy restaurant during rush hour. By changing the temperature setting of sensor 182, one can vary the setting temperatures of the agitator pump 170, allowing, for example, the agitator pump to work in a larger range of temperatures and extract more heat from the ice bank, as may arise when the apparatus is installed in a busy restaurant compared to a residential home.

The above description is given by way of example, and not limitation. Given the above disclosure, one skilled in the art could devise variations that are within the scope and spirit of the invention, including various ways of varying the dimensions such as the angle of the crossing freezer coil segments 402*d*, 404*d*. A number of valve types are believed suitable for use for the various valves described herein, including solenoid valves. Further, the various features of this invention can be used alone, or in varying combinations with each other and are not intended to be limited to the specific combination described herein. Thus, the invention is not to be limited by the illustrated embodiments.

What is claimed is:

1. A beverage dispensing apparatus, comprising:

a reservoir configured to store a heat-exchange fluid;

a chiller coil arranged within the reservoir having a plurality of coils extending around a longitudinal axis, wherein the chiller coil is configured to circulate a beverage, and wherein the chiller coil is in communication with a water source and a dispensing outlet;

an evaporator coil arranged within the reservoir and configured to form an ice bank within the reservoir;

an agitator pump arranged within the reservoir, wherein the agitator pump comprises:

an inlet port arranged along the longitudinal axis for inflow of the heat exchange fluid into the agitator pump; and a plurality of outlet ports arranged at an angle relative to the longitudinal axis, wherein the plurality of outlet ports are configured to direct an outflow of the heat exchange fluid toward the evaporator coil; and a controller in communication with the agitator pump and configured to selectively activate the agitator pump to circulate the heat exchange fluid within the reservoir.

2. The beverage dispensing apparatus of claim 1, wherein the agitator pump is at least partially surrounded by the chiller coil.

3. The beverage dispensing apparatus of claim 1, wherein the evaporator coil at least partially surrounds the chiller coil.

4. The beverage dispensing apparatus of claim 1, further comprising a plurality of outlet tubes, wherein an outlet tube of the plurality of outlet tubes is connected to each of the plurality of outlet ports.

5. The beverage dispensing apparatus of claim 1, wherein the plurality of outlet ports are arranged radially around the agitator pump.

6. The beverage dispensing apparatus of claim 1, wherein the plurality of outlet ports are arranged perpendicularly relative to the longitudinal axis.

7. The beverage dispensing apparatus of claim 1, further comprising a temperature sensor configured to measure a temperature of the beverage within the chiller coil, wherein the controller is in communication with the temperature sensor.

8. The beverage dispensing apparatus of claim 7, wherein the controller is configured to activate the agitator pump when the temperature measured by the temperature sensor is above an upper temperature threshold.

9. The beverage dispensing apparatus of claim 7, wherein the controller is configured to deactivate the agitator pump when the temperature measured by the temperature sensor is below a lower temperature threshold.

10. A beverage dispensing apparatus, comprising:

a reservoir configured to store a heat-exchange fluid;

a chiller coil arranged within the reservoir having a plurality of coils extending around a longitudinal axis, wherein the chiller coil is configured to circulate a beverage, and wherein the chiller coil is in communication with a water source and a dispensing outlet;

an evaporator coil arranged within the reservoir and configured to form an ice bank within the reservoir;

a first agitator pump arranged within the reservoir, wherein the first agitator pump comprises:

a first inlet port arranged along the longitudinal axis for inflow of the heat exchange fluid into the first agitator pump, and a plurality of first outlet ports arranged at an angle relative to the longitudinal axis, wherein the plurality of first outlet ports are configured to direct an outflow of the heat exchange fluid toward the evaporator coil; and a second agitator pump arranged within the reservoir, wherein the second agitator pump comprises:

a second inlet port arranged along the longitudinal axis for inflow of the heat exchange fluid into the second agitator pump, and a plurality of second outlet ports arranged at an angle relative to the longitudinal axis, wherein the plurality of second outlet ports are configured to direct an outflow of the heat exchange fluid toward the evaporator coil; and a controller in communication with the first and second agitator pumps and configured to selectively activate the first and second agitator pumps to circulate the heat exchange fluid within the reservoir.

11. The beverage dispensing apparatus of claim 10, wherein the second inlet port of the second agitator pump faces toward the first inlet port of the first agitator pump.

12. The beverage dispensing apparatus of claim 10, wherein the first agitator pump is arranged at a lower end of the reservoir and the second agitator pump is arranged at an upper end of the reservoir.

13. The beverage dispensing apparatus of claim 10, wherein the first and second agitator pumps are at least partially surrounded by the chiller coil.

14. The beverage dispensing apparatus of claim 10, wherein the evaporator coil at least partially surrounds the chiller coil.

15. The beverage dispensing apparatus of claim 10, further comprising a plurality of outlet tubes, wherein an outlet tube of the plurality of outlet tubes is connected to an outlet port of the plurality of first outlet ports or of the plurality of second outlet ports.

16. The beverage dispensing apparatus of claim 10, wherein the plurality of first outlet ports are arranged radially around the first agitator pump, and wherein the plurality of second outlet ports are arranged radially around the second agitator pump.

17. The beverage dispensing apparatus of claim 10, wherein the plurality of first outlet ports are arranged perpendicularly relative to the longitudinal axis, and wherein the plurality of second outlet ports are arranged perpendicularly relative to the longitudinal axis.

18. The beverage dispensing apparatus of claim 10, further comprising a temperature sensor configured to measure a temperature of the beverage within the chiller coil, wherein the controller is in communication with the temperature sensor.

19. The beverage dispensing apparatus of claim 18, wherein the controller is configured to activate one or more of the first agitator pump or the second agitator pump based on the measured temperature.

20. The beverage dispensing apparatus of claim 18, wherein the controller is configured to activate the first and second agitator pumps when the measured temperature is above an upper temperature threshold, the controller is configured to deactivate the first and second agitator pumps when the measured temperature is below a lower temperature threshold, and wherein the controller is configured to activate one of the first agitator pump or the second agitator pump when the measured temperature is between the lower temperature threshold and the upper temperature threshold.

* * * * *